US010775250B2

(12) United States Patent
Okada et al.

(10) Patent No.: US 10,775,250 B2
(45) Date of Patent: Sep. 15, 2020

(54) TORQUE SENSOR

(71) Applicant: TRI-FORCE MANAGEMENT CORPORATION, Saitama-ken (JP)

(72) Inventors: Kazuhiro Okada, Saitama-ken (JP); Miho Okada, Saitama-ken (JP); Nobuhisa Nishioki, Saitama-ken (JP)

(73) Assignee: TRI-FORCE MANAGEMENT CORPORATION, Saitama-Ken (JP)

( * ) Notice: Subject to any disclaimer, the term of this patent is extended or adjusted under 35 U.S.C. 154(b) by 233 days.

(21) Appl. No.: 15/756,863

(22) PCT Filed: May 31, 2016

(86) PCT No.: PCT/JP2016/066035
§ 371 (c)(1),
(2) Date: Mar. 1, 2018

(87) PCT Pub. No.: WO2017/208350
PCT Pub. Date: Dec. 7, 2017

(65) Prior Publication Data
US 2018/0252602 A1    Sep. 6, 2018

(51) Int. Cl.
*G01L 3/10* (2006.01)
*G01L 25/00* (2006.01)

(52) U.S. Cl.
CPC ............ *G01L 3/106* (2013.01); *G01L 25/003* (2013.01)

(58) Field of Classification Search
CPC ....... G01L 25/003; G01L 3/106; G01L 5/221; G01L 5/282; G01L 5/161; G01L 1/142;
(Continued)

(56) References Cited

U.S. PATENT DOCUMENTS 6,370,968 B1 * 4/2002 Yasui ...................... G01L 3/106
180/444
7,506,554 B2   3/2009 Shimizu et al.
(Continued)

FOREIGN PATENT DOCUMENTS

CN    103080716 A    5/2013
JP    2000-19035 A    1/2000
(Continued)

OTHER PUBLICATIONS

Japanese Office Action dated Nov. 4, 2016 in connection with corresponding Japanese Application No. 2016-556025 with English translation.
(Continued)

*Primary Examiner* — John Fitzgerald
*Assistant Examiner* — Truong D Phan
(74) *Attorney, Agent, or Firm* — Ladas & Parry LLP

(57) ABSTRACT

A torque sensor of the present invention includes: a ring-shaped deformation body; first to fourth displacement electrodes deformable due to elastic deformation of the ring-shaped deformation body; first to fourth fixed electrodes arranged at positions opposite to those of the first to fourth displacement electrodes; and a detection circuit that outputs an electrical signal representing torque based on a variation amount of capacitance values of first to fourth capacitive elements formed by the first to fourth displacement electrodes and the first to fourth fixed electrodes, wherein the detection circuit outputs, as the electrical signals representing the acting torque, a first electrical signal corresponding to a difference between "a sum of a capacitance value of the first capacitive element and a capacitance value of the second capacitive element" and "a sum of a capacitance value of the third capacitive element and a capacitance value of the fourth capacitive element" and a second electrical (Continued)

signal corresponding to a difference between the capacitance value of the first capacitive element and the capacitance value of the third capacitive element and determines whether the torque sensor is normally functioning based on the first and the second electrical signals.

30 Claims, 24 Drawing Sheets

(58) Field of Classification Search
CPC ......... G01L 1/205; G01L 5/228; G01L 1/146; G01L 3/10; G01L 1/08; G01L 3/00; G01L 5/00; B60R 21/015; G01G 19/4142; G01B 7/22; G01D 5/2417; B62D 6/10; G01R 17/08
USPC ............. 73/862.337, 780, 862.041, 862.046, 73/862.08
See application file for complete search history.

(56) References Cited

U.S. PATENT DOCUMENTS

| 8,667,854 | B2 | 3/2014 | Nishioki et al. | |
|---|---|---|---|---|
| 2006/0042404 | A1* | 3/2006 | Shimizu | G01L 3/102 73/862.331 |
| 2007/0240522 | A1 | 10/2007 | Shimizu et al. | |
| 2013/0167661 | A1* | 7/2013 | Nishioki | G01L 3/10 73/862.337 |
| 2013/0319135 | A1* | 12/2013 | Okada | G01L 1/14 73/862.043 |
| 2018/0017452 | A1* | 1/2018 | Okada | G01L 3/10 |
| 2018/0348074 | A1* | 12/2018 | Okada | G01L 5/226 |

FOREIGN PATENT DOCUMENTS

| JP | 2000-249609 | A | 9/2000 |
|---|---|---|---|
| JP | 2004-170299 | A | 6/2004 |
| JP | 2006-64445 | A | 3/2006 |
| JP | 2006-292423 | A | 10/2006 |
| JP | 2007-24641 | A | 2/2007 |
| JP | 2008-8688 | A | 1/2008 |
| JP | 2009-58388 | A | 3/2009 |
| JP | 2009-244134 | A | 10/2009 |
| JP | 2012-37300 | A | 2/2012 |
| JP | 5853121 | B1 | 12/2015 |

OTHER PUBLICATIONS

Japanese Office Action dated Feb. 3, 2017 in connection with Japanese Application No. 2016-556025 with English translation.
Japanese Office Action dated Jul. 21, 2017 in connection with corresponding Application No. JP 2017-098186 with English translation.
English translation of JP 5853121 B 1.
English translation of JP 2000-249609 A.
Espacenet English abstract of JP 2008-8688 A.
Espacenet English abstract of CN 103080716 A.
Espacenet English abstract of JP 2006-64445 A.
International Search Report (ISR) and Written Opinion dated Jun. 28, 2016 for International Application No. PCT/JP2016/066035.
Espacenet English abstract of JP 2012-37300 A.
Espacenet English abstract of JP 2004-170299 A.
Espacenet English abstract of JP 2009-58388 A.
Espacenet English abstract of JP 2007-24641 A.
Espacenet English abstract of JP 2009-244134 A.
Espacenet English abstract of JP 2006-292423 A.
Espacenet English abstract of JP 2000-19035 A.
International Preliminary Report on Patentability (IPRP) dated Dec. 13, 2018 for Application No. PCT/JP2016/066035 (in English).

* cited by examiner

|     | TIMING 1 | TIMING 2 |
| --- | --- | --- |
| SW1 | ON | ON |
| SW2 | OFF | ON |
| SW3 | ON | ON |
| SW4 | OFF | ON |
| SW5 | ON | OFF |
| SW6 | ON | OFF |

|      | TIMING 1 | TIMING 2 |
|------|----------|----------|
| SW1  | ON       | OFF      |
| SW2  | ON       | OFF      |
| SW3  | ON       | OFF      |
| SW4  | ON       | OFF      |
| SW5  | OFF      | ON       |
| SW6  | OFF      | ON       |
| SW7  | OFF      | ON       |
| SW8  | OFF      | ON       |

|      | TIMING 1 | TIMING 2 |
|------|----------|----------|
| SW1  | ON       | OFF      |
| SW2  | ON       | OFF      |
| SW3  | ON       | OFF      |
| SW4  | ON       | OFF      |

|      | TIMING 1 | TIMING 2 | TIMING 3 |
|------|----------|----------|----------|
| SW1  | ON       | ON       | OFF      |
| SW2  | OFF      | OFF      | ON       |
| SW3  | ON       | ON       | OFF      |
| SW4  | OFF      | OFF      | ON       |
| SW5  | ON       | ON       | OFF      |
| SW6  | OFF      | OFF      | ON       |
| SW7  | ON       | ON       | OFF      |
| SW8  | OFF      | OFF      | ON       |
| SW9  | ON       | OFF      | OFF      |
| SW10 | ON       | OFF      | OFF      |
| SW11 | ON       | OFF      | OFF      |
| SW12 | ON       | OFF      | OFF      |

FIG. 27

|  | TIMING 1 | TIMING 2 |
|---|---|---|
| SW1 | ON | OFF |
| SW2 | ON | OFF |
| SW3 | ON | OFF |
| SW4 | ON | OFF |
| SW5 | ON | OFF |
| SW6 | ON | OFF |
| SW7 | ON | OFF |
| SW8 | ON | OFF |
| SW9 | OFF | ON |
| SW10 | OFF | ON |
| SW11 | OFF | ON |
| SW12 | OFF | ON |
| SW13 | OFF | ON |
| SW14 | OFF | ON |
| SW15 | OFF | ON |
| SW16 | OFF | ON |

FIG. 29

| | TIMING 1 | TIMING 2 |
|---|---|---|
| SW1 | ON | OFF |
| SW2 | ON | OFF |
| SW3 | ON | OFF |
| SW4 | ON | OFF |
| SW5 | ON | OFF |
| SW6 | ON | OFF |
| SW7 | ON | OFF |
| SW8 | ON | OFF |

|  | Fx | Fy | Fz | Mx | My | Mz |
|---|---|---|---|---|---|---|
| C11, C12 | − | − | 0 | 0 | 0 | + |
| C21, C22 | + | − | 0 | 0 | 0 | − |
| C31, C32 | + | + | 0 | 0 | 0 | + |
| C41, C42 | − | + | 0 | 0 | 0 | − |
FIG. 38
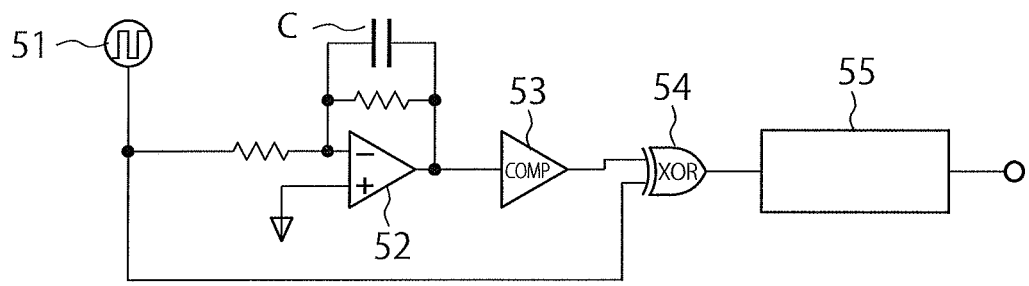
FIG. 39
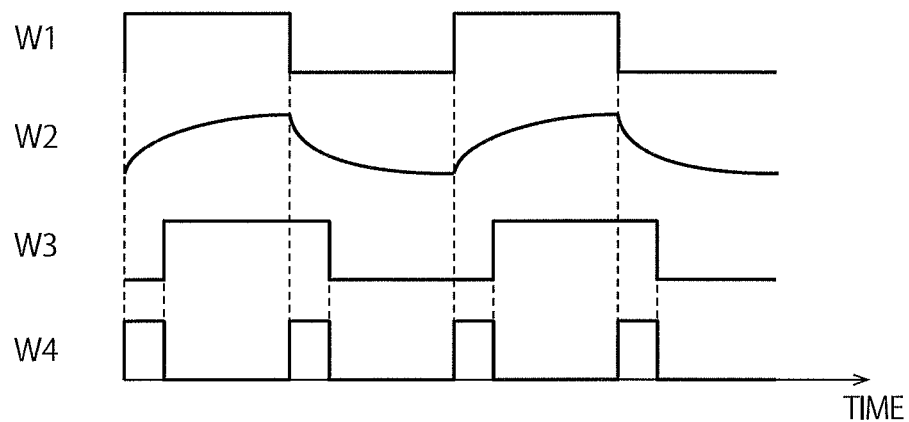
FIG. 40

TORQUE SENSOR

RELATED APPLICATION

This application is an application under 35 U.S.C. 371 of International Application No. PCT/JP2016/066035 filed on May 31, 2016, the entire contents of which are incorporated herein by reference.

TECHNICAL FIELD

The present invention relates to torque sensors and particularly to a sensor having a function to output, as an electrical signal, torque acting around a predetermined axis of rotation.

BACKGROUND ART

Torque sensors that detect torque acting around a predetermined axis of rotation are widely used in various transportation machines and industrial machines. For example, the following Patent Literature 1 discloses a torque sensor of a type where mechanical deformation generated by action of torque is detected by a strain gauge. Patent Literature 2 discloses a sensor formed with a magnetostrictive film by plating processing on a surface of a shaft thereof. The sensor detects torque acting on the shaft by measuring a change in magnetic characteristics of the magnetostrictive film. Meanwhile, Patent Literature 3 discloses a torque sensor of a type where a magnetism generation unit is provided at an end portion of a torsion bar and a variation in a magnetic flux density of magnetism generated by the magnetism generation unit is detected using a magnetism collecting ring. Patent Literature 4 discloses a torque sensor of a type where a number of magnets are arranged in a, cylindrical shape such that N poles and S poles are alternately aligned in a peripheral direction thereof and a magnetic field generated by these magnets is detected. Patent Literature 5 further discloses a torque sensor that includes a link mechanism to allow the shape of a ring-shaped member to be deformed in a radial direction by action of torque and detects, by a load sensor, force applied in the radial direction by deformation of the ring-shaped member. Cited Literature 6 discloses a torque sensor of a capacitance type that detects torque based on a variation amount in a capacitance value of a capacitive element attributable to deformation occurring in a ring-shaped elastic ring by action of torque.

Such torque sensors have been increasingly used in wider applications to life support robots in recent years and thus high safety is desired. However, for example the torque sensor of the current capacitance type includes a mechanical unit, a detection unit of capacitance, and an electronic circuit including a microcomputer but may disadvantageously fail due to condensation, an impact, an overload, or contamination between a pair of parallel flat plates providing the capacitance.

As a simple method for determining whether a torque sensor is out of order, disclosed is a method to align the multiple (e.g. three) torque sensors described in Cited Literature 6 in parallel along an axis of rotation of a torque to be detected and to evaluate differences of output signals of the respective torque sensors. In this method, each two of the three output signals are compared and the torque sensor is determined as normally functioning when the difference between the output signals of the two torque sensors is within a predetermined range. On the other hand, the torque sensor is determined as not normally functioning (out of order) when the difference is not within the predetermined range.

CITATION LIST

Patent Literature

Patent Literature 1: JP 2009-058388 A
Patent Literature 2: JP 2007-024641 A
Patent Literature 3: JP 2009-244134 A
Patent Literature 4: JP 2006-292423 A
Patent Literature 5: JP 2000-019035 A
Patent Literature 6: JP 2012-037300 A However, when a method to determine whether a torque sensor is normally functioning by using a plurality of torque sensors is employed, cost increases according to the number of torque sensors. A space required for installment of the torque sensors also disadvantageously expands.

The present invention has been devised in consideration to the above problems. That is, an object of the present invention is to provide a torque sensor capable of determining a failure (determination as to whether normally functioning) while minimizing cost and an installment space.

DISCLOSURE OF THE INVENTION

A torque sensor of the present invention that detects torque around a Z axis in an X-Y-Z three-dimensional coordinate system, includes: a ring-shaped deformation body made of a material elastically deformable by action of a torque to be detected and having a through opening through which the Z axis passes; a first supporting body connected to the ring-shaped deformation body at two first portions where the ring-shaped deformation body meets an X-Z plane; a second supporting body connected to the ring-shaped deformation body at two second portions where the ring-shaped deformation body meets a plane, different from the X-Z plane, that includes the Z axis, the second supporting body rotatable around the Z axis relative to the first supporting body; a displacement electrode arranged on an inner peripheral surface or an outer peripheral surface of the ring-shaped deformation body and deformable due to elastic deformation of the ring-shaped deformation body; a fixed electrode arranged at a position on the first supporting body, opposite to the displacement electrode; and a detection circuit that outputs an electrical signal representing the torque around the Z axis acting on one of the first supporting body and the second supporting body while a load is applied to the other based on a variation amount of a capacitance value of a capacitive element as formed by the displacement electrode and the fixed electrode. The capacitive element includes a first capacitive element and a second capacitive element arranged at a first part where a clearance between the ring-shaped deformation body and the first supporting body decreases when the torque around the Z axis acts thereon and a third capacitive element and a fourth capacitive element arranged at a second part where a clearance between the ring-shaped deformation body and the first supporting body increases when the torque around the Z axis acts thereon, the detection circuit outputs, as the electrical signal representing the acting torque, a first electrical signal corresponding to a difference between "a sum of a capacitance value of the first capacitive element and a capacitance value of the second capacitive element" and "a sum of a capacitance value of the third capacitive element and a capacitance value of the fourth capacitive element"; and at least one of a second electrical signal corresponding to "a difference between the capacitance value of the first capacitive element and the capacitance value of the third capacitive element" and of a third electrical signal corresponding to "a difference between the capacitance value of the second capacitive element and the capacitance value of the fourth capacitive element" and determines whether the torque sensor is normally functioning based on the first electrical signal and one of the second electrical signal and the third electrical signal.

According to the present invention, torque based on the first electrical signal and torque based on one of the second electrical signal and the third electrical signal are compared and thus the torque sensor itself can determine whether the torque sensor is normally functioning. This allows for providing a torque sensor capable of determining a failure (determination as to whether normally functioning) without using a plurality of torque sensors, in other words, while minimizing cost and an installment space.

Preferably, the displacement electrode includes a first displacement electrode and a second displacement electrode arranged at positions, of the respective parts of the ring-shaped deformation body, corresponding to the first part and a third displacement electrode and a fourth displacement electrode arranged at positions, of the respective parts of the ring-shaped deformation body, corresponding to the second part, the fixed electrode includes a first fixed electrode arranged at a position opposite to the first displacement electrode, a second fixed electrode arranged at a position opposite to the second displacement electrode, a third fixed electrode arranged at a position opposite to the third displacement electrode, and a fourth fixed electrode arranged at a position opposite to the fourth displacement electrode, the first capacitive element is formed by the first displacement electrode and the first fixed electrode, the second capacitive element is formed by the second displacement electrode and the second fixed electrode, the third capacitive element is formed by the third displacement electrode and the third fixed electrode, and the fourth capacitive element is formed by the fourth displacement electrode and the fourth fixed electrode.

In such a torque sensor, each of the fixed electrodes and each of the displacement electrodes forming the first to fourth capacitive elements may be formed individually for each of the capacitive elements. Alternatively, either the fixed electrodes or the displacement electrodes may be formed as a common electrode. That is, at least two of the first to fourth displacement electrodes may be formed by a common electrode or at least two of the first to fourth fixed electrodes may be formed by a common electrode.

Arrangement of the ring-shaped deformation body, the first supporting member, and the second supporting member may take the following aspects. That is, the first supporting body is arranged at one side in the Z axis with respect to the ring-shaped deformation body, the second supporting body is arranged at another side in the Z axis with respect to the ring-shaped deformation body, the two first portions of the ring-shaped deformation body are connected to the first supporting body via a first connection member, and the two second portions of the ring-shaped deformation body are connected to the second supporting body via a second connection member.

Alternatively, the first supporting body is arranged inside the inner peripheral surface of the ring-shaped deformation body, the second supporting body is arranged outside the outer peripheral surface of the ring-shaped deformation body, the two first portions of the ring-shaped deformation body are connected to the first supporting body via a first connection member, and the two second portions of the ring-shaped deformation body are connected to the second supporting body via a second connection member.

In the former case, a diameter of the torque sensor can be small while in the latter case a thickness (dimension in a Z axis direction) of the torque sensor can be thin. This can be selected as appropriate according to a space where the torque sensor is installed.

The above arrangement may be combined as another example. That is, the first supporting body is arranged inside the inner peripheral surface or outside the outer peripheral surface of the ring-shaped deformation body, the second supporting body is arranged at one side in the Z axis with respect to the ring-shaped deformation body, the two first portions of the ring-shaped deformation body are connected to the first supporting body via a first connection member, and the two second portions of the ring-shaped deformation body are connected to the second supporting body via a second connection member.

Alternatively, the first supporting body is arranged at one side in the Z axis with respect to the ring-shaped deformation body, the second supporting body is arranged inside the inner peripheral surface or outside the outer peripheral surface of the ring-shaped deformation body, the two first portions of the ring-shaped deformation body are connected to the first supporting body via a first connection member, and the two second portions of the ring-shaped deformation body are connected to the second supporting body via a second connection member.

It is preferable that torque acting on the torque sensor is measured based on the first electrical signal. In this case, the first electrical signal has the largest capacitance value (electrode area) used for measurement of torque among the first to the third electrical signals and thus has a large variation in the capacitance, which is also advantageous from the perspective of S/N.

Preferably, the detection circuit determines whether the torque sensor is normally functioning by determining whether a difference between torque based on the first electrical signal and torque based on one of the second electrical signal and the third electrical signal is within a predetermined range. In this case, whether the torque sensor is normally functioning can be easily determined.

More preferably, the detection circuit outputs, as the electrical signal representing the acting torque, both of the second electrical signal and the third electrical signal and determines whether the torque sensor is normally functioning by determining whether "at least one of a difference between torque based on the first electrical signal and torque based on the second electrical signal and a difference between torque based on the first electrical signal and torque based on the third electrical signal" as well as "a difference between torque based on the second electrical signal and torque based on the third electrical signal" are within a predetermined range. In this case, whether the torque sensor is normally functioning can be surely determined.

It is also preferable that an area of one of the first fixed electrode and the first displacement electrode is set larger than an area of the other, an area of one of the second fixed electrode and the second displacement electrode is set larger than an area of the other, an area of one of the third fixed electrode and the third displacement electrode is set larger than an area of the other, and an area of one of the fourth fixed electrode and the fourth displacement electrode is set larger than an area of the other such that an effective facing area of each of the pairs of electrodes forming the first to fourth capacitive elements does not change even when a relative position of the displacement electrode changes relative to the fixed electrode as a result of action of the torque around the Z axis.

In this case, the effective facing area of each of the pairs of electrodes forming the first to fourth capacitive elements does not change even when the torque around the Z axis acts and thus detection accuracy of torque and determination accuracy as to whether the torque sensor is normally functioning can be enhanced.

In the torque sensor as described above, the second supporting body is preferably connected to the ring-shaped deformation body at two regions where the ring-shaped deformation body meets the Y-Z plane. In this case, deformation of the ring-shaped deformation body due to the acting torque is symmetrical with respect to the origin O and thus measuring the torque is easy.

Preferably, where a V axis and a W axis that pass through the origin O and form 45 degrees to an X axis and a Y axis are defined on an X-Y plane, the first capacitive element and the second capacitive element are arranged near the V axis symmetrically with respect to the V axis and the third capacitive element and the fourth capacitive element are arranged near the W axis symmetrically with respect to the W axis when viewed from the Z axis direction.

Alternatively preferably, where the V axis and the W axis that pass through the origin O and form 45 degrees to the X axis and the Y axis are defined on the X-Y plane, the first capacitive element and the second capacitive element are aligned near the V axis along the Z axis direction with orthogonal projections thereof on the X-Y plane overlapping with each other and the third capacitive element and the fourth capacitive element are aligned near the W axis along the Z axis direction with orthogonal projections thereof on the X-Y plane overlapping with the W axis.

In these cases, as for a change in the capacitance values of the respective capacitive elements, the first and the second capacitive elements exhibit similar behavior to each other while the third and the fourth capacitive elements exhibit substantially similar behavior to each other. Therefore, measurement of torque based on a variation in the capacitance value of the respective capacitive elements and processing for failure diagnosis of the torque sensor are easy.

Alternatively, the present invention includes a torque sensor that detects torque around a Z axis in an X-Y-Z three-dimensional coordinate system, including: a ring-shaped deformation body made of a material elastically deformable by action of a torque to be detected and having a through opening through which the Z axis passes; a first supporting body connected to the ring-shaped deformation body at two first portions where the ring-shaped deformation body meets an X-Z plane; a second supporting body connected to the ring-shaped deformation body at two second portions where the ring-shaped deformation body meets a plane, different from the X-Z plane, that includes the Z axis, the second supporting body rotatable around the Z axis relative to the first supporting body; a displacement electrode arranged on an inner peripheral surface or an outer peripheral surface of the ring-shaped deformation body and deformable due to elastic deformation of the ring-shaped deformation body; a fixed electrode arranged at a position on the first supporting body, opposite to the displacement electrode; and a detection circuit that outputs an electrical signal representing the torque around the Z axis acting on one of the first supporting body and the second supporting body while a load is applied to the other based on a variation amount of a capacitance value of a capacitive element formed by the displacement electrode and the fixed electrode. The capacitive element includes: a first capacitive element and a second capacitive element arranged at a first part where a clearance between the ring-shaped deformation body and the first supporting body decreases when the torque around the Z axis acts thereon; a third capacitive element and a fourth capacitive element arranged at a second part where a clearance between the ring-shaped deformation body and the first supporting body decreases when the torque around the Z axis acts thereon; a fifth capacitive element and a sixth capacitive element arranged at a third part where a clearance between the ring-shaped deformation body and the first supporting body increases when the torque around the Z axis acts thereon; and a seventh capacitive element and an eighth capacitive element arranged at a fourth part where a clearance between the ring-shaped deformation body and the first supporting body increases when the torque around the Z axis acts thereon. The detection circuit outputs, as the electrical signal representing the acting torque, a first electrical signal corresponding to a difference between "a sum of a capacitance value of the first capacitive element, a capacitance value of the second capacitive element, a capacitance value of the fifth capacitive element, and a capacitance value of the sixth capacitive element" and "a sum of a capacitance value of the third capacitive element, a capacitance value of the fourth capacitive element, a capacitance value of the seventh capacitive element, the eighth displacement electrode, and a capacitance value of the eighth capacitive element" and at least one of a second electrical signal corresponding to a difference between "a sum of the capacitance value of the first capacitive element and the capacitance value of the fifth capacitive element" and "a sum of the capacitance value of the third capacitive element and the capacitance value of the seventh capacitive element" and a third electrical signal corresponding to a difference between "a sum of the capacitance value of the second capacitive element and the capacitance value of the sixth capacitive element" and "a sum of the capacitance value of the fourth capacitive element and the capacitance value of the eighth capacitive element." The detection circuit determines whether the torque sensor is normally functioning based on the first electrical signal and one of the second electrical signal and the third electrical signal.

According to the present invention, torque based on the first electrical signal and torque based on one of the second electrical signal and the third electrical signal are compared and thus the torque sensor itself can determine whether the torque sensor is normally functioning. This allows for providing a torque sensor capable of determining a failure (determination as to whether normally functioning) without using a plurality of torque sensors, in other words, while minimizing cost and an installment space.

Preferably, the displacement electrode includes a first displacement electrode and a second displacement electrode arranged at positions, of the respective parts of the ring-shaped deformation body, corresponding to the first part, a third displacement electrode and a fourth displacement electrode arranged at positions, of the respective parts of the ring-shaped deformation body, corresponding to the second part, a fifth displacement electrode and a sixth displacement electrode arranged at positions, of the respective parts of the ring-shaped deformation body, corresponding to the third part, and a seventh displacement electrode and an eighth displacement electrode arranged at positions, of the respective parts of the ring-shaped deformation body, corresponding to the fourth part, the fixed electrode includes a first fixed electrode arranged at a position opposite to the first displacement electrode, a second fixed electrode arranged at a position opposite to the second displacement electrode, a third fixed electrode arranged at a position opposite to the third displacement electrode, a fourth fixed electrode arranged at a position opposite to the fourth displacement electrode, a fifth fixed electrode arranged at a position opposite to the fifth displacement electrode, a sixth fixed electrode arranged at a position opposite to the sixth displacement electrode, a seventh fixed electrode arranged at a position opposite to the seventh displacement electrode, and an eighth fixed electrode arranged at a position opposite to the eighth displacement electrode, the first capacitive element is formed by the first displacement electrode and the first fixed electrode, the second capacitive element is formed by the second displacement electrode and the second fixed electrode, the third capacitive element is formed by the third displacement electrode and the third fixed electrode, the fourth capacitive element is formed by the fourth displacement electrode and the fourth fixed electrode, the fifth capacitive element is formed by the fifth displacement electrode and the fifth fixed electrode, the sixth capacitive element is formed by the sixth displacement electrode and the sixth fixed electrode, the seventh capacitive element is formed by the seventh displacement electrode and the seventh fixed electrode, and the eighth capacitive element is formed by the eighth displacement electrode and the eighth fixed electrode.

In such a torque sensor, each of the fixed electrodes and each of the displacement electrodes forming the first to fourth capacitive elements may be formed individually for each of the capacitive elements. Alternatively, either the fixed electrodes or the displacement electrodes may be formed as a common electrode. That is, at least two of the first to eighth displacement electrodes may be formed by a common electrode or at least two of the first to eighth fixed electrodes may be formed by a common electrode.

Arrangement of the ring-shaped deformation body, the first supporting member, and the second supporting member may take the following aspects. That is, the first supporting body is arranged at one side in the Z axis with respect to the ring-shaped deformation body, the second supporting body is arranged at another side in the Z axis with respect to the ring-shaped deformation body, the two first portions of the ring-shaped deformation body are connected to the first supporting body via a first connection member, and the two second portions of the ring-shaped deformation body are connected to the second supporting body via a second connection member.

Alternatively, the first supporting body is arranged inside the inner peripheral surface of the ring-shaped deformation body, the second supporting body is arranged outside the outer peripheral surface of the ring-shaped deformation body, the two first portions of the ring-shaped deformation body are connected to the first supporting body via a first connection member, and the two second portions of the ring-shaped deformation body are connected to the second supporting body via a second connection member. In the former case, a diameter of the torque sensor can be small while in the latter case a thickness (dimension in a Z axis direction) of the torque sensor can be thin. This can be selected as appropriate according to a space where the torque sensor is installed.

The above arrangement may be combined as another example. That is, the first supporting body is arranged inside the inner peripheral surface or outside the outer peripheral surface of the ring-shaped deformation body, the second supporting body is arranged at one side in the Z axis with respect to the ring-shaped deformation body, the two first portions of the ring-shaped deformation body are connected to the first supporting body via a first connection member, and the two second portions of the ring-shaped deformation body are connected to the second supporting body via a second connection member.

Alternatively, the first supporting body is arranged at one side in the Z axis with respect to the ring-shaped deformation body, the second supporting body is arranged inside the inner peripheral surface or outside the outer peripheral surface of the ring-shaped deformation body, the two first portions of the ring-shaped deformation body are connected to the first supporting body via a first connection member, and the two second portions of the ring-shaped deformation body are connected to the second supporting body via a second connection member.

It is preferable that torque acting on the torque sensor is measured based on the first electrical signal. In this case, the first electrical signal has the largest capacitance value (electrode area) used for measurement of torque among the first to the third electrical signals and thus has a large variation in the capacitance, which is also advantageous from the perspective of S/N.

Preferably, the detection circuit determines whether the torque sensor is normally functioning by determining whether a difference between torque based on the first electrical signal and torque based on one of the second electrical signal and the third electrical signal is within a predetermined range. In this case, whether the torque sensor is normally functioning can be easily determined.

More preferably, the detection circuit outputs, as the electrical signal representing the acting torque, both of the second electrical signal and the third electrical signal, and the detection circuit determines whether the torque sensor is normally functioning by determining whether "at least one of a difference between torque based on the first electrical signal and torque based on the second electrical signal and a difference between torque based on the first electrical signal and torque based on the third electrical signal" as well as "a difference between torque based on the second electrical signal and torque based on the third electrical signal" are both within a predetermined range. In this case, whether the torque sensor is normally functioning can be surely determined.

Preferably, an area of one of the first fixed electrode and the first displacement electrode is set larger than an area of the other, an area of one of the second fixed electrode and the second displacement electrode is set larger than an area of the other, an area of one of the third fixed electrode and the third displacement electrode is set larger than an area of the other, an area of one of the fourth fixed electrode and the fourth displacement electrode is set larger than an area of the other, an area of one of the fifth fixed electrode and the fifth displacement electrode is set larger than an area of the other, an area of one of the sixth fixed electrode and the sixth displacement electrode is set larger than an area of the other, an area of one of the seventh fixed electrode and the seventh displacement electrode is set larger than an area of the other, and an area of one of the eighth fixed electrode and the eighth displacement electrode is set larger than an area of the other such that an effective facing area of each of the pairs of electrodes forming the first to eighth capacitive elements does not change even when a relative position of the displacement electrode changes relative to the fixed electrode as a result of action of the torque around the Z axis.

In this case, the effective facing area of each of the pairs of electrodes forming the first to eighth capacitive elements does not change even when the torque around the Z axis acts and thus detection accuracy of torque and determination accuracy as to whether the torque sensor is normally functioning can be enhanced.

In the torque sensor as described above, the second supporting body is preferably connected to the ring-shaped deformation body at two regions where the ring-shaped deformation body meets the Y-Z plane. In this case, deformation of the ring-shaped deformation body due to the acting torque is symmetrical with respect to the origin O and thus measuring the torque is easy.

Preferably, where a V axis and a W axis that pass through an origin O and form 45 degrees to an X axis and a Y axis are defined on an X-Y plane, the first capacitive element and the second capacitive element are arranged near the positive V axis symmetrically with respect to the V axis, the third capacitive element and the fourth capacitive element are arranged near the positive W axis symmetrically with respect to the W axis, the fifth capacitive element and the sixth capacitive element are arranged near the negative V axis symmetrically with respect to the V axis, and the seventh capacitive element and the eighth capacitive element are arranged near the negative W axis symmetrically with respect to the W axis when viewed from a Z axis direction.

Alternatively preferably, where a V axis and a W axis that pass through an origin O and form 45 degrees to an X axis and a Y axis are defined on an X-Y plane, the first capacitive element and the second capacitive element are aligned near the positive V axis along a Z axis direction with orthogonal projections thereof on the X-Y plane overlapping with the positive V axis and the third capacitive element and the fourth capacitive element are aligned near the positive W axis along the Z axis direction with orthogonal projections thereof on the X-Y plane overlapping with the positive W axis, the fifth capacitive element and the sixth capacitive element are aligned near the negative V axis along the Z axis direction with orthogonal projections thereof on the X-Y plane overlapping with the negative V axis, and the seventh capacitive element and the eighth capacitive element are aligned near the negative W axis along the Z axis direction with orthogonal projections thereof on the X-Y plane overlapping with the negative W axis.

In these cases, as for a change in the capacitance values of the respective capacitive elements, the first, the second, the fifth and the sixth capacitive elements exhibit similar behavior to each other while the third, the fourth, the seventh, and the eighth capacitive elements exhibit similar behavior to each other. Therefore, measurement of torque based on a variation in the capacitance value of the respective capacitive elements and processing for failure diagnosis of the torque sensor are easy.

BRIEF DESCRIPTION OF DRAWINGS

FIG. 27 is a table illustrating ON/OFF connection states of switches included in the detection circuit in FIG. 26.

FIG. 29 is a table illustrating ON/OFF connection states of switches included in the detection circuit in FIG. 28.

FIG. 38 is a table illustrating how capacitance values of eight sets of capacitive elements change when force in the respective coordinate axis directions and moment around the respective coordinate axes act on a ring-shaped deformation body from a left-side supporting body while a load is applied to a right-side supporting body in the torque sensor illustrated in FIG. 33.

FIG. 39 is a circuit diagram where a PWM circuit is provided to a capacitive element.

FIG. 40 is a schematic diagram illustrating waveforms of signals output from respective components of the PWM circuit in FIG. 39.

DESCRIPTION OF EMBODIMENTS

<<<§ 0. Principles for Detecting Failure by Cantilever Model>>>

Before explaining a torque sensor of the present embodiment, principles for determining whether the torque sensor is normally functioning will be described using a cantilever model.

Figure 1:
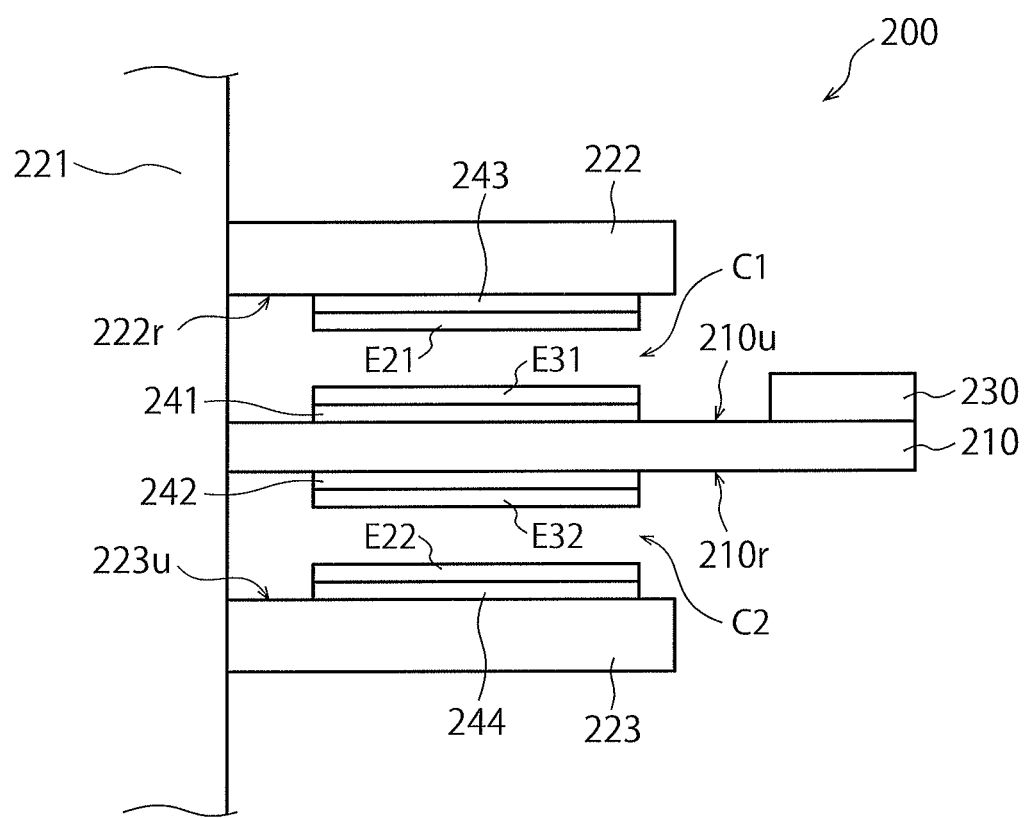
FIG. 1 is a cantilever model for explaining principles for detecting torque by a conventional torque sensor.

FIG. 1 is a cantilever model 200 for explaining principles for detecting torque by a conventional torque sensor. This cantilever model 200 includes: a deflectively deformable cantilever 210 extending in a horizontal direction and having an upper surface 210u (surface in an upper side in FIG. 1) and a lower surface 210r (surface in a lower side in FIG. 1); a first fixed part 221 fixed with one end (left end in FIG. 1) of the cantilever 210; and a force receiving body 230 provided near the other end of the cantilever 210 on the upper surface 210u. The first fixed part 221 is perpendicular to the extending direction (longitudinal direction) of the cantilever 210 and has a plane surface extending to some extent in a vertical direction. The force receiving body 230 receives force acting on the other end of the cantilever 210. This cantilever model 200 is for detecting force acting on the force receiving body 230 and is not for detecting torque; however, principles for detecting torque can be analogically understood from principles for detecting force as described below.

The cantilever model 200 further includes a second fixed part 222 spaced apart from the upper surface 210u of the cantilever 210 by a predetermined interval and a third fixed part 223 spaced apart from the lower surface 210r of the cantilever 210 by a predetermined interval. One end of each of the second and the third fixed parts 222 and 223 is fixed to the first fixed part 221. A lower surface 222r of the second fixed part 222 and an upper surface 223u of the third fixed part 223 are planes parallel to the upper surface 210u and the lower surface 210r of the cantilever 210, respectively.

As illustrated in FIG. 1, an upper flexible substrate 241 and an upper flexible electrode E31 are laminated upward in the order mentioned on the upper surface 210u of the cantilever 210. A lower flexible substrate 242 and a lower flexible electrode E32 are laminated downward in the order mentioned on the lower surface 210r of the cantilever 210. An upper fixed substrate 243 and an upper fixed electrode E21 are laminated downward in the order mentioned on a lower surface 222r of the second fixed part 222. A lower fixed substrate 244 and a lower fixed electrode E22 are laminated upward in the order mentioned on an upper surface 223u of the third fixed part 223. In this state, the upper fixed electrode E21 and the upper flexible electrode E31 are opposite to each other and the lower fixed electrode E22 and the lower flexible electrode E32 are opposite to each other. As illustrated in FIG. 1, a predetermined interval is provided between the upper flexible electrode E31 and the upper fixed electrode E21 and the same predetermined interval is provided between the lower flexible electrode E32 and the lower fixed electrode E22. With the above configuration, a first capacitive element C1 is formed by the upper flexible electrode E31 and the upper fixed electrode E21 and a second capacitive element C2 is formed by the lower flexible electrode E32 and the lower fixed electrode E22. A facing area between the upper flexible electrode E31 and the upper fixed electrode E21 is equivalent to a facing area between the lower flexible electrode E32 and the lower fixed electrode E22 in FIG. 1.

In the cantilever model 200 as described above, applying downward force F to the force receiving body 230 results in bending of the cantilever 210 downward. This also results in bending of the upper flexible electrode E31 and the lower flexible electrode E32 downward. This results in a decreased capacitance value of the first capacitive element C1 due to an increased clearance between the upper flexible electrode E31 and the upper fixed electrode E21 while resulting in an increased capacitance value of the second capacitive element C2 due to a decreased clearance between the lower flexible electrode E32 and the lower fixed electrode E22. Based on variation amounts of these capacitance values, acting force can be detected as a difference between the two capacitance values. Such difference detection is effective for stable detection of force with suppressed in-phase noise or a zero-point drift and contributes to off-setting influence of expansion in the respective parts due to the temperature and obtaining a detection value with a high accuracy.

It is only required to further include, as a detection circuit for performing such difference detection, a circuit that outputs an electrical signal corresponding to a difference between a capacitance value of the first capacitive element C1 and a capacitance value of the second capacitive element C2 as an electrical signal representing an acting force.

Figure 2:
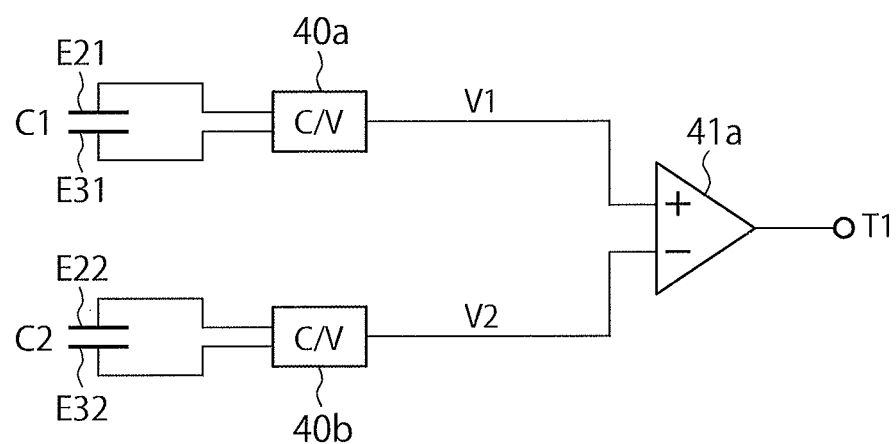
FIG. 2 is a circuit diagram illustrating an exemplary detection circuit used in the cantilever model in FIG. 1.

FIG. 2 is a circuit diagram illustrating and exemplary detection circuit having a function to perform such difference detection. Symbols E21, E31, E22, and E32 illustrated in this circuit diagram represent the respective electrodes illustrated in FIG. 1 and symbols C1 and C2 represent the capacitive elements formed by these electrodes. C/V convertors 40a and 40b are circuits that convert capacitance values of the capacitive elements C1 and C2 to voltage values V1 and V2, respectively. The voltage values V1 and V2 after conversion correspond to capacitance values of the respective capacitive elements. A subtraction arithmetic unit 41a has a function to obtain a difference of voltage values "V1-V2" and to output the difference to an output terminal T1.

In the example illustrated in FIG. 1, when the respective electrodes E21 to E32 have the same shape and the same size and positions of the respective electrodes E21 to E32 are set to be the same when viewed from above in FIG. 1, capacitance values of the capacitive elements C1 and C2 become equivalent in a no-load state (where no deflection is occurring in the cantilever 210). Therefore, a voltage value output to the output terminal T1 of the detection circuit illustrated in FIG. 2 equals zero.

Meanwhile, when downward force acts on the force receiving body 230 illustrated in FIG. 1, the cantilever 210 is deflected downward and thus a capacitance value of the capacitive element C1 decreases while a capacitance value of the capacitive element C2 increases. As a result of this, a voltage value output to the output terminal T1 of the detection circuit illustrated in FIG. 2 becomes a negative value. The greater the acting force is, the greater an absolute value becomes. On the contrary, when upward force acts on the force receiving body, a capacitance value of the capacitive element C1 increases while a capacitance value of the capacitive element C2 decreases. As a result of this, a voltage value output to the output terminal T1 of the detection circuit illustrated in FIG. 2 becomes a positive value. The greater the acting force is, the greater an absolute value becomes. In this manner, the output terminal T1 provides a detected value of force including a sign.

However, this cantilever model 200 is not capable of determining whether the cantilever model 200 itself is normally functioning. That is, for example, force evaluated by the cantilever model 200 and force actually acting on the force receiving body 230 do not match when some failure occurs in the detection circuit; however the cantilever model 200 illustrated in FIG. 1 is not capable of recognizing such a mismatch. Contrary to this, according to a cantilever model 200' illustrated in FIG. 3, whether the cantilever model 200' is normally functioning can be determined. The cantilever model 200' will be described in detail below with reference to FIG. 3.

Figure 3:
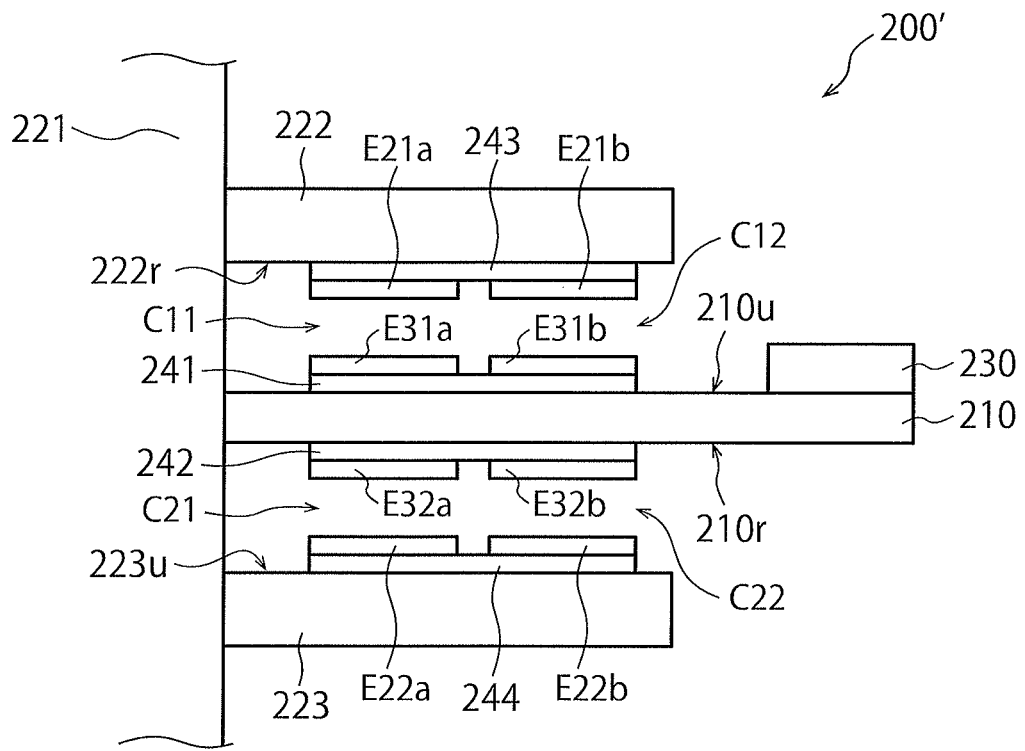
FIG. 3 is a cantilever model for explaining principles for detecting torque by a torque sensor of the present invention and principles for determining whether the torque sensor is normally functioning.

The cantilever model 200' illustrated in FIG. 3 is for explaining principles for detecting torque by a torque sensor of the present invention and principles for determining whether the torque sensor is normally functioning. This is a model where each of the electrodes E21 to E32 in the cantilever model 200 illustrated in FIG. 1 is equally divided into two. That is, the upper flexible electrode E31 is equally divided into a first upper flexible electrode E31a and a second upper flexible electrode E31b, the lower flexible electrode E32 is equally divided into a first lower flexible electrode E32a and a second lower flexible electrode E32b, the upper fixed electrode E21 is equally divided into a first upper fixed electrode E21a and a second upper fixed electrode E21b, and the lower fixed electrode E22 is equally divided into a first lower fixed electrode E22a and a second lower fixed electrode E22b. The first upper flexible electrode E31a and the first upper fixed electrode E21a opposite thereto form a first capacitive element C11, the second upper flexible electrode E31b and the second upper fixed electrode E21b opposite thereto form a second capacitive element C12, the first lower flexible electrode E32a and the first lower fixed electrode E22a opposite thereto form a third capacitive element C21, and the second lower flexible electrode E32b and the second lower fixed electrode E22b opposite thereto form a fourth capacitive element C22.

In a default state where no force is applied to a force receiving body 230, a clearance and a facing area between the first upper flexible electrode E31a and the first upper fixed electrode E21a opposite thereto, a clearance and a facing area between the second upper flexible electrode E31b and the second upper fixed electrode E21b opposite thereto, a clearance and a facing area between the first lower flexible electrode E32a and the first lower fixed electrode E22a opposite thereto, and a clearance and a facing area between the second lower flexible electrode E32b and the second lower fixed electrode E22b opposite thereto are equivalent to each other, respectively. That is, the capacitance values of the first to fourth capacitive elements C11 to C22 are equivalent to each other in the default state.

Applying downward force F to the force receiving body 230 in the cantilever model 200' as described above results in bending of the cantilever 210 downward. This also results in bending of the upper flexible electrode E31 and the lower flexible electrode E32 downward. This results in decreased capacitance values of the first and the second capacitive elements C11 and C12 due to increased clearances between the first and the second upper flexible electrodes E31a and E31b and the first and the second upper fixed electrodes E21a and E21b, respectively, while resulting in increased capacitance values of the third and the fourth capacitive elements C21 and C22 due to decreased clearances between the first and the second lower flexible electrodes E32a and E32b and the first and the second lower fixed electrodes E22a and E22b, respectively. Based on these variation amounts of capacitance values, an acting force can be detected as a difference between "the sum of capacitance values of the first and the second capacitive elements C11 and C12" and "the sum of capacitance values of the third and the fourth capacitive elements C21 and C22". Such difference detection contributes to obtaining a detection value with a high accuracy as described above.

That is, when the first capacitive element C11 and the second capacitive element C12 are connected in parallel and the third capacitive element C21 and the fourth capacitive element C22 are connected in parallel, force F applied to the force receiving body 230 can be evaluated based on the following mathematical formula. In the following mathematical formula, symbols C11 to C22 represent capacitance values of the first to fourth capacitive elements C11 to C22, respectively. Note that although the force and the capacitance value are connected by a sign "=", these are different physical quantities and thus actually the force F is evaluated after performing predetermined conversion. Symbol F1 represents force F that is evaluated based on the right side of the following mathematical formula and is for distinguishing it from force F evaluated based on other mathematical formulas described later.

$$F1=(C21+C22)-(C11+C12) \quad \text{[Mathematical Formula 1]}$$

Force F applied to the force receiving body 230 can be evaluated based on a capacitance value of the first capacitive element C11 and a capacitance value of the third capacitive element C21 or can be evaluated based on a capacitance value of the second capacitive element C12 and a capacitance value of the fourth capacitive element C22. That is, force F can be evaluated also by the following F2 and F3.

$$F2=C21-C11$$

$$F3=C22-C12 \quad \text{[Mathematical Formula 2]}$$

In the present invention, F1 to F3 as described above are used upon determining whether the cantilever model 200' is normally functioning. Specifically, in order to determine whether the cantilever model 200' is normally functioning, force F is evaluated based on the mathematical formulas F2 and F3 as described above while the first capacitive element C11 and the second capacitive element C12 are separated and the third capacitive element C21 and the fourth capacitive element C22 are separated. It is only required to evaluate whether a difference between F1 and F2 is within a predetermined range and whether a difference between F2 and F3 is within a predetermined range. If all of the differences are within the predetermined ranges, the cantilever model 200' is determined as normally functioning. If any of the differences is outside the predetermined range, the cantilever model 200' is determined as not normally functioning (out of order).

Instead of evaluating whether a difference between F1 and F2 is within a predetermined range and whether a difference between F2 and F3 is within a predetermined range, whether a difference between F1 and F3 is within a predetermined range and whether a difference between F2 and F3 is within a predetermined range may be evaluated.

In the cantilever model 200' in FIGS. 3, F2 and F3 do not completely correspond to each other due to a structure of the cantilever model 200'. That is, a first fixed part 221 side of the cantilever 210 is merely slightly displaced while a force receiving body 230 side of the cantilever 210 is relatively significantly displaced and thus there is a difference between F2 and F3. Setting the aforementioned predetermined ranges considering this difference allows for appropriately determining whether the cantilever model 200' is normally functioning.

Note that, in the cantilever model 200' illustrated in FIG. 3, the capacitance values of the first to fourth capacitive elements C11 to C22 are all equivalent and thus as apparent from the right sides of the aforementioned [Mathematical Formula 1] and [Mathematical Formula 2] values of F2 and F3 are substantially a half a value of F1. Therefore, upon comparison between F1 and F2 or F1 and F3, processing for appropriate execution of the comparison is performed such as multiplying F2 or F3 by two. This processing is to be appropriately performed according to the capacitance values of the first to fourth capacitive elements C11 to C22.

The above determination method will be described based on an actual detection circuit.

Figure 4:
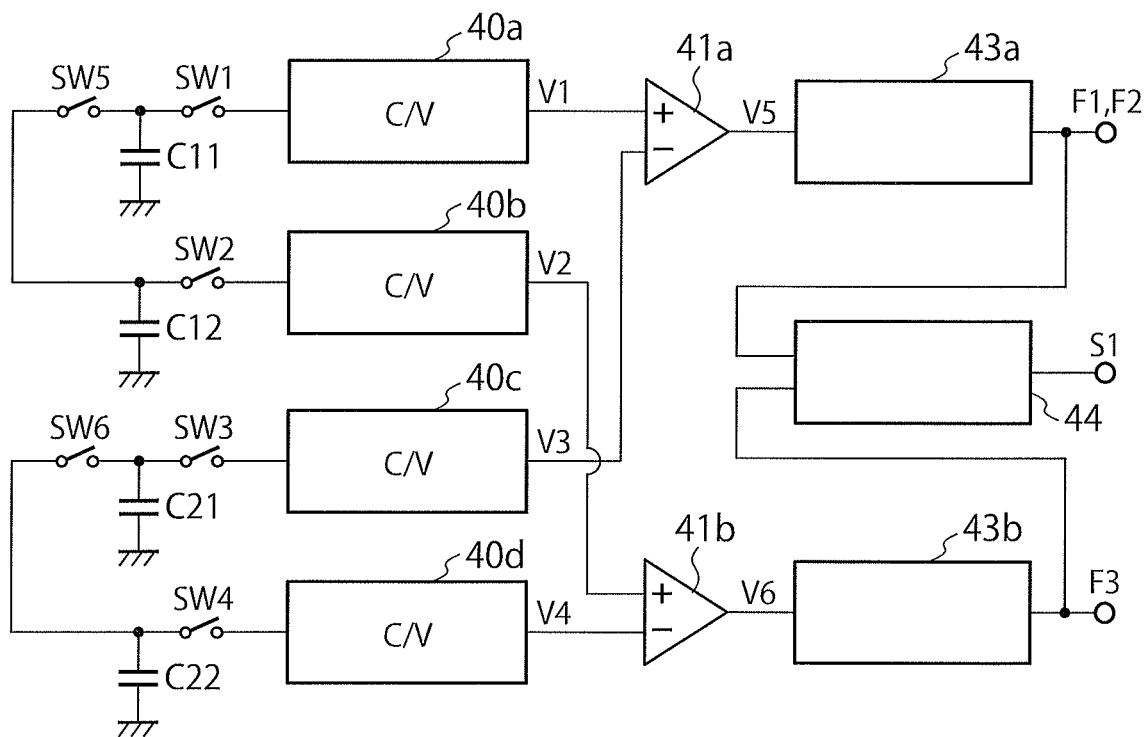
FIG. 4 is a circuit diagram illustrating an exemplary detection circuit for detecting force applied to a force receiving body in the cantilever model in FIG. 3.
Figures 5, 6:
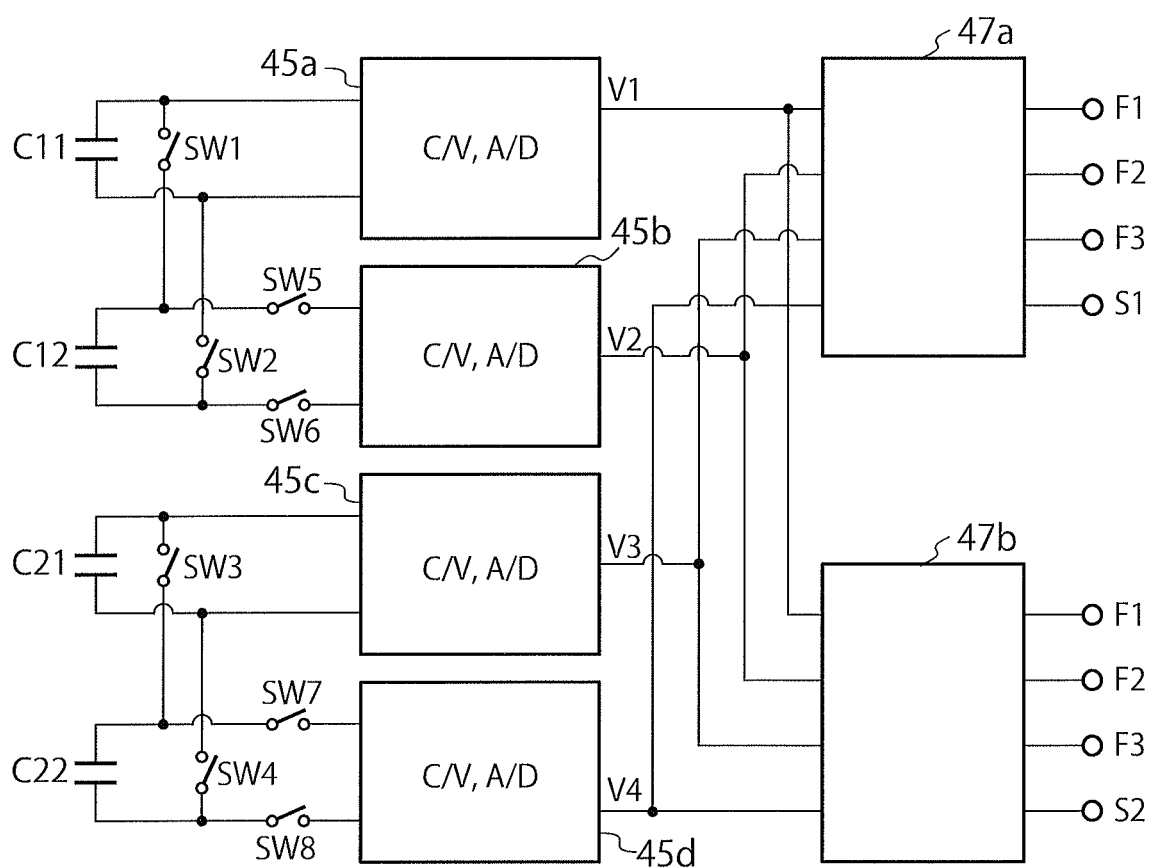
FIG. 5 is a table illustrating ON/OFF connection states of switches included in the detection circuit in FIG. 4.
FIG. 6 is a circuit diagram illustrating another exemplary detection circuit for detecting force applied to the force receiving body in the cantilever model in FIG. 3.

FIG. 4 is a circuit diagram illustrating an exemplary detection circuit for detecting force applied to the force receiving body 230 in the cantilever model 200' in FIG. 3. FIG. 5 is a table illustrating ON/OFF connection states of switches included in the detection circuit in FIG. 4.

In the circuit diagram in FIG. 4, the first capacitive element C11 and the second capacitive element C12 are aligned vertically and the third capacitive element C21 and the fourth capacitive element C22 are aligned vertically for convenience. As illustrated in FIG. 4, the first capacitive element C11 is selectively connected to a first C/V convertor 40a via a switch SW1, the second capacitive element C12 is selectively connected to a second C/V convertor 40b via a switch SW2, the third capacitive element C21 is selectively connected to a third C/V convertor 40c via a switch SW3, and the fourth capacitive element C22 is selectively connected to a third C/V convertor 40d via a switch SW4. Furthermore, the first capacitive element C11 and the second capacitive element C12 are selectively connected to each other via a switch SW5, and the third capacitive element C21 and the fourth capacitive element C22 are selectively connected to each other via a switch SW6.

The first to fourth C/V convertors 40a to 40d are circuits that convert capacitance values of the capacitive elements C11 to C22 to voltage values V1 to V4, respectively. The voltage values V1 to V4 after conversion correspond to the respective capacitance values. A first subtraction arithmetic unit 41a in FIG. 4 derives a difference of the voltage values "V1−V3 (=V5)" and outputs the difference to a first signal processing unit 43a. Similarly, a second subtraction arithmetic unit 41b derives a difference of the voltage values "V2−V4 (=V6)" and outputs the difference to a second signal processing unit 43b.

The first and the second signal processing units 43a and 43b are connected to a comparison unit 44 that compares output signals from the first and the second signal processing units 43a and 43b. Based on the output signal from the comparison unit 44 whether the cantilever model 200' is normally functioning is determined.

In order to detect force applied to the force receiving body 230, it is only required to control connection states of the switches SW1 to SW6 as described in a column of timing 1 in FIG. 5. That is, the switches SW1, SW3, SW5, and SW6 are turned on (connected) while the remaining switches SW2 and SW4 are turned off (disconnected). As a result of this, the outputs V1 to V4 from the first to fourth C/V convertors 40a to 40d are represented by the following mathematical formula.

$$V1=C11+C12$$

$$V2=0$$

$$V3=C21+C22$$

$$V4=0 \quad \text{[Mathematical Formula 3]}$$

Therefore, the outputs V5 and V6 from the first and the second subtraction arithmetic units 41a and 41b are represented by the following mathematical formula.

$$V5 = V1 - V3 = (C11 + C12) - (C21 + C22)$$

$$V6 = 0 \quad \text{[Mathematical Formula 4]}$$

From the above, V5 corresponds to "−F1" (see [Mathematical Formula 1]) and thus force F can be measured from connection states of the timing 1 in FIG. 5.

Next, in order to determine whether the cantilever model 200' illustrated in FIG. 3 is normally functioning, it is only required to control connection states of the switches SW1 to SW6 as described in a column of timing 2 in FIG. 5. That is, the switches SW1 to SW4 are turned on (connected) while the remaining switches SW5 to SW6 are turned off (disconnected). As a result of this, the outputs V1 to V4 from the first to fourth C/V convertors 40a to 40d are represented by the following mathematical formula.

$$V1 = C11$$

$$V2 = C12$$

$$V3 = C21$$

$$V4 = C22 \quad \text{[Mathematical Formula 5]}$$

Therefore, the outputs V5 and V6 from the first and the second subtraction arithmetic units 41a and 41b are represented by the following mathematical formula.

$$V5 = V1 - V3 = C11 - C21$$

$$V6 = V2 - V4 = C12 - C22 \quad \text{[Mathematical Formula 6]}$$

From the above, V5 corresponds to "−F2" and V6 corresponds to "−F3" (see [Mathematical Formula 2]) and thus F2 and F3 can be evaluated from connection states of the timing 2 in FIG. 5.

The comparison unit 44 in FIG. 4 further evaluates (a) whether "F1-F2" is within a predetermined range and (b) whether "F2-F3" is within a predetermined range. When at least one of the conditions (a) and (b) is not satisfied, the cantilever model 200' is determined as not normally functioning (out of order). In this case, a failure determination signal representing determination of failure is sent from an output terminal S1 in FIG. 4.

Switching between the timing 1 and the timing 2 of the switches SW1 to SW6 may be performed by a microcomputer. The connection states of the timing 1 and the timing 2 may be alternately switched by the same periods of time for example. Alternatively, the connection states of the timing 1 and the connection states of the timing 2 may be switched at a ratio of 100 to 1 in terms of a period of time for example and thereby measurement time of force F may be extended while time for failure diagnosis (timing 2) may be relatively shortened.

As described above, the force F acting on the force receiving body 230 can be evaluated by any of F1 to F3. However, a wider electrode area has a higher detection sensitivity and is superior in terms of stationary noise and thus it is preferable to measure by F1.

The comparison unit 44 in FIG. 4 may evaluate (c) whether "F1-F3" is within a predetermined range and (b) whether "F2-F3" is within a predetermined range and determine that the cantilever model 200' is not normally functioning (out of order) when at least one of the conditions (c) and (b) is not satisfied. Alternatively, the comparison unit 44 may evaluate (a) whether "F1-F2" is within a predetermined range and (c) whether "F1-F3" is within a predetermined range and determine that the cantilever model 200' is not normally functioning (out of order) when at least one of the conditions (a) and (c) is not within the predetermined range.

The detection circuit in FIG. 4 includes two systems of circuits for determining whether the cantilever model 200' is normally functioning and thus, for example, even when one of the four C/V convertors 40a to 40d fails, one of the two subtraction arithmetic units 41a and 41b fails, or one of the two signal processing units 43a and 43b fails, whether the cantilever model 200' is normally functioning can be determined.

Figures 7, 8, 9:
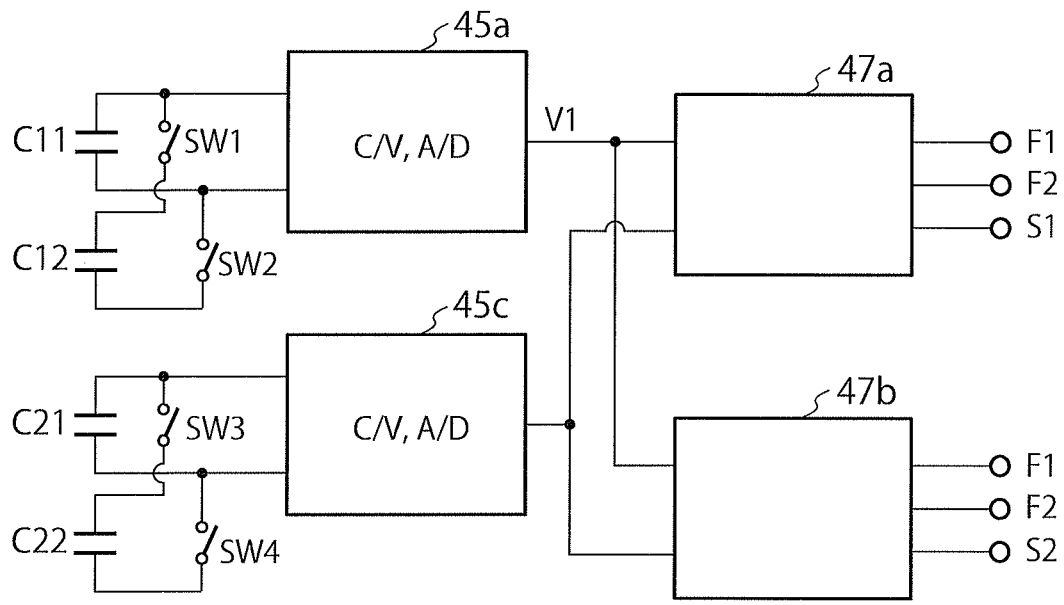
FIG. 7 is a table illustrating ON/OFF connection states of switches included in the detection circuit in FIG. 6.
FIG. 8 is a circuit diagram illustrating still another exemplary detection circuit for detecting force applied to the force receiving body in the cantilever model in FIG. 3.
FIG. 9 is a table illustrating ON/OFF connection states of switches included in the detection circuit in FIG. 8.

In the above exemplary detection circuit, the detection circuit is configured based on a feature that the first and the second capacitive elements C11 and C12 are connected in parallel and the third and the fourth capacitive elements C21 and C22 are connected in parallel, thereby allowing for addition of the respective two capacitive elements. In other examples, however, the first to fourth capacitive elements C11 to C22 may be independently subjected to C/V conversion. An exemplary circuit diagram of such a detection circuit is illustrated in FIG. 6. In FIG. 7, a table illustrating ON/OFF connection states of switches SW1 to SW8 included in the detection circuit in FIG. 6 is illustrated.

In order to detect force F applied to the force receiving body 230 by the detection circuit in FIG. 6, it is only required to control connection states of the switches SW1 to SW8 as described in a column of timing 1 in FIG. 7. That is, the switches SW1 to SW4 are turned on (connected) while the remaining switches SW5 to SW8 are turned off (disconnected). As a result of this, an output signal corresponding to "C11+C12" and an output signal corresponding to "C21+C22" are provided to a first microcomputer 47a and a second microcomputer 47b in FIG. 6 via first to fourth C/V convertors and A/D convertors 45a to 45d. The first and the second microcomputers 47a and 47b calculate F1, that is, "(C21+C22)−(C11+C12)" based on the output signals and measures force F.

Next, in order to determine whether the cantilever model 200' is normally functioning, it is only required to control connection states of the switches SW1 to SW8 as described in a column of timing 2 in FIG. 7. That is, the switches SW1 to SW4 are turned off (disconnected) while the remaining switches SW5 to SW8 are turned on (connected). As a result of this, output signals corresponding to "C11", "C12", "C21", and "C22" are provided to the first microcomputer 47a and the second microcomputer 47b in FIG. 6. The first and the second microcomputers 47a and 47b calculate F2 and F3, that is, "C11−C21" and "C12−C22" based on the output signals and evaluates force F.

The first and the second microcomputers 47a and 47b further evaluate, for example, (a) whether "F1-F2" is within a predetermined range and (b) whether "F2-F3" is within a predetermined range. When at least one of the conditions (a) and (b) is not satisfied, the cantilever model 200' is determined as not normally functioning (out of order). In this case, a failure determination signal representing determination of failure is output from output terminals S1 and S2 in FIG. 6. In the detection circuit illustrated in FIG. 6, the two microcomputers 47a and 47b are used. This is to allow one of the microcomputers to output force applied to the force receiving body 230 and a failure determination signal even when the other microcomputer fails. A user of the present sensor can further compare F1 to F3 and a failure determination signal output from the first microcomputer 47a and F1 to F3 and a failure determination signal output from the second microcomputer 47*b*, respectively, thus allowing for confirming reliability of the signals output from the detection circuit.

Of course also in this case, the comparison unit 44 may evaluate (c) whether "F1-F3" is within a predetermined range and (b) whether "F2-F3" is within a predetermined range and determine that the cantilever model 200' is not normally functioning (out of order) when at least one of the conditions (c) and (b) is not satisfied. Alternatively, the comparison unit 44 may evaluate (a) whether "F1-F2" is within a predetermined range and (c) whether "F1-F3" is within a predetermined range and determine that the cantilever model 200' is not normally functioning (out of order) when at least one of the conditions (a) and (c) is not within the predetermined range.

Note that only with F1 and F2, detection of force applied to the force receiving body 230 and determination as to whether the cantilever model 200' is normally functioning can be performed. FIG. 8 is a circuit diagram illustrating still another exemplary detection circuit for detecting force applied to the force receiving body 230 in the cantilever model 200' illustrated in FIG. 3. FIG. 9 is a table illustrating ON/OFF connection states of switches included in the detection circuit in FIG. 8.

In the detection circuit illustrated in FIG. 8, the second C/V convertor and A/D convertor 45*b* selectively connected to the second capacitive element C12 via the switches SW5 and SW6 and the fourth C/V convertor and A/D convertor 45*d* selectively connected to the fourth capacitive element C22 via the switches SW7 and SW8 are excluded from the detection circuit illustrated in FIG. 6.

In order to detect force F applied to the force receiving body 230 by the detection circuit illustrated in FIG. 8, it is only required to control connection states of the switches SW1 to SW4 as described in a column of timing 1 in FIG. 9. That is, the switches SW1 to SW4 are all turned on (connected). As a result of this, an output signal corresponding to "C11+C12" and an output signal corresponding to "C21+C22" are provided to a first microcomputer 47*a* and a second microcomputer 47*b* in FIG. 8. The first and the second microcomputers 47*a* and 47*b* calculate F1, that is, "(C21+C22)−(C11+C12)" based on the output signals and evaluates force F1.

Next, in order to determine whether the cantilever model 200' is normally functioning, it is only required to control connection states of the switches SW1 to SW4 as described in a column of timing 2 in FIG. 9. That is, the switches SW1 to SW4 are all turned off (disconnected). As a result of this, output signals corresponding to "C11" and "C21" are provided to the first microcomputer 47*a* and the second microcomputer 47*b* in FIG. 8. The first and the second microcomputers 47*a* and 47*b* calculate F2, that is, "(C11−C21)" based on the output signals.

The first and the second microcomputers 47*a* and 47*b* further evaluates whether "F1-F2" is within a predetermined range. When "F1-F2" is not within the predetermined range, the cantilever model 200' is determined as not normally functioning (out of order). In this case, a failure determination signal representing determination of failure is output from output terminals S1 and S2 in FIG. 8.

Next, a torque sensor of the present invention utilizing the above principles of failure diagnosis will be described.

<<<§ 1. Basic Structural Portion of the Torque Sensor According to the Present Invention>>>

Figure 10:
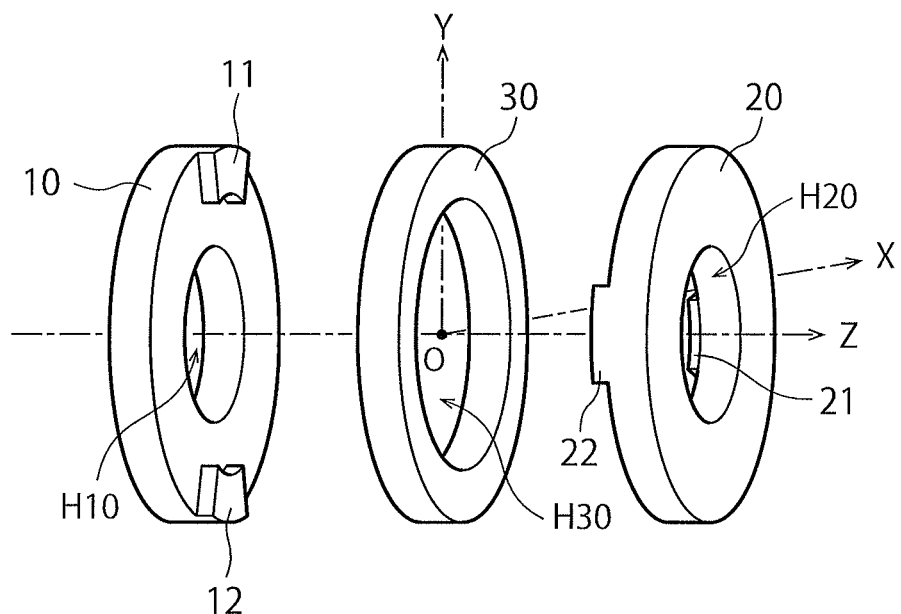
FIG. 10 is an exploded perspective view of a basic structural portion of a torque sensor according to a basic embodiment of the present invention.

FIG. 10 is an exploded perspective view of a basic structural portion of a torque sensor according to a basic embodiment of the present invention. As illustrated, this basic structural portion is configured by arranging a ring-shaped deformation body 30 between a left-side supporting body 10 and a right-side supporting body 20 and joining the three components together. Here an X-Y-Z three-dimensional coordinate system is defined as illustrated for the descriptions below for convenience. A Z axis illustrated in the horizontal direction in FIG. 10 corresponds to an axis of rotation of a torque to be detected. This torque sensor implements a function to detect torque around the axis of rotation (around the Z axis).

The ring-shaped deformation body 30 arranged in the center in FIG. 10 is made of a material elastically deformable by action of a torque to be detected and is formed with, at an inner portion thereof, a through opening H30 through which the axis of rotation (Z axis) passes. The left-side supporting body 10 arranged on a left side in FIG. 10 is a member supporting a left side surface of the ring-shaped deformation body 30. The right-side supporting body 20 arranged on a right side in FIG. 10 is a member supporting a right side surface of the ring-shaped deformation body 30. In the case of the basic embodiment illustrated here, the left-side supporting body 10 is a ring-shaped member formed with a through opening H10 through which the axis of rotation (Z axis) passes. The right-side supporting body 20 is a ring-shaped member formed with a through opening H20 through which the axis of rotation (Z axis) passes.

Although a right side and a left side generally are concepts that have a meaning only when viewed from a specific observation direction, for convenience of descriptions, the supporting body arranged at a position adjacent to the left side of the ring-shaped deformation body 30 is called the left-side supporting body 10 while the supporting body arranged at a position adjacent to the right side of the ring-shaped deformation body 30 is called the right-side supporting body 20 when viewed from a reference observation direction where the axis of rotation (Z axis) forms a horizontal line extending in the right and left (observation direction where a direction in the right is a positive direction in the Z axis) as illustrated in FIG. 10.

The origin O of the X-Y-Z three-dimensional coordinate system is defined at the central position of the ring-shaped deformation body 30. All of the left-side supporting body 10, the ring-shaped deformation body 30, and the right-side supporting body 20 are formed by ring-shaped members having the Z axis as the central axis thereof. More specifically, the ring-shaped deformation body 30 is formed by a ring-shaped member obtained by forming, in the central portion of a disk arranged with the Z axis (axis of rotation) as the central axis thereof, the through opening H30 having a concentric disk shape having a smaller diameter. Similarly, the left-side supporting body 10 and the right-side supporting body 20 are also formed by a ring-shaped member obtained by forming, in the central portion of a disk arranged with the Z axis (axis of rotation) as the central axis thereof, the through opening H10 or H20 having a concentric disk shape having a smaller diameter. Of course the through openings H10 and H20 may not be included and the left-side supporting body 10 and the right-side supporting body 20 may be a disk.

Meanwhile, a right side surface of the left-side supporting body 10 is provided with two fan-shaped projecting portions 11 and 12 projecting rightward. Top surfaces of these projecting portions 11 and 12 are joined to the left side surface of the ring-shaped deformation body 30. As illustrated, the projecting portion 11 is joined to an upper portion (portion positioned in a positive direction in the Y axis) of the ring-shaped deformation body 30 and the projecting portion 12 is joined to a lower portion (portion positioned in a negative direction in the Y axis) of the ring-shaped deformation body 30. Similarly, a left side surface of the right-side supporting body 20 is provided with two fan-shaped projecting portions 21 and 22 projecting leftward. Top surfaces of these projecting portions 21 and 22 are joined to the right side surface of the ring-shaped deformation body 30. As illustrated, the projecting portion 21 is joined to a posterior portion (portion positioned in a positive direction in the X axis) of the ring-shaped deformation body 30 and the projecting portion 22 is joined to an anterior portion (portion positioned in a negative direction in the X axis) of the ring-shaped deformation body 30.

Figure 11:
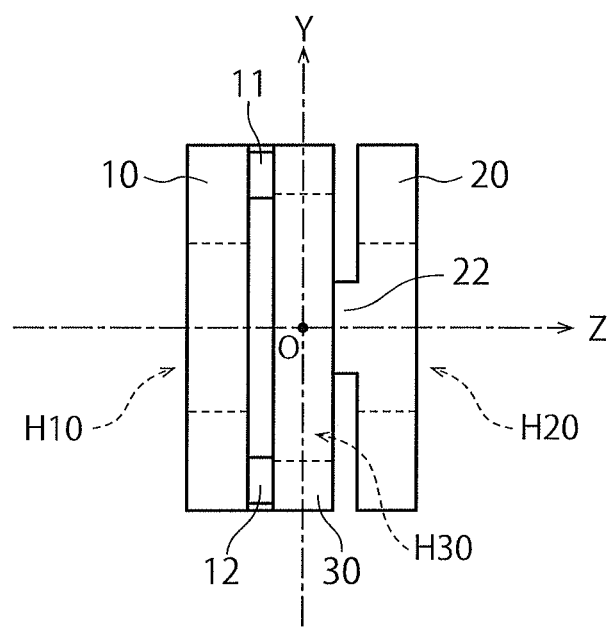
FIG. 11 is a side view of the basic structural portion of the torque sensor obtained by joining three components illustrated in FIG. 10 together.
Figure 12:
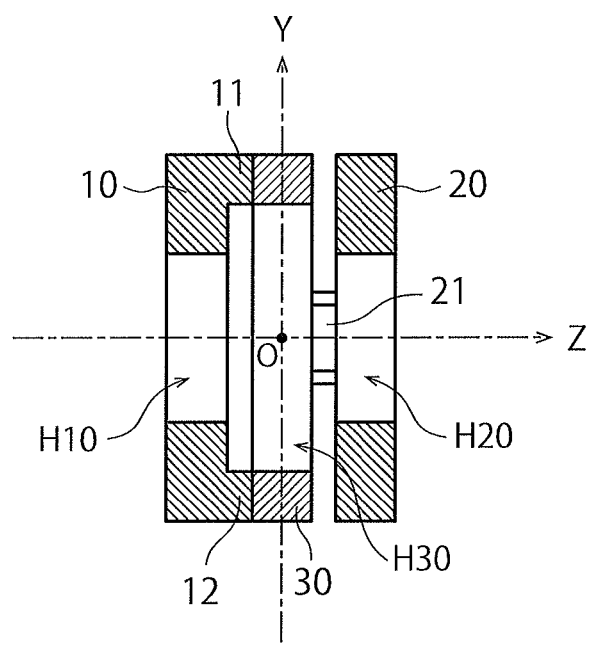
FIG. 12 is a cross-sectional side view of the basic structural portion illustrated in FIG. 11 taken along a Y-Z plane.

FIG. 11 is a side view of the basic structural portion of the torque sensor obtained by joining the three components illustrated in FIG. 10 together. FIG. 12 is a cross-sectional side view of the basic structural portion taken along a Y-Z plane. In the example illustrated here, as illustrated in FIG. 12, the projecting portions 11 and 12 are structural bodies integral with the left-side supporting body 10 with the top surfaces thereof joined to the left side surface of the ring-shaped deformation body 30. Similarly, the projecting portions 21 and 22 are structural bodies integral with the right-side supporting body 20 with the top surfaces thereof joined to the right side surface of the ring-shaped deformation body 30.

As a result, the projecting portions 11 and 12 function as left-side connection members that connect left-side connection points on the left-side side surface of the ring-shaped deformation body 30 opposite to the left-side supporting body 10 with the left-side supporting body 10. The projecting portions 21 and 22 function as right-side connection members that connect right-side connection points on the right-side side surface of the ring-shaped deformation body 30 opposite to the right-side supporting body 20 with the right-side supporting body 20.

Figure 13:
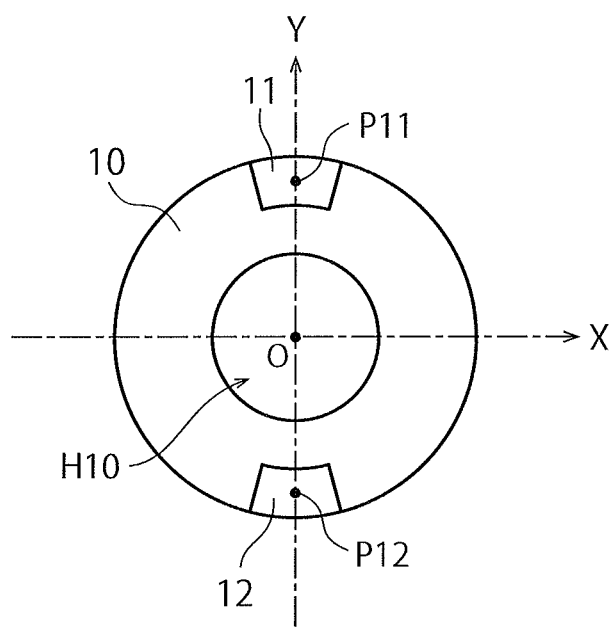
FIG. 13 is a front view of a left-side supporting body and projecting portions thereof illustrated in FIG. 10 when viewed from the right in FIG. 10.
Figure 14:
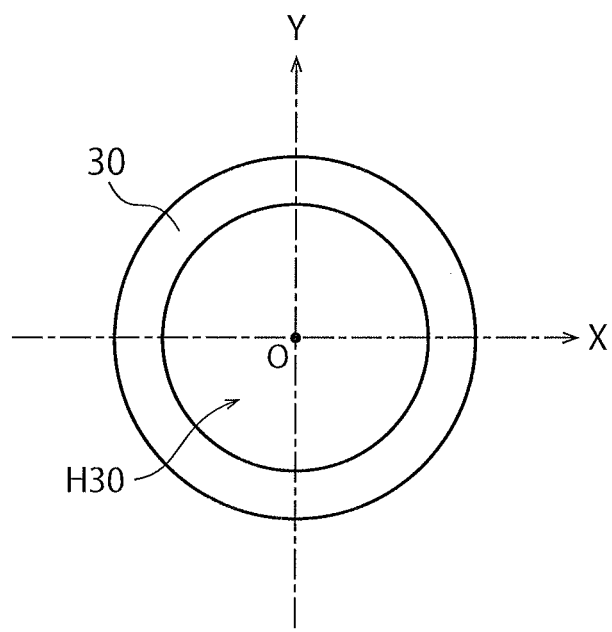
FIG. 14 is a front view of a ring-shaped deformation body illustrated in FIG. 10 when viewed from the right in FIG. 10.
Figure 15:
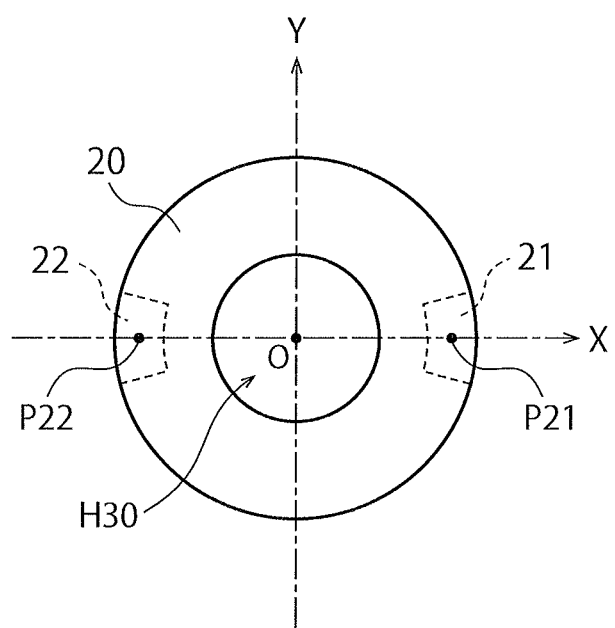
FIG. 15 is a front view of a right-side supporting body and projecting portions thereof illustrated in FIG. 10 when viewed from the right in FIG. 10.

FIG. 13 is a front view of the left-side supporting body 10 and the projecting portions 11 and 12 when viewed from the right in FIG. 10. FIG. 14 is a front view of the ring-shaped deformation body 30 when viewed from the right in FIG. 10. FIG. 15 is a front view of the right-side supporting body 20 and the projecting portions 21 and 22 when viewed from the right in FIG. 10. In FIG. 13, points P11 and P12 illustrated at the central positions of the projecting portions 11 and 12 are the left-side connection points and are used for explaining connection positions with the ring-shaped deformation body 30 in § 2. Similarly in FIG. 15, points P21 and P22 illustrated at the central positions of the projecting portions 21 and 22 are the right-side connection points and are used for explaining connection positions with the ring-shaped deformation body 30 in § 2.

It is preferable that parts illustrated in FIG. 13 (the left-side supporting body 10 and the projecting portions 11 and 12) and parts illustrated in FIG. 13 (the right-side supporting body 20 and the projecting portions 21 and 22) are actually entirely the same. In this case, the parts illustrated in FIG. 13 turned around by 180 degrees about the Y axis as an axis of rotation and further turned by 90 degrees about the Z axis as an axis of rotation completely corresponds to the parts illustrated in FIG. 15. Therefore actually, when two sets of parts illustrated in FIG. 13 are prepared and a set of parts illustrated in FIG. 14 is prepared, the basic structural portion illustrated in FIG. 11 can be configured.

As illustrated in FIG. 14, the ring-shaped deformation body includes the round through opening H30, which is for generating elastic deformation necessary for detection. As will be described later, when a torque to be detected acts on this basic structural portion, the ring-shaped deformation body 30 is required to be deformed into an elliptical shape. Likeliness of elastic deformation of the ring-shaped deformation body 30 serves as a parameter that affects detection sensitivity of the sensor. Using a ring-shaped deformation body 30 likely to be elastically deformed allows for implementing a sensor with high sensitivity capable of detecting minute torque but suppresses the maximum value of detectable torque. Conversely, using the ring-shaped deformation body 30 unlikely to be elastically deformed allows the maximum value of detectable torque to be large. However, minute torque cannot be detected since sensitivity decreases.

Likeliness of elastic deformation of the ring-shaped deformation body 30 depends on the thickness in the Z axis direction (the thinner the more likely to be elastically deformed) and the diameter of the through opening H30 (the larger the more likely to be elastically deformed) and further depends on a material thereof. Practically, therefore, dimensions of the portions of or a material of the ring-shaped deformation body 30 may be selected as appropriate according to usage of the torque sensor.

Meanwhile the left-side supporting body 10 and the right-side supporting body 20 are not necessarily members subjected to elastic deformation according to the detection principles of the present invention. Moreover, in order to allow the acting torque to contribute 100% to deformation of the ring-shaped deformation body 30, the left-side supporting body 10 and the right-side supporting body 20 are preferably complete rigid bodies. In the example illustrated, the reason for using the ring-shaped structural bodies having the through openings H10 and H20 in the central portions thereof as the left-side supporting body 10 and the right-side supporting body 20 is not because of causing elastic deformation but to secure a insertion hole penetrating through the through openings H10, H30, and H20 of the left-side supporting body 10, the ring-shaped deformation body 30, and the right-side supporting body 20 along the axis of rotation (Z axis).

As apparent from the cross-sectional side view in FIG. 12, this basic structural portion is hollow in the internal portion. When a torque sensor having such a hollow portion is used while incorporated into a joint part of a robot arm, a speed reducer or other items can be arranged in this hollow portion. This allows for designing a robot arm that generally saves a space. This is an advantage that has been difficult to implement by a conventional torque sensor utilizing torsion of a torsion bar having a solid round bar shape.

In this manner, in the torque sensor according to the present invention, the ring-shaped deformation body 30 is required to be made of a material that causes elastic deformation of a degree necessary for detection of torque; however, the left-side supporting body 10 and the right-side supporting body 20 are not required to cause elastic deformation but are preferably made of a material having high rigidity. Practically, a synthetic resin such as plastic suffices as a material of the left-side supporting body 10, the right-side supporting body 20, and the ring-shaped deformation body 30 if an insulating material is used and, if a conductive material is used (In this case insulating processing is required at appropriate portions to avoid short-circuiting of electrodes. This will be described later.), a metal such as stainless steel and aluminum suffices. Of course an insulating material and a conductive material may be used in combination.

All of the left-side supporting body 10, the right-side supporting body 20, and the ring-shaped deformation body 30 may be a flat structural body having a thin thickness in the axial direction and thus an axial length of the entire sensor can be short. Detection of torque is performed by displacement of the shape of the ring-shaped deformation body 30. Therefore, although a material that causes elastic deformation is required for the ring-shaped deformation body 30, even if a material having relatively high rigidity is used, detection with a high accuracy is possible.

<<<§ 2. Principles for Detecting Torque According to the Present Invention>>>

Figure 16:
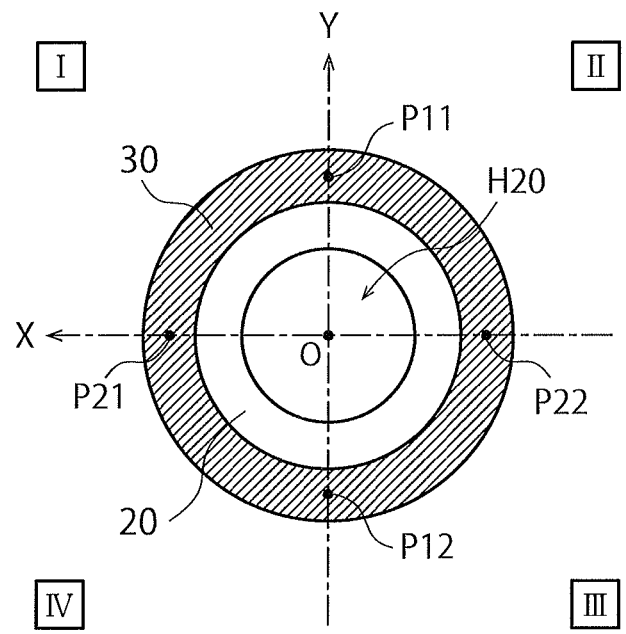
FIG. 16 is a cross-sectional view of the basic structural portion illustrated in FIG. 11 taken along an X-Y plane when viewed from the left in FIG. 11.

Next, how the respective portions are deformed when torque acts on the basic structural portion as described in § 1 will be examined. FIG. 16 is a cross-sectional view of the basic structural portion illustrated in FIG. 11 taken along an X-Y plane when viewed from the left in FIG. 11. Note that an X-Y coordinate system illustrated in FIG. 16 is the normal X-Y coordinate system seen from the back (the positive direction in the X axis is on the left in the diagram). In this X-Y coordinate system, therefore, an upper left region is a first quadrant, an upper right region is a second quadrant, a lower right region is a third quadrant, and a lower left region is a fourth quadrant. Symbols I to IV in the diagram represent the quadrants in this coordinate system. A hatched portion in the cross section in FIG. 16 corresponds to the ring-shaped deformation body 30, behind which the right-side supporting body 20 is illustrated. Points P11 to P22 in FIG. 16 are orthogonal projections of the connection points P11 to P22 illustrated in FIGS. 13 and 15 on the X-Y plane.

That is, in FIG. 16, the points P11 and P12 arranged on the Y axis represent joined positions (central points of joined surfaces) of the projecting portions 11 and 12 of the left-side supporting body 10. The points P21 and P22 arranged on the X axis represent joined positions (central points of joined surfaces) of the projecting portions 21 and 22 of the right-side supporting body 20. The left side surface of the ring-shaped deformation body 30 is joined to the left-side supporting body 10 at the two connection points P11 and P12 along the Y axis while the right side surface of the ring-shaped deformation body 30 is joined to the right-side supporting body 20 at the two connection points P21 and P22 along the X axis.

In this manner, the upper and lower two portions of the ring-shaped deformation body 30 are joined to the left-side supporting body 10 while the right and left two portions of the ring-shaped deformation body 30 are joined to the right-side supporting body 20 such that the respective connection points are shifted by 90 degrees from each other. This allows the ring-shaped deformation body 30 to be efficiently deformed due to action of torque.

In the example illustrated in FIG. 16, when the both side surfaces of the ring-shaped deformation body 30 are projected on the X-Y plane to obtain orthogonal projections thereof, a projection of a first right-side connection point P21 is arranged on the positive X axis, a projection of a second right-side connection point P22 is arranged on the negative X axis, a projection of a first left-side connection point P11 is arranged on the positive Y axis, and a projection of a second left-side connection point P12 is arranged on the negative Y axis. Such arrangements allow the ring-shaped deformation body 30 to be deformed into an ellipse having axial symmetry and thus detection values having axial symmetry can be obtained.

The torque sensor according to the present invention detects torque (rotational moment) applied relatively between the left-side supporting body 10 and the right-side supporting body 20 in the basic structural portion illustrated in FIG. 11. The detected value represents force acting relatively between the supporting bodies 10 and 20. For convenience of descriptions, rotational moment applied to the left-side supporting body 10 while a load is applied to the right-side supporting body 20 is considered as a torque to be detected (of course considering, as a torque to be detected, rotational moment applied to the right-side supporting body 20 while a load is applied to the left-side supporting body 10 is also equivalent).

For example, an example where a driving source such as a motor is attached to the left-side supporting body 10 and a robot hand is attached to the right-side supporting body 20 will be examined as an example of using this torque sensor at a joint part of a robot arm. When rotational driving force is applied to the left-side supporting body 10 from the driving source while the robot hand grasps an object with weight, this rotational driving force is transferred to the robot hand side via the basic structural portion that forms the joint part. In this case, torque that rotationally drives the right-side supporting body 20 acts. This torque corresponds to rotational moment applied to the left-side supporting body 10 while the right-side supporting body 20 is fixed.

Changes brought about the structural body illustrated in FIG. 16 by such rotational moment will be examined. When the right-side supporting body 20 is fixed, positions of the connection points P21 and P22 on the X axis illustrated in FIG. 16 are fixed. If rotational moment is applied to the left-side supporting body 10 in a clockwise direction for example in FIG. 16, the connection points P11 and P12 on the Y axis move clockwise. Inevitability, an arc P21-P11 portion positioned at the first quadrant I shrinks inward, an arc P11-P22 portion positioned at the second quadrant II extends outward, an arc P22-P12 portion positioned at the third quadrant III shrinks inward, and an arc P12-P21 portion positioned at the fourth quadrant IV extends outward.

Figure 17:
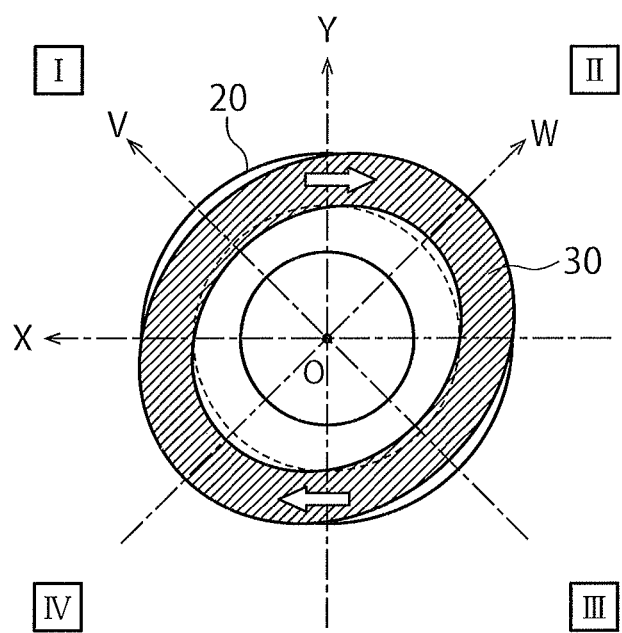
FIG. 17 is a cross-sectional view on the X-Y plane illustrating a deformation state of the basic structural portion illustrated in FIG. 11 when torque acts thereon around a Z axis in a positive direction. (The basic structural portion illustrated in FIG. 11 is taken along the X-Y plane and viewed from the left in FIG. 11. Broken lines illustrate a state before deformation.)

FIG. 17 is a cross-sectional view illustrating the structural body illustrated in FIG. 16 where such changes are occurring. That is, FIG. 17 is a cross-sectional view of the basic structural portion taken along the X-Y plane and viewed from the left in FIG. 11 when torque acts on the basic structural portion illustrated in FIG. 11 around the Z axis in a positive direction. In the present application, regarding a desired coordinate axis, a rotation direction for a right-hand screw to proceed in a positive direction in the coordinate axis is defined as a positive direction and a rotation direction for a right-hand screw to proceed in a negative direction in the desired coordinate axis is defined as a negative direction. In FIG. 17, therefore, torque around the Z axis in a positive direction is torque acting in the clockwise direction as illustrated by white arrows in the diagram.

A broken line drawn in FIG. 17 illustrates a state before deformation of the ring-shaped deformation body 30 (state in FIG. 16). Referring to this broken line, it is easy to grasp that the ring-shaped deformation body 30 is deformed into an elliptical shape due to action of torque around the Z axis in a positive direction. A V axis and a W axis that pass through the origin O and form 45 degrees to the X axis and the Y axis are defined on the X-Y plane for convenience of descriptions. The V axis is a coordinate axis having the first quadrant I in a positive direction thereof and the W axis is a coordinate axis having the second quadrant II in a positive direction thereof. As illustrated, the ring-shaped deformation body 30 is deformed into an ellipse having a minor axis in the V axis direction and a major axis in the W axis direction and has axial symmetry with respect to the V axis and the W axis. Such axial symmetry is advantageous when a detection value of torque is obtained by a method described in § 3.

In the embodiment illustrated, the reason why deformation having axial symmetry occurs is because, as illustrated in FIG. 16, the ring-shaped deformation body 30 has a complete round shape without a load thereon (no torque is acting) and that, when the both side surfaces of the ring-shaped deformation body 30 are projected on the X-Y plane to obtain orthogonal projections thereof, a projection of the first right-side connection point P21 is arranged on the positive X axis, a projection of the second right-side connection point P22 is arranged on the negative X axis, a projection of the first left-side connection point P11 is arranged on the positive Y axis, and a projection of the second left-side connection point P12 is arranged on the negative Y axis.

As the acting torque is large, the flatter an ellipse the ring-shaped deformation body 30 is deformed into. In FIG. 17, therefore, if a distance between a portion of the ring-shaped deformation body 30 positioned on the V axis and the origin O or a distance between a portion of the ring-shaped deformation body 30 positioned on the W axis and the origin O can be measured (these distances are information representing a displacement amount from the position before deformation as illustrated in the broken line), the magnitude of acting torque can be obtained. In other words, it is only required to measure displacement in a radial direction of the inner peripheral surface or the outer peripheral surface of the ring-shaped deformation body 30.

Meanwhile when torque acts in the opposite direction, that is, torque around the Z axis in a negative direction acts, counterclockwise rotation force acts on (the connection points P11 and P12 of) the ring-shaped deformation body 30 conversely to the example illustrated in FIG. 17. The ring-shaped deformation body 30 is therefore deformed into an ellipse having a major axis in the V axis direction and a minor axis in the W axis direction. Therefore, a displacement direction of the portion of the ring-shaped deformation body 30 positioned on the V axis or the portion positioned on the W axis is opposite to that in the example illustrated in FIG. 17.

Measuring displacement of the portion of the ring-shaped deformation body 30 positioned on the V axis or the portion positioned on the W axis allows for detecting both a direction and the magnitude of the acting torque. For example when positions of intersections between the inner peripheral surface of the ring-shaped deformation body 30 and the V axis are monitored, inward displacement from the reference position illustrated in the broken line can be determined as torque applied around the Z axis in a positive direction and outward displacement can be determined as torque applied around the Z axis in a negative direction. Alternatively, when positions of intersections between the inner peripheral surface of the ring-shaped deformation body 30 and the W axis are monitored, outward displacement from the reference position illustrated in the broken line can be determined as torque applied around the Z axis in a positive direction and inward displacement can be determined as torque applied around the Z axis in a negative direction. It should be understood that an absolute value of the displacement amount represents the magnitude of the acting torque.

Displacement of the ring-shaped deformation body 30 in a radial direction occurring in the torque sensor according to the present invention may be relatively large displacement depending on a diameter of the ring-shaped deformation body even if a torsion angle occurring in the ring-shaped deformation body 30 is small. Therefore, even if a ring-shaped deformation body 30 having relatively high rigidity is used, detection of torque with sufficient sensitivity is made possible.

The above is the principles for detecting torque according to the present invention. In the present invention, in order to perform torque detection based on such principles, capacitive elements and a detection circuit are further added to the basic structural portion having been described above.

<<<§ 3. Capacitive Element and Detection Circuit>>>

In the present invention, a torque sensor is configured by further adding capacitive elements and a detection circuit to the basic structural portion illustrated in FIG. 3 as described above. As illustrated in FIG. 17, the ring-shaped deformation body 30 is deformed into an ellipse due to action of torque. Portions having the largest displacement due to such deformation include a portion of a ring-shaped deformation body 30 positioned on a V axis or a portion positioned on a W axis. Therefore, in order to measure an amount of deformation (magnitude of acting torque) of the ring-shaped deformation body 30 based on displacement at a specific portion thereof, measuring displacement at the portion positioned on the V axis or the portion positioned on the W axis is most efficient.

Figure 18:
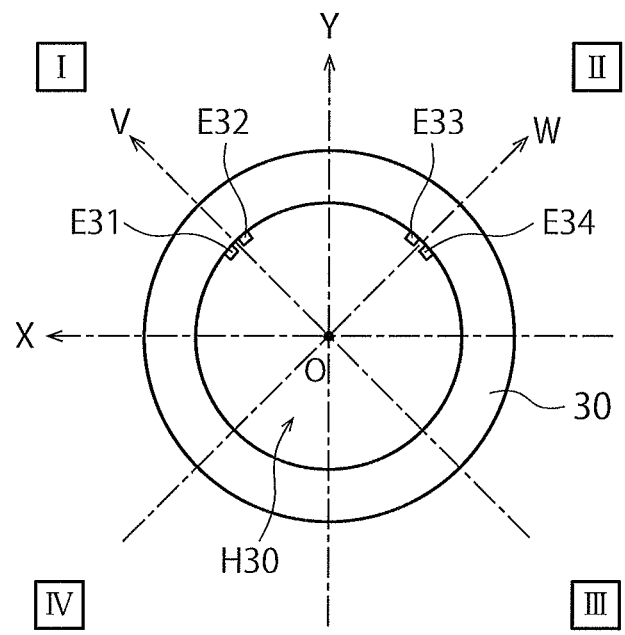
FIG. 18 is a plan view of a ring-shaped deformation body formed with displacement electrodes on an inner peripheral surface thereof when viewed from the left in FIG. 11.

In the embodiment described here, therefore, a displacement electrode is formed in a region of an inner peripheral surface of the ring-shaped deformation body 30 positioned on the V axis and a region thereof positioned on the W axis. FIG. 18 is a plan view of a ring-shaped deformation body 30 formed with displacement electrodes E31 to E34 on an inner peripheral surface thereof when viewed from the left in FIG. 11. For convenience of descriptions, an X, a Y, a V, and a W axes are drawn together. The displacement electrodes E31 and E32 are formed in a region of intersection between the positive region of the V axis and the inner peripheral surface of the ring-shaped deformation body 30. The displacement electrodes E33 and E34 are formed in a region of intersection between the positive region of the W axis and the inner peripheral surface of the ring-shaped deformation body 30. More specifically, the displacement electrodes E31 and E32 are symmetrically arranged near the V axis while interposing the V axis and the displacement electrodes E33 and E34 are arranged symmetrically with respect to the W axis while interposing the W axis as confirmed from FIG. 11. A depth dimension of these displacement electrodes E31 to E34 (dimension in a direction perpendicular to the paper plane in FIG. 18) is equivalent to a depth dimension of the ring-shaped deformation body 30. In the case of this example, the displacement electrodes E31 to E34 are formed on the inner peripheral surface of the ring-shaped deformation body 30 by a conductive layer such as a metal film formed by a method such as vapor evaporation or plating. When the ring-shaped deformation body 30 is made of metal such as aluminum or stainless steel, the ring-shaped deformation body 30 itself is conductive and thus of course the displacement electrodes E31 to E34 are required to be formed via an insulating layer.

Figure 19:
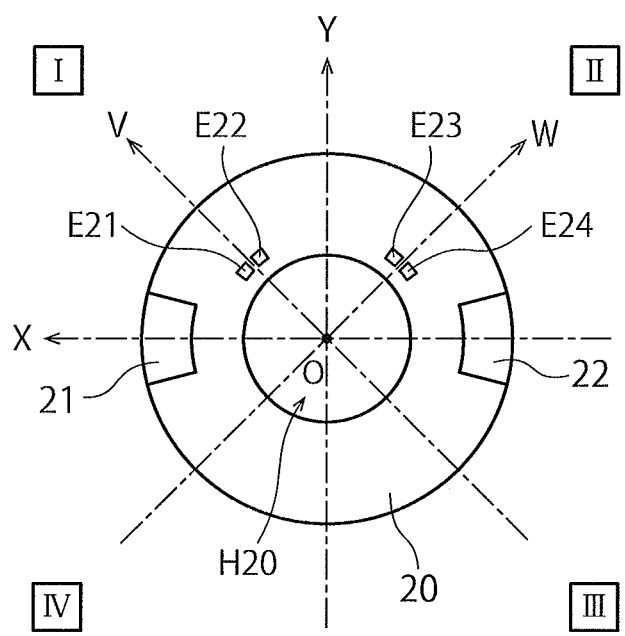
FIG. 19 is a plan view of a right-side supporting body attached with fixed electrodes when viewed from the left in FIG. 11.

At positions opposite to the displacement electrodes E31 to E34, fixed electrodes E21 to E24 are provided, respectively, and fixed to the right-side supporting body 20. FIG. 19 is a plan view of a right-side supporting body 20 attached with fixed electrodes E21 to E24 when viewed from the left in FIG. 11. For convenience of descriptions, an X, a Y, a V, and a W axes are drawn together. The fixed electrodes E21 and E22 are arranged in the positive region of the V axis and are opposite to the displacement electrodes E31 and E32, respectively. The fixed electrodes E23 and E24 are arranged in the positive region of the W axis and are opposite to the displacement electrodes E33 and E34, respectively.

Figure 20:
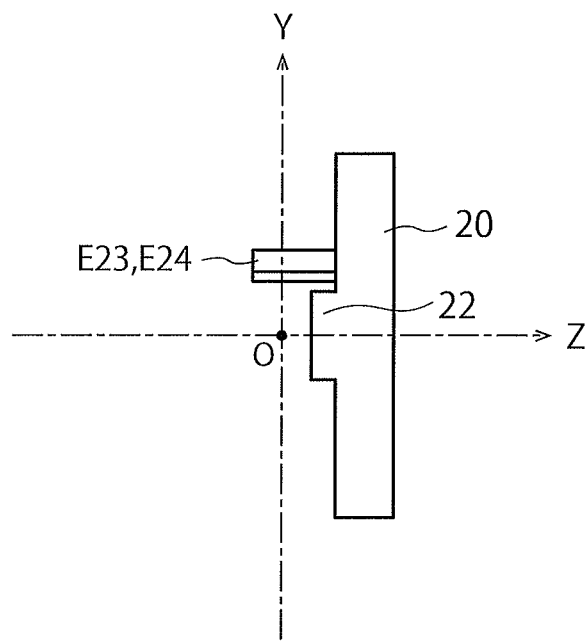
FIG. 20 is a side view of the right-side supporting body illustrated in FIG. 19.

FIG. 20 is a side view of the right-side supporting body 20 illustrated in FIG. 19. As illustrated, the fixed electrodes E23 and E24 are formed by a conductive plate protruding from a left side surface of the right-side supporting body 20 in a direction along the axis of rotation (in a negative direction in the Z axis). Note that the fixed electrodes E21 and E22 are hidden behind the fixed electrodes E23 and E24 and thus do not appear in FIG. 20.

Figure 21:
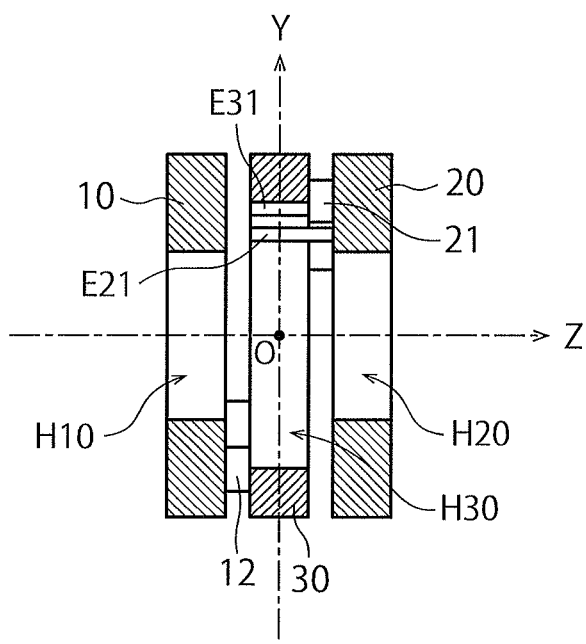
FIG. 21 is a cross-sectional side view of a structural body in which the basic structural portion illustrated in FIG. 12 is added with the displacement electrodes and the fixed electrodes taken along a V-Z plane (an upper side in FIG. 21 corresponds to a V axis direction in FIGS. 18 and 19).

FIG. 21 is a cross-sectional side view of a structural body in which the basic structural portion illustrated in FIG. 12 is added with the displacement electrodes and the fixed electrodes taken along a V-Z plane. FIG. 21 is the cross-sectional side view taken along the V-Z plane while FIG. 12 is the cross-sectional side view taken along the Y-Z plane and thus an upper side in FIG. 21 is not in the Y axis direction but in the V axis direction illustrated in FIGS. 18 and 19. The cross-sectional side view in FIG. 21 clearly illustrates the displacement electrode E31 and the fixed electrode E21 arranged on the V axis opposite to each other. The displacement electrodes E31 to E34 are fixed to the inner peripheral surface of the ring-shaped deformation body 30 and thus are displaced dependent on deformation of the ring-shaped deformation body 30. The fixed electrodes E21 to E24 are fixed to the right-side supporting body 20 at a right end thereof and thus remain in a certain position at all times regardless of deformation of the ring-shaped deformation body 30.

As a result, a relative position of the displacement electrode E31 to the fixed electrode E21 and a relative position of the displacement electrode E32 to the fixed electrode E22 vary dependent on deformation of the ring-shaped deformation body 30. In other words, a distance between the displacement electrode E31 and the fixed electrode E21 and a distance between the displacement electrode E32 and the fixed electrode E22 vary dependent on deformation of the ring-shaped deformation body 30. Although not illustrated in FIG. 21, relation between the displacement electrode E33 and the fixed electrode E23 and relation between the displacement electrode E34 and the fixed electrode E24 arranged near the W axis are entirely similar.

Figure 22:
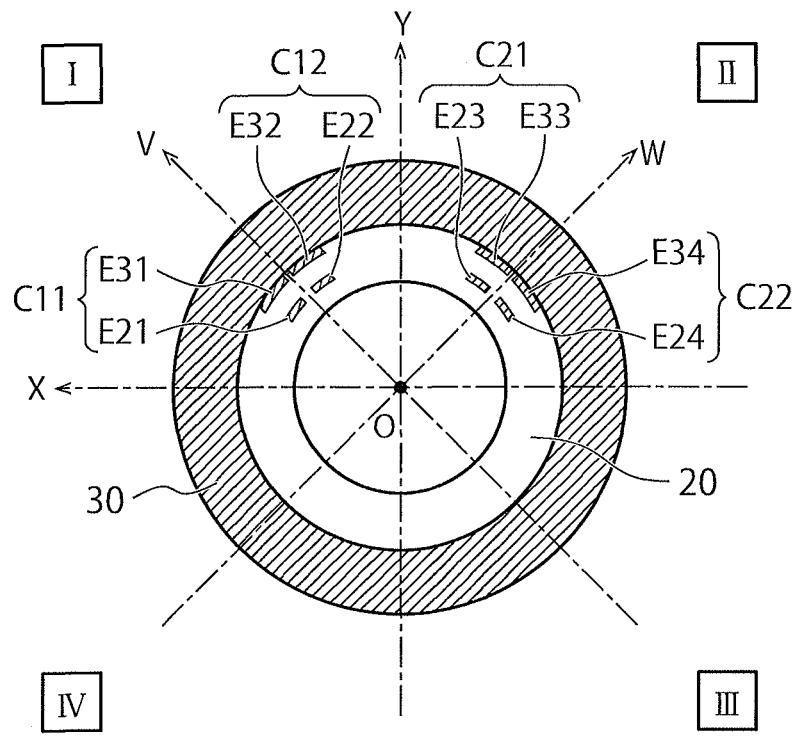
FIG. 22 is a cross-sectional view of a structural body in which the basic structural portion illustrated in FIG. 11 is added with the displacement electrodes and the fixed electrodes described above taken along the X-Y plane when viewed from the left in FIG. 11.

FIG. 22 is a cross-sectional view of a structural body in which the basic structural portion illustrated in FIG. 11 is added with the displacement electrodes and the fixed electrodes described above taken along the X-Y plane when viewed from the left in FIG. 11. This cross-sectional view clearly illustrates that the displacement electrodes E31 and E32 and the fixed electrodes E21 and E22 arranged on the V axis are opposite to each other and that the displacement electrodes E33 and E34 and the fixed electrodes E23 and E24 arranged on the W axis are opposite to each other.

In the case of this embodiment, the displacement electrodes E31 to E34 are formed by a conductive layer formed on the inner peripheral surface of the ring-shaped deformation body 30 and thus a surface thereof is curved along an inner periphery of the ring-shaped deformation body 30. The fixed electrodes E21 to E24 opposite to the displacement electrodes E31 to E34 thus also have a curved shape. In other words, surfaces of the displacement electrodes E31 to E34 and the fixed electrodes E21 to E24 are formed by surfaces of concentric columns having the Z axis as the central axis thereof. Of course a surface shape of the electrodes may be any shape as long as the electrode can form a capacitive element and thus an electrode of a flat plate shape with a flat surface may be used.

In the drawings in the present application, actual dimensions of the thickness of the displacement electrodes and the fixed electrodes are ignored for convenience of descriptions. For example when the displacement electrodes E31 to E34 are formed by a conductive layer (vapor evaporation layer or plating layer) formed on the inner peripheral surface of the ring-shaped deformation body 30, the thickness can be set around several micrometers. Contrary to this, when the fixed electrodes E21 to E24 are formed by a conductive plate (metal plate) protruding from the left side surface of the right-side supporting body 20, the thickness is preferably several millimeters in order to secure practical strength. Therefore, in FIG. 22 and other drawings, the thickness of the displacement electrodes and the thickness of the fixed electrodes are drawn in the same dimension for convenience; however, an actual dimension of the thickness of these electrodes is to be set at an appreciate value separately considering manufacturing steps or practical strength.

Figure 23:
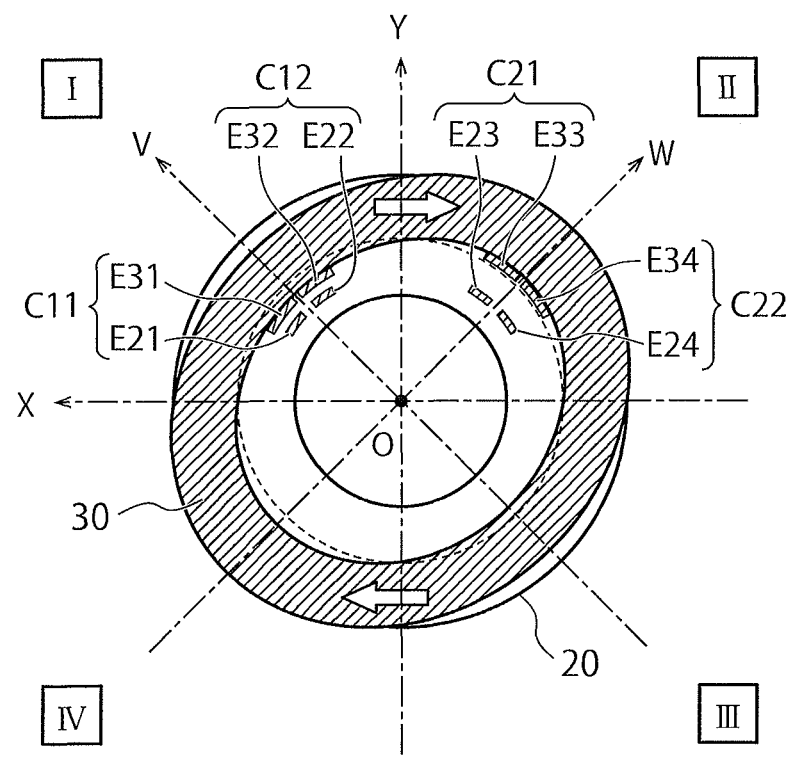
FIG. 23 is a cross-sectional view illustrating a state where torque acts on the basic structural portion illustrated in FIG. 22 around the Z axis in a positive direction (a broken line illustrates a state before deformation).

FIG. 23 is an X-Y cross-sectional view illustrating a state where torque acts on the basic structural portion illustrated in FIG. 22 around the Z axis in a positive direction. As described in § 2, when such torque acts, the ring-shaped deformation body 30 is deformed into an elliptical shape with a minor axis thereof in the V axis and a major axis thereof in the W axis. As a result of this, an interval between a pair of electrodes E21 and E31 and an interval between a pair of electrodes E22 and E32 arranged near the V axis both shrink while an interval between a pair of electrodes E23 and E33 and an interval between a pair of electrodes E24 and E34 arranged near the W axis both extend. Therefore when a capacitive element C11 is formed by the pair of electrodes E21 and E31, a capacitive element C12 is formed by the pair of electrodes E22 and E32, a capacitive element C21 is formed by the pair of electrodes E23 and E33, and a capacitive element C22 is formed by the pair of electrodes E24 and E34, both a direction and the magnitude of acting torque can be detected as a variation amount of capacitance value of the capacitive elements C11 to C22.

For example assuming a no-load state (state where no torque is acting) illustrated in FIG. 22 as a reference and focusing on a variation of a capacitance value of the capacitive element C11 formed by the electrodes E21 and E31 and a capacitance value of the capacitive element C12 formed by the electrodes E22 and E32, when torque acts around the Z axis in the positive direction as illustrated in FIG. 23, an interval between the electrodes shrinks and thus both of the capacitance values increase. Contrarily, when torque acts around the Z axis in the negative direction, an interval between the electrodes extends and thus both of the capacitance values decrease. Therefore, an increase of the capacitance value represents that torque is acting around the Z axis in the positive direction and a decrease of the capacitance value represents that torque is acting around the Z axis in the negative direction. It should be understood that an absolute value of the variation amount represents the magnitude of the acting torque.

Similarly, focusing on a variation of a capacitance value of the capacitive element C21 formed by the electrodes E23 and E33 and a capacitance value of the capacitive element C22 formed by the electrodes E24 and E34, when torque acts around the Z axis in the positive direction as illustrated in FIG. 23, an interval between the electrodes extends and thus both of the capacitance values decrease. Contrarily, when torque acts around the Z axis in the negative direction, an interval between the electrodes shrinks and thus both of the capacitance values increase. Therefore, a decrease of the capacitance value represents that torque is acting around the Z axis in the positive direction and an increase of the capacitance value represents that torque is acting around the Z axis in the negative direction. It should be understood that an absolute value of the variation amount represents the magnitude of the acting torque.

Torque around the Z axis can be detected by using any of the capacitive elements C11 to C22 and thus theoretically using any one of the capacitive elements should suffice. Practically, however, it is preferable to perform detection using all of the capacitive elements C11 to C22. That is, when the capacitive elements C11 and C12 are connected in parallel and provided at the position of the minor axis (near the V axis) when the ring-shaped deformation body 30 is deformed into an ellipse and the capacitive elements C21 and C22 are connected in parallel and provided at the position of the major axis (near the W axis) and when the same torque is applied, the capacitance value increases with a shrinking interval between the electrodes at the position of the minor axis (near the V axis) while the capacitance value decreases with an extending interval between the electrodes at the position of the major axis (near the W axis) and thus acting torque can be detected as a difference between the capacitance values "C11+C12" and C "21+C22". Such difference detection based on a variation in the capacitance value of the capacitive elements C11 to C22 is common to the difference detection of force based on the cantilever model 200 having been described in § 0.

That is, as a detection circuit to perform such difference detection, it is only required to provide the detection circuit illustrated in FIG. 2. In the present embodiment, however, the detection circuit illustrated in FIG. 4 is employed. The detection circuit in FIG. 4 is capable of measuring torque acting on the torque sensor in a similar manner to that in § 0 and is further capable of determining whether the torque sensor is normally functioning. That is, replacing the word "force" in § 0 with the word "torque" allows for understanding principles of measuring torque by the torque sensor of the present embodiment and failure diagnosis principles of the torque sensor.

In the example illustrated in FIG. 22, when the displacement electrodes E31 to E34 are configured by electrodes having the same shape and the same size, the fixed electrodes E21 to E24 are configured by electrodes having the same shape and the same size, and positional relation between the electrodes E31 and E21 and positional relation between the electrodes E32 and E22 with respect to the V axis and positional relation between the electrodes E33 and E23 and positional relation between the electrodes E34 and E24 with respect to the W axis are the same, capacitance values of the capacitive elements C11 to C22 are equivalent in the no-load state illustrated in FIG. 22. Therefore, a voltage value output to the output terminals T1 and T2 of the detection circuit illustrated in FIG. 4 in the connection state of the timing 1 illustrated in FIG. 5 equals zero.

Figure 24:
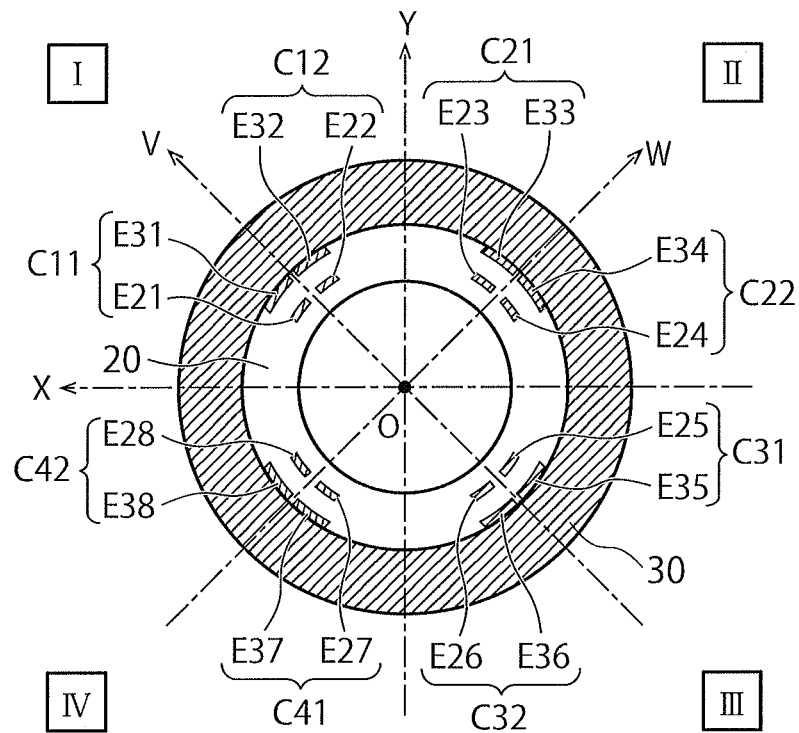
FIG. 24 is a cross-sectional view of a torque sensor according to an exemplary variation using eight sets of capacitive elements on the X-Y plane.

When torque acts around the Z axis in the positive direction as in the example illustrated in FIG. 23, capacitance values of the capacitive elements C11 and C12 increase while capacitance values of the capacitive elements C21 and C22 decrease and thus a voltage value output to the output terminal T1 of the detection circuit illustrated in FIG. 4 is a positive value. The larger torque is the larger an absolute value is. Conversely, when torque acts around the Z axis in the negative direction, capacitance values of the capacitive elements C11 and C12 decrease while capacitance values of the capacitive elements C21 and C22 increase and thus a voltage value output to the output terminal T1 of the detection circuit illustrated in FIG. 24 is a negative value. The larger torque is the larger an absolute value is. In this manner, the output terminal T1 provides a detected value of torque including a sign.

Meanwhile, for evaluating whether the torque sensor is normally functioning, as have described in § 0, It is only required to compare torque measured from the capacitive elements C11 to C22 in the connection state of the timing 1 in FIG. 5 and torque measured from the capacitive elements C11 to C22 in the connection state of the timing 2 and to evaluate whether the difference is within a predetermined range. A specific evaluation method and a determination method of a failure are as described in § 0.

Note that in the embodiment here the fixed electrodes E21 to E24 are fixed to the right-side supporting body 20; however, the fixed electrodes may be fixed to the left-side supporting body 10. For example in the example illustrated in FIG. 21, the fixed electrode E21 is formed by the conductive plate protruding leftward from the left side surface of the right-side supporting body 20; however, the fixed electrode E21 may be formed by a conductive plate protruding rightward from the right side surface of the left-side supporting body 10. To sum up, the fixed electrode E21 is only required to be provided at a certain position opposite to the displacement electrode E31 in such a manner to be held still regardless of deformation of the ring-shaped deformation body 30.

Note that in the embodiment here the displacement electrodes E31 to E34 are fixed to the inner peripheral surface of the ring-shaped deformation body 30; however, the displacement electrodes may be fixed to the outer peripheral surface of the ring-shaped deformation body 30. As apparent from FIG. 23, deformation occurs not only on the inner peripheral surface of the ring-shaped deformation body 30 but also on the outer peripheral surface when the ring-shaped deformation body 30 is deformed into an ellipse. Therefore the displacement electrodes may be formed on the outer peripheral surface of the ring-shaped deformation body 30. In this case, a fixed electrode opposite to the displacement electrode is only required to be arranged further outer side from the displacement electrode. However, when the electrodes are arranged on the outer side of the ring-shaped deformation body 30, an overall size of the sensor becomes large and the electrode parts become more prone to breakage. Thus, practically, it is preferable to provide the displacement electrodes on the inner peripheral surface of the ring-shaped deformation body 30 as in the embodiment described hitherto. Note that in exemplary variation illustrated in FIGS. 43 and 44 (will be described later), the size is the same even when displacement electrodes are arranged on the outer side.

The torque sensor according to the present invention is the basic structural portion (the left-side supporting body 10, the right-side supporting body 20, and the ring-shaped deformation body 30) described in § 1, added with the displacement electrodes that are fixed to the inner peripheral surface or the outer peripheral surface of the ring-shaped deformation body 30 and generates displacement attributable to elastic deformation of the ring-shaped deformation body 30, the fixed electrodes arranged at positions opposite to the displacement electrodes and fixed to the left-side supporting body 10 or the right-side supporting body 20, and a detection circuit that outputs an electrical signal representing torque around the axis of rotation acting on the left-side supporting body 10 while a load is applied to the right-side supporting body 20 based on a variation amount of capacitance value of the capacitive elements formed by the displacement electrodes and the fixed electrodes.

The torque sensor of the present embodiment as described above compares torque T1 based on electrical signals corresponding to variation amounts of capacitance values of the first to fourth capacitive elements C11 to C22 and torque T2 or torque T3 based on an electrical signal corresponding to any one of variation amounts of capacitance value of the first and the third capacitive elements C11 and C21 and variation amounts of capacitance value of the second and the fourth capacitive elements C21 and C22 and thus can determine by itself whether the torque sensor is normally functioning. This allows for providing a torque sensor capable of determining a failure (determination as to whether normally functioning) without using a plurality of torque sensors, in other words, while minimizing cost and an installment space.

Specifically, the detection circuit determines whether the torque sensor is normally functioning by determining whether a difference between torque T1 and one of torque T2 and torque T3 is within a predetermined range and whether a difference between torque T2 and torque T3 is within a predetermined range. Therefore, whether the torque sensor is normally functioning can be easily and surely determined. For detection of torque, it is desirable to use torque T1 based on a difference between (C11+C12) and (C21+C22). This is because the above is advantageous in terms of S/N as compared to the case of using torque T2 based on a difference between C11 and C21 or torque T3 based on a difference between C21 and C22.

<<<§ 4. Exemplary Variation Using Eight Sets of Capacitive Elements>>>

In § 3, the basic structural portion where the ring-shaped deformation body 30 of a ring shape is deformed into an elliptical shape by action of torque is used and therewith a minor axis and a major axis of the ellipse are defined in the V axis direction and the W axis direction, respectively. Furthermore the exemplary method of detecting torque by arranging two sets of capacitive elements at each position in the V axis and the W axis and determining whether the torque sensor is normally functioning has been described. An exemplary variation where a detection accuracy is further enhanced by using a total of eight sets of capacitive elements will be described.

A torque sensor described in § 4 also uses the basic structural portion illustrated in FIG. 11 like in the embodiment described in § 3. Points different from the embodiment described in § 3 include that a total of eight sets of capacitive elements are used and that a detection circuit detects torque and determines whether the torque sensor is normally functioning based on capacitance values of the eight sets of capacitive elements.

FIG. 24 is a cross-sectional view of a torque sensor according to an exemplary variation using eight sets of capacitive elements on the X-Y plane. When compared with the basic embodiment illustrated in FIG. 22, it is clear that four displacement electrodes E35 to E38 and four fixed electrodes E25 to E28 are newly added. That is, a first and a second displacement electrodes E31 and E32 and a first and a second fixed electrodes E21 and E22 are arranged near the positive V axis, a third and a fourth displacement electrodes E33 and E34 and a third and a fourth fixed electrodes E23 and E24 are arranged near the positive W axis, a fifth and a sixth displacement electrodes E35 and E36 and a fifth and a sixth fixed electrodes E25 and E26 are arranged near the negative V axis, and a seventh and an eighth displacement electrodes E37 and E38 and a seventh and an eighth fixed electrodes E27 and E28 are arranged near the negative W axis.

Of course the displacement electrodes E31 to E38 are all fixed to an inner peripheral surface of a ring-shaped deformation body 30 while the fixed electrodes E21 to E28 are fixed to a right-side supporting body 20 (or left-side supporting body 10) at an end portion thereof such that the fixed electrodes E21 to E28 are positioned opposite to the displacement electrodes E31 to E38.

In an X-Y coordinate system, a first quadrant I is arranged with a first capacitive element C11 formed by the first displacement electrode E31 and the first fixed electrode E21 and a second capacitive element C12 formed by the second displacement electrode E32 and the second fixed electrode E22, a second quadrant II is arranged with a third capacitive element C21 formed by the third displacement electrode E33 and the third fixed electrode E23 and a fourth capacitive element C22 formed by the fourth displacement electrode E34 and the fourth fixed electrode E24, a third quadrant III is arranged with a fifth capacitive element C31 formed by the fifth displacement electrode E35 and the fifth fixed electrode E25 and a sixth capacitive element C32 formed by the sixth displacement electrode E36 and the sixth fixed electrode E26, and a fourth quadrant IV is arranged with a seventh capacitive element C41 formed by the seventh displacement electrode E37 and the seventh fixed electrode E27 and an eighth capacitive element C42 formed by the eighth displacement electrode E38 and the eighth fixed electrode E28.

Figure 25:
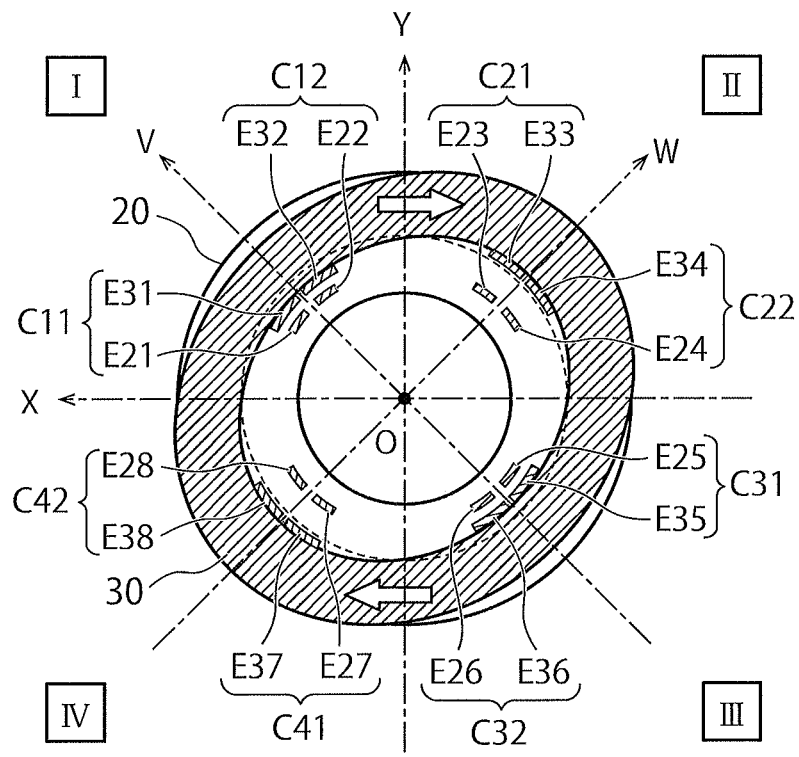
FIG. 25 is a cross-sectional view illustrating a state where torque acts on the torque sensor illustrated in FIG. 24 around the Z axis in a positive direction (a broken line illustrates a state before deformation).

Regarding torque detection described above, behavior of the fifth and the sixth capacitive elements C31 and C32 is the same as that of the first and the second capacitive elements C11 and C12, respectively, and behavior of the seventh and the eighth capacitive elements C41 and C42 is the same as that of the third and the fourth capacitive elements C21 and C22, respectively. For example when torque around the Z axis in a positive direction acts on the sensor in a no-load state illustrated in FIG. 24, the sensor transits to a deformed state illustrated in FIG. 25 where an interval between the electrodes of the capacitive elements C11, C12, C31, and C32 shrinks and thus a capacitance value thereof increases while an interval between the electrodes of the capacitive elements C21, C22, C41, and C42 extends and thus a capacitance value decreases. When torque around the Z axis acts in a negative direction, inverse phenomena occur.

Figure 26:
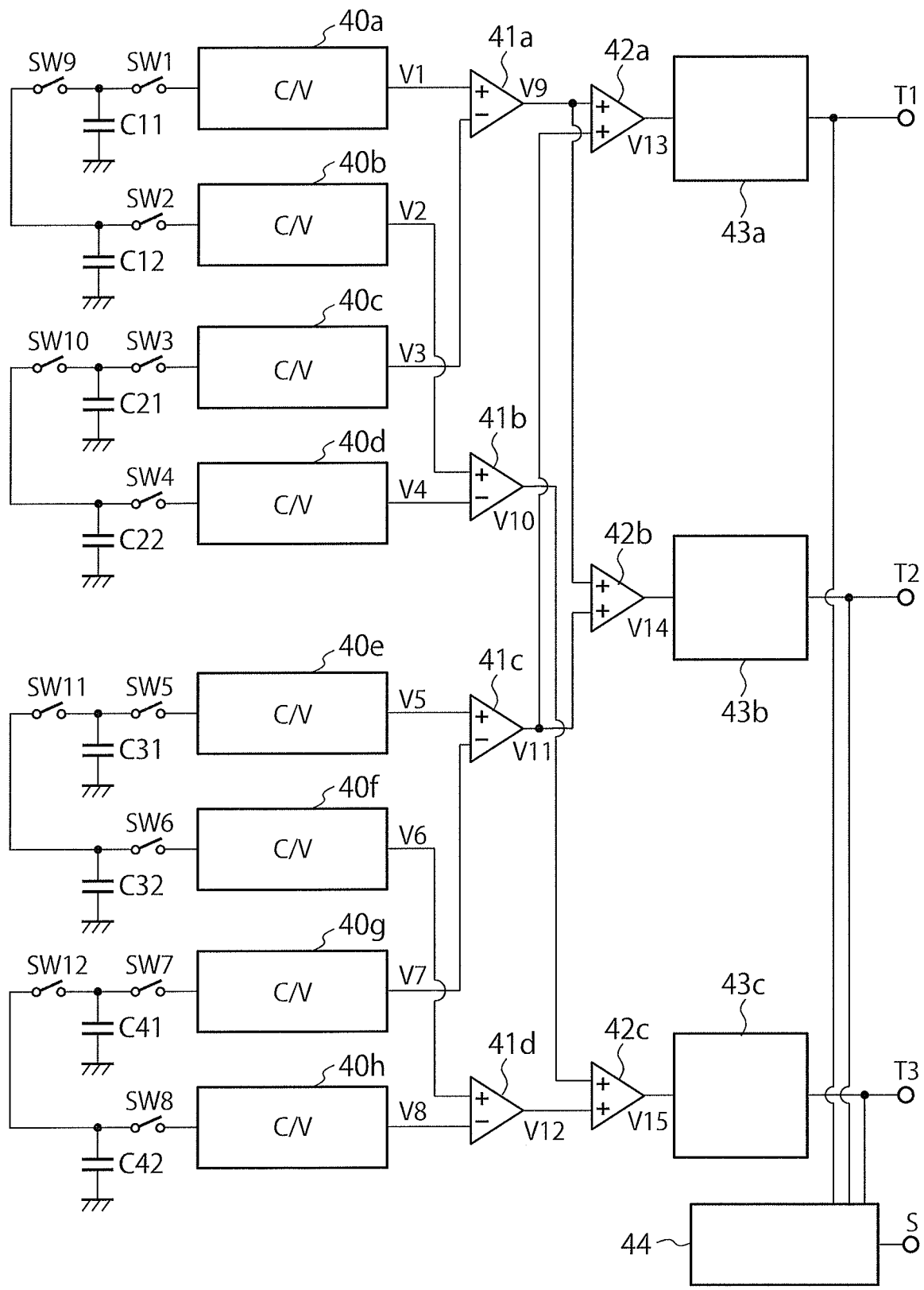
FIG. 26 is a circuit diagram illustrating an exemplary detection circuit used in the torque sensor illustrated in FIG. 24.

In the case of this exemplary variation, therefore, using a detection circuit as illustrated in a circuit diagram in FIG. 26 allows for detecting torque around the Z axis as well as determining whether the torque sensor is normally functioning. Symbols E21 to E38 illustrated in this circuit diagram represent the respective electrodes illustrated in FIGS. 24 and 25 and symbols C11 to C42 represent the capacitive elements formed by these electrodes. C/V convertors 40a to 40h are circuits that convert capacitance values of the capacitive elements C11 to C42 to voltage values V1 to V8, respectively. The voltage values V1 to V8 after conversion correspond to the respective capacitance values. A first subtraction arithmetic unit 41a in FIG. 26 performs operation of "V1−V3" and outputs the operation result V9 to a first and a second addition arithmetic units 42a and 42b. A second subtraction arithmetic unit 41b performs operation of "V2−V4" and outputs the operation result V10 to a third addition arithmetic unit 42c. A third subtraction arithmetic unit 41c performs operation of "V5−V7" and outputs the operation result V11 to a first and a second addition arithmetic units 42a and 42b. A fourth subtraction arithmetic unit 41d performs operation of "V6−V8" and outputs the operation result V12 to a third addition arithmetic unit 42c.

The first addition arithmetic unit 42*a* performs operation of "V9+V11" and outputs the operation result V13 to an output terminal T1 and a comparison unit 44 via a first signal processing unit 43*a*. The second addition arithmetic unit 42*b* performs operation of "V9+V11" similarly to the first addition arithmetic unit 42*a* and outputs the operation result V13 to an output terminal T2 and the comparison unit 44 via a second signal processing unit 43*b*. The third addition arithmetic unit 42*c* performs operation of "V10+V12" and outputs the operation result V14 to an output terminal T3 and a comparison unit 44 via a third signal processing unit 43*c*.

As illustrated in FIG. 26, this circuit diagram includes twelve switches SW1 to SW12. Connection states of these switches are switched based on a table illustrated in FIG. 27. That is, at timing 1, the outputs V1 to V14 are represented by the following mathematical formulas.

$$V1=C11+C12$$

$$V2=0$$

$$V3=C21+C22$$

$$V4=0$$

$$V5=C31+C32$$

$$V6=0$$

$$V7=C41+C42$$

$$V8=0$$

$$V9=V1-V3=(C11+C12)-(C21+C22)$$

$$V10=V2-V4=0$$

$$V11=V5-V7=(C31+C32)-(C41+C42)$$

$$V12=V6-V8=0$$

$$V13=V9+V11=(C11+C12)-(C21+C22)+(C31+C32)-(C41+C42)$$

$$V14=V10+V12=0 \quad \text{[Mathematical Formula 7]}$$

The detection circuit illustrated in FIG. 26 has a function to output, as an electrical signal representing acting torque T1 at the timing 1, an electrical signal corresponding to a difference between "a sum of a capacitance value of the first capacitive element C11, a capacitance value of the second capacitive element C12, a capacitance value of the fifth capacitive element C31, and a capacitance value of the sixth capacitive element C32" and "a sum of a capacitance value of the third capacitive element C21, a capacitance value of the fourth capacitive element C22, a capacitance value of the seventh capacitive element C41, and a capacitance value of the eighth capacitive element C42".

Furthermore, whether the torque sensor is normally functioning can be determined by connection states of timing 2 and timing 3 in FIG. 27. In the connection states of the timing 2, the outputs V1 to V14 are represented by the following mathematical formulas.

$$V1=C11$$

$$V2=0$$

$$V3=C21$$

$$V4=0$$

$$V5=C31$$

$$V6=0$$

$$V7=C41$$

$$V8=0$$

$$V9=V1-V3=C11-C21$$

$$V10=V2-V4=0$$

$$V11=V5-V7=C31-C41$$

$$V12=V6-V8=0$$

$$V13=V9+V11=(C11-C21)+(C31-C41)$$

$$V14=V10+V12=0 \quad \text{[Mathematical Formula 8]}$$

The detection circuit illustrated in FIG. 26 has a function to output, as an electrical signal representing acting torque T2 at the timing 2, an electrical signal corresponding to sum of "a difference between a capacitance value of the first capacitive element C11 and a capacitance value of the third capacitive element C21" and "a difference between a capacitance value of the fifth capacitive element C31 and a capacitance value of the seventh capacitive element C41".

At timing 3, the outputs V1 to V14 are further represented by the following mathematical formulas.

$$V1=0$$

$$V2=C12$$

$$V3=0$$

$$V4=C22$$

$$V5=0$$

$$V6=C32$$

$$V7=0$$

$$V8=C42$$

$$V9=V1-V3=0$$

$$V10=V2-V4=C12-C22$$

$$V11=V5-V7=0$$

$$V12=V6-V8=C32-C42$$

$$V13=V9+V11=0$$

$$V14=V10+V12=(C12-C22)+(C32-C42) \quad \text{[Mathematical Formula 10]}$$

The detection circuit illustrated in FIG. 26 has a function to output, as an electrical signal representing acting torque T3 at the timing 3, an electrical signal corresponding to the sum of "a difference between a capacitance value of the second capacitive element C12 and a capacitance value of the fourth capacitive element C22" and "a difference between a capacitance value of the sixth capacitive element C32 and a capacitance value of the eighth capacitive element C42".

The comparison unit 44 in FIG. 26 further evaluates (a) whether "T1-T2" is within a predetermined range and (b) whether "T2-T3" is within a predetermined range, for example. When at least one of the conditions (a) and (b) is not satisfied, the torque sensor is determined as not normally functioning (out of order). In this case, a failure determination signal representing determination of failure is sent from an output terminal S in FIG. 26.

Of course, the comparison unit 44 may evaluate (c) whether "T1-T3" is within a predetermined range and (b) whether "T2-T3" is within a predetermined range and determine that the torque sensor is not normally functioning (out of order) when at least one of the conditions (c) and (b) is not satisfied. Alternatively, the comparison unit 44 may evaluate (a) whether "T1-T2" is within a predetermined range and (c) whether "T1-T3" is within a predetermined range and determine that the torque sensor is not normally functioning (out of order) when at least one of the conditions (a) and (c) is not within the predetermined range.

In this manner, providing the total of eight sets of capacitive elements C11 to C42 on both of the positive and the negative sides of the V axis and the W axis allows for difference detection using the four sets of capacitive elements with increasing capacitance values and the other four sets of capacitive elements with decreasing capacitance values, thereby further enhancing a detection accuracy.

In FIG. 26, the first signal processing unit 43a and the second signal processing unit 43b have entirely the same configuration. The first signal processing unit 43a and the second signal processing unit 43b are included in order to explain in an easily understandable manner that T1 is output at timing 1 in FIG. 27, T2 is output at timing 2, and T3 is output at timing 3. In other embodiments, however, the second signal processing unit 43b may be omitted and an output from the first signal processing unit 43a at the timing 1 may be deemed as T2.

Figure 28:
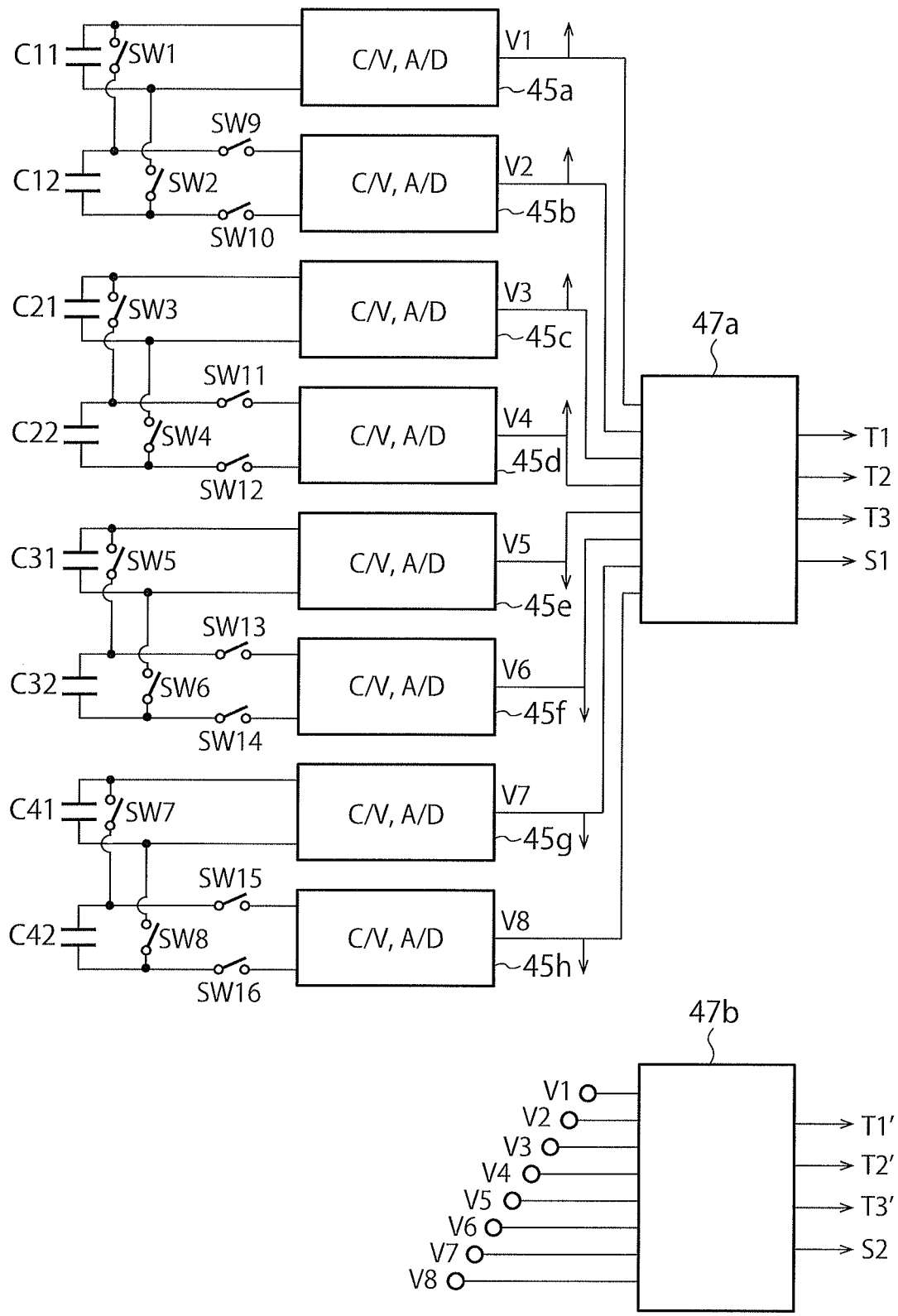
FIG. 28 is a circuit diagram illustrating another exemplary detection circuit used in the torque sensor illustrated in FIG. 24.

In the exemplary circuit diagram illustrated in FIG. 26, the detection circuit is configured based on a feature that the first and the second capacitive elements C11 and C12 are connected in parallel, the third and the fourth capacitive elements C21 and C22 are connected in parallel, the fifth and the sixth capacitive elements C31 and C32 are connected in parallel, the seventh and the eighth capacitive elements C41 and C42 are connected in parallel, thereby allowing for addition of the respective two capacitive elements. In other examples, however, the first to eighth capacitive elements C11 to C42 may be independently subjected to C/V conversion. An exemplary circuit diagram of such a detection circuit is illustrated in FIG. 28. In FIG. 29, a table illustrating ON/OFF connection states of switches included in the detection circuit in FIG. 28 is illustrated.

In order to detect torque T acting on the torque sensor by the detection circuit in FIG. 28, it is only required to control connection states of switches SW1 to SW16 as described in a column of timing 1 in FIG. 29. That is, the switches SW1 to SW8 are turned on (connected) while the remaining switches SW9 to SW16 are turned off (disconnected). As a result of this, an output signal corresponding to "C11+C12", an output signal corresponding to "C21+C22", an output signal corresponding to "C31+C32", and an output signal corresponding to "C41+C42" are provided to a first microcomputer 47a and a second microcomputer 47b in FIG. 28. The first and the second microcomputers 47a and 47b calculate a voltage value corresponding to V13 at the aforementioned timing 1, that is, "(C11+C12)−(C21+C22)+(C31+C32)−(C41+C42)" based on the output signals and evaluates torque T1.

In order to determine whether the torque sensor is normally functioning, it is only required to control connection states of the switches SW1 to SW16 as described in a column of timing 2 in FIG. 29. That is, the switches SW1 to SW8 are turned off (disconnected) while the remaining switches SW9 to SW16 are turned on (connected). As a result of this, an output signal corresponding to "C11", "C12", "C21", "C22", "C31", "C32", "C41", and "C42" is provided to the first and the second microcomputers 47a and 47b in FIG. 28 via first to eighth C/V convertors and A/D convertors 45a to 45h. The first and the second microcomputers 47a and 47b calculate a voltage value corresponding to V13 at the aforementioned timing 2, that is, "(C11−C21)+(C31−C41)" and a voltage value corresponding to V14 at the aforementioned timing 3, that is, "(C12−C22)+(C32−C42)" based on the output signals and evaluates torque T2 and T3 based on the operation results.

The first and the second microcomputers 47a and 47b further evaluates (a) whether "T1-T2" is within a predetermined range and (b) whether "T2-T3" is within a predetermined range, for example. When both of the conditions (a) and (b) are satisfied, the torque sensor is determined as normally functioning. On the contrary, when at least one of the conditions (a) and (b) is not satisfied, the torque sensor is determined as not normally functioning (out of order). In this case, a failure determination signal representing determination of failure is output from output terminals S1 and S2 in FIG. 28.

Also in this case of course, the comparison unit 44 may evaluate (c) whether "T1-T3" is within a predetermined range and (b) whether "T2-T3" is within a predetermined range and determine that the torque sensor is not normally functioning (out of order) when at least one of the conditions (c) and (b) is not satisfied. Alternatively, the comparison unit 44 may evaluate (a) whether "T1-T2" is within a predetermined range and (c) whether "T1-T3" is within a predetermined range and determine that the torque sensor is not normally functioning (out of order) when at least one of the conditions (a) and (c) is not within the predetermined range.

In the circuit diagram illustrated in FIG. 28, the two microcomputers 47a and 47b are used. This is to allow one of the microcomputers to output torque T acting on the torque sensor and a failure determination signal even when the other microcomputer fails. When the two microcomputers 47a and 47b are normally functioning, torque T1, T2, and T3 and a failure determination signal output from the first microcomputer 47a and torque T1, T2, and T3 and a failure determination signal output from the second microcomputer 47b can be both compared and thus reliability of the output signals from the detection circuit in FIG. 28 can be confirmed. Of course only one of the first microcomputer 47a and the second microcomputer 47b may be included.

Figures 30, 31:
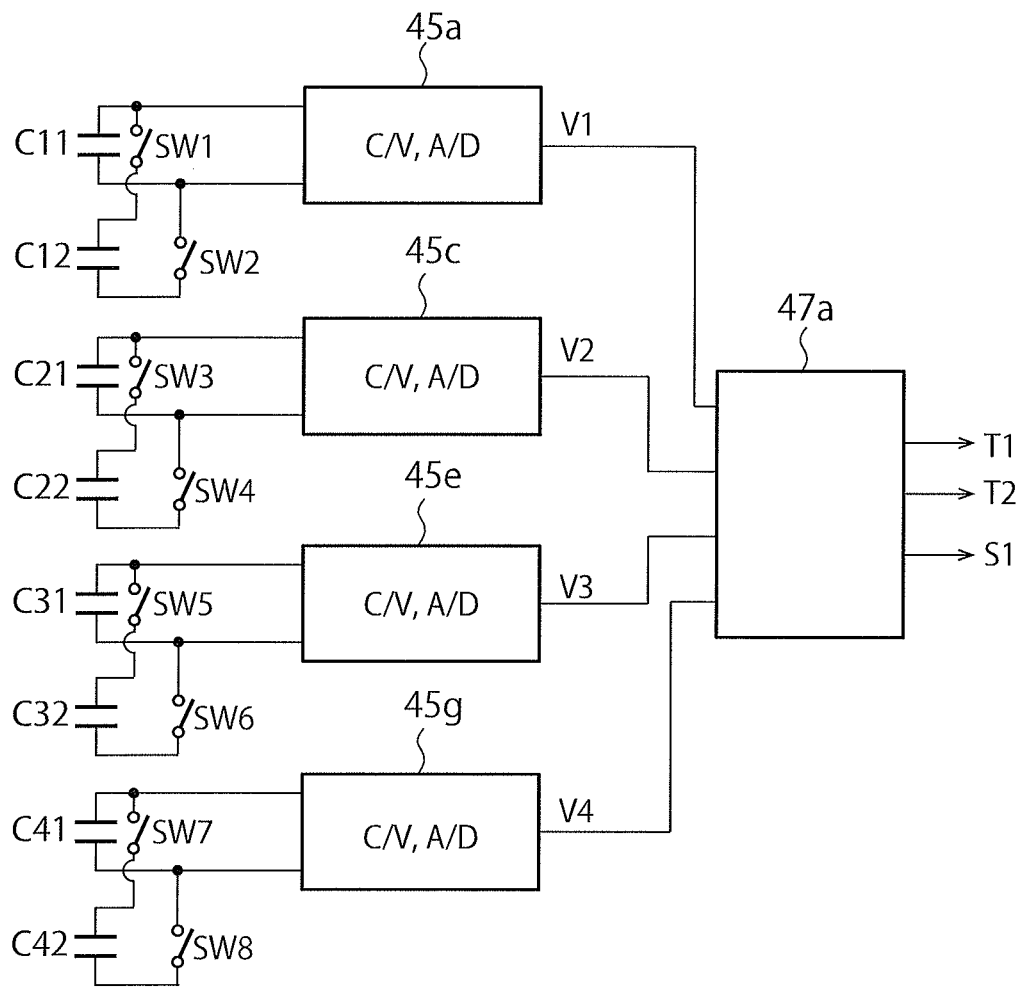
FIG. 30 is a circuit diagram illustrating still another exemplary detection circuit used in the torque sensor illustrated in FIG. 24.
FIG. 31 is a table illustrating ON/OFF connection states of switches included in the detection circuit in FIG. 30.

As apparent from the above explanation, torque T acting on the torque sensor and a failure determination signal can be output only by T1 and T2. FIG. 30 is a circuit diagram illustrating still another exemplary detection circuit for detecting force applied to the torque sensor. FIG. 31 is a table illustrating ON/OFF connection states of switches included in the detection circuit in FIG. 30.

In the detection circuit illustrated in FIG. 30, the first C/V convertor and A/D convertor 45b selectively connected to the second capacitive element C12 via the switches SW9 and SW10, the fourth C/V convertor and A/D convertor 45d selectively connected to the fourth capacitive element C22 via the switches SW11 and SW12, the sixth C/V convertor and A/D convertor 45f selectively connected to the sixth capacitive element C32 via the switches SW13 and SW14, and the fourth C/V convertor and A/D convertor 45h selectively connected to the eighth capacitive element C42 via the switches SW15 and SW16, are excluded from the detection circuit illustrated in FIG. 28.

In order to detect torque T acting on the torque sensor by the detection circuit in FIG. 30, it is only required to control connection states of switches SW1 to SW8 as described in a column of timing 1 in FIG. 31. That is, the switches SW1 to SW8 are all turned on (connected). As a result of this, an output signal corresponding to "C11+C12", an output signal corresponding to "C21+C22", an output signal corresponding to "C31+C32", and an output signal corresponding to "C41+C42" are provided to a microcomputer 47a in FIG. 30. The microcomputer 47a generates a voltage value corresponding to V13 at timing 1 in FIG. 27 in the aforementioned circuit diagram in FIG. 26, that is, "(C11+C12)−(C21+C22)+(C31+C32)−(C41+C42)" based on the output signals and thereby evaluates torque T1.

Next, in order to determine whether the torque sensor is normally functioning, it is only required to control connection states of the switches SW1 to SW8 as described in a column of timing 2 in FIG. 31. That is, the switches SW1 to SW8 are all turned off (disconnected). As a result of this, output signals corresponding to "C11", "C21", "C31", and "C41" are provided to the microcomputer 47a in FIG. 30. The microcomputer 47a calculates "(C11−C21)" and "(C31−C41)" based on the output signals and evaluates torque T2.

The microcomputer 47a further evaluates whether "T1-T2" is within a predetermined range. When "T1-T2" is within the predetermined range, the torque sensor is determined as normally functioning. On the contrary when "T1-T2" is not within the predetermined range, the torque sensor is determined as not normally functioning (out of order) and a failure determination signal representing determination of failure is output from output terminal S1 in FIG. 30.

The torque sensor of the present embodiment as described above compares torque T1 based on "electrical signals corresponding to variation amounts of capacitance values of the first to eighth capacitive elements C11 to C42" and torque T2 or torque T3 based on "electrical signals corresponding to any one of variation amounts of capacitance values of the first, the third, the fifth, and the seventh capacitive elements C11, C21, C31, and C41 and variation amounts of capacitance values of the second, the fourth, the sixth, and the eighth capacitive elements C21, C22, C32, and C42 and thus can determine by itself whether the torque sensor is normally functioning. This allows for providing a torque sensor capable of determining a failure (determination as to whether normally functioning) without using a plurality of torque sensors, in other words, while minimizing cost and an installment space.

Specifically, the detection circuit determines whether the torque sensor is normally functioning by determining whether a difference between torque T1 and one of torque T2 and torque T3 is within a predetermined range and whether a difference between torque T2 and torque T3 is within a predetermined range. Therefore, whether the torque sensor is normally functioning can be easily and surely determined.

Note that, for measurement of torque acting on the torque sensor, it is preferable to measure torque by torque T1. This is because when a capacitance (area) detected is larger, a variation in the capacitance is also larger and is advantageous in terms of S/N. As have been described in § 0, measurement times of T1, T2, and T3 may vary. That is, measurement time of T1 may be extended while time for failure diagnosis may be relatively shortened.

Note that in the descriptions above, the example where the displacement electrodes and the fixed electrodes forming the capacitive elements are arranged for each of the capacitive elements; however, desired electrodes may be a common electrode. That is, for example, the first and the second displacement electrodes E31 and E32 may be integrally configured as a common electrode, the third and the fourth displacement electrodes E33 and E34 may be integrally configured as a common electrode, the fifth and the sixth displacement electrodes E35 and E36 may be integrally configured as a common electrode, and the seventh and the eighth displacement electrodes E37 and E38 may be integrally configured as a common electrode. Alternatively, a ring-shaped deformation body 30 may be made of a conductive material (for example a metal material such as stainless steel, aluminum, or titan) and the ring-shaped deformation body 30 itself may function as a common displacement electrode. These ideas may be of course applied to the torque sensor explained in § 3.

<<<§ 5. Exemplary Variation where Effective Area of Capacitive Element is Maintained Constant>>>

Described here is how to avoid an effective area of the capacitive element from changing when the displacement electrode is slightly shifted in the rotation direction when torque is acting, that is, when a relative position of the displacement electrode to the fixed electrode changes.

Figures 32A, 32B:
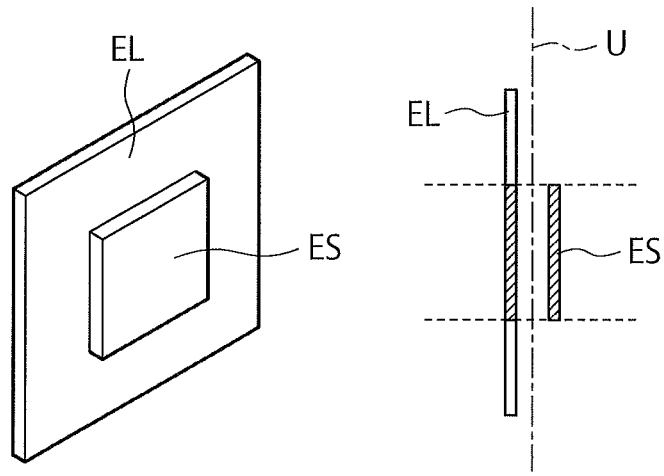
FIGS. 32(A) and 32(B) are diagrams illustrating principles of maintaining an effective area of a capacitive element constant even when a relative position of a displacement electrode to a fixed electrode varies.

FIGS. 32(a) and 32(b) are diagrams illustrating principles of maintaining an effective area of a capacitive element constant even when a relative position of a displacement electrode to a fixed electrode varies. As illustrated in FIG. 32(a), considered here is a pair of electrodes EL and ES arranged opposite to each other. The electrodes EL and ES are arranged in parallel at a predetermined interval therebetween, thereby forming a capacitive element. The electrode EL has a larger area as compared to the electrode ES. When a contour of the electrode ES is projected on a surface of the electrode EL to form an orthogonal projection, the projected image of the electrode ES is completely included in the surface of the electrode EL. In this case, an effective area as the capacitive element is equivalent to an area of the electrode ES.

FIG. 32(b) is a side view of the pair of electrodes ES and EL illustrated in FIG. 32(a). Hatched regions in the drawing are portions functioning as the substantial capacitive element. Therefore, an effective area as the capacitive element is an area of the hatched electrode (that is, an area of the electrode ES).

A vertical surface U as illustrated in the drawing by an alternated long and short dashed line is examined. The electrodes ES and EL are both arranged parallel to the vertical surface U. When the electrode ES is moved vertically upward along the vertical surface U, a facing portion of the electrode EL side moves upward but an area of the facing portion does not change. Even when the electrode ES is moved downward or moved backward or forward in the paper plane, the area of the facing portion on the electrode EL side does not change.

To sum up, when the orthogonal projection of the electrode ES formed on a surface of the electrode EL is completely included in the surface of the electrode EL (that is, a state where not even a part protrudes), an effective area as the capacitive element always corresponds to the area of the electrode ES. That is, an effective area of the capacitive element is maintained constant regardless of movement of the electrode ES. This is similar to the case of moving the electrode EL.

Therefore, even when a relative position of the displacement electrode to the fixed electrode changes as a result of torque acting in a predetermined rotation direction, an effective area of a capacitive element is maintained constant when torque acts if an area of one of the fixed electrode and the displacement electrode is set larger than an area of the other such that an effective facing area of the pair of electrodes forming the capacitive element does not change. More strictly speaking, when a contour of the electrode ES having a smaller area is projected on a surface of the electrode EL having a larger area and thereby an orthogonal projection is formed, as long as the projected image of the electrode ES is completely included in the surface of the electrode EL, an effective area of the capacitive element formed by the electrodes is equivalent to the area of the electrode ES and is always constant.

Figure 33:
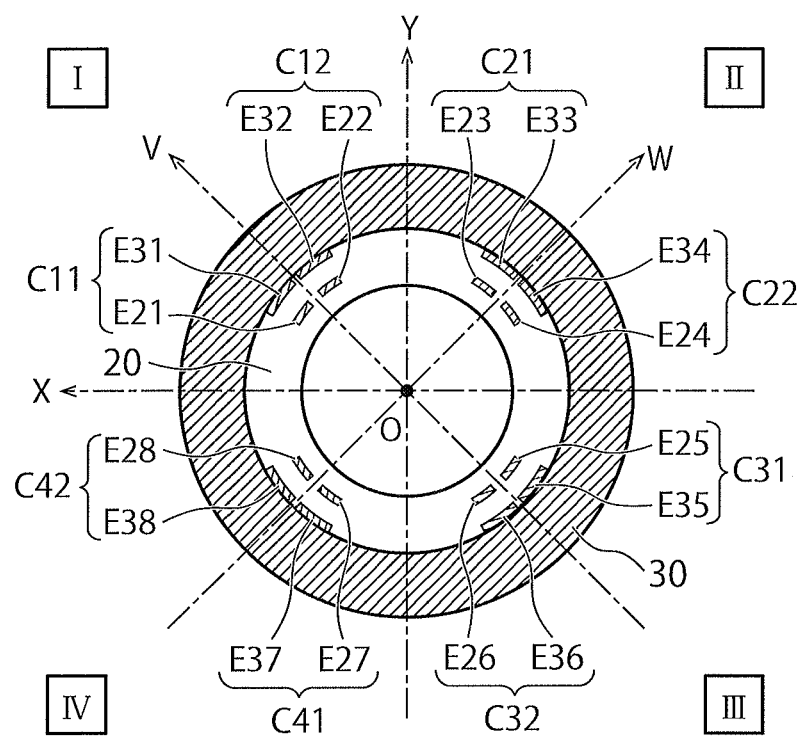
FIG. 33 is a cross-sectional view on an X-Y plane illustrating an exemplary variation of the torque sensor illustrated in FIG. 24 applied with the principles illustrated in FIGS. 32(A) and 32(B).

FIG. 33 is a cross-sectional view on an X-Y plane illustrating an exemplary variation of the torque sensor illustrated in FIG. 24 applied with the principles illustrated in FIGS. 32(a) and 32(b). Points different from the sensor illustrated in FIG. 24 include that the eight displacement electrodes E31 to E38 are replaced with displacement electrodes E31L to E38L each having a larger area and that the eight fixed electrodes E21 to E28 are replaced with fixed electrodes E21S to E28S each having a smaller area. As apparent from FIG. 33, the width of the displacement electrodes E31L to E38L is always wider than the width of the fixed electrodes E21S to E28S when the widths of the electrodes in a peripheral direction are compared in the cross-sectional view along an X-Y plane.

Figure 34:
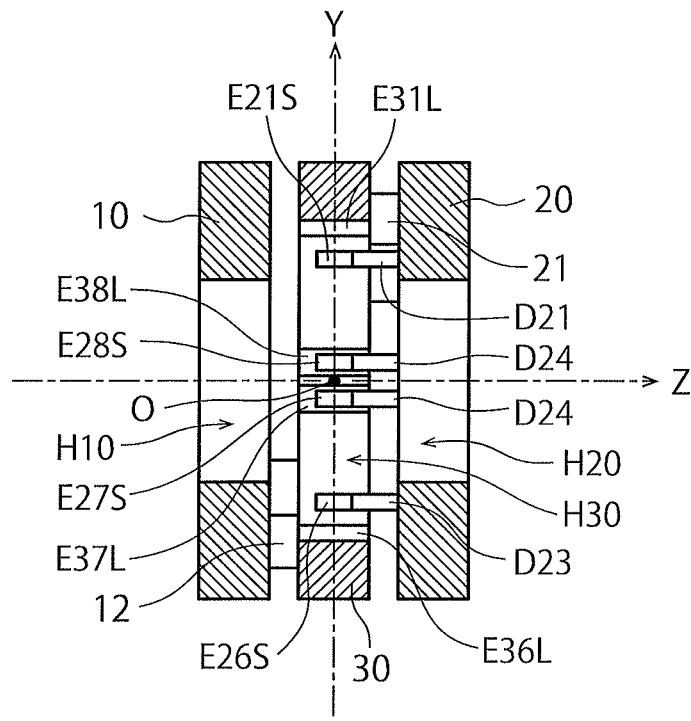
FIG. 34 is a cross-sectional side view of the torque sensor illustrated in FIG. 33 taken along a V-Z plane.

FIG. 34 is a cross-sectional side view of the torque sensor illustrated in FIG. 33 taken along a V-Z plane. An upper side in FIG. 34 is not in the Y axis direction but in the V axis direction illustrated in FIG. 33. Near the origin O in the drawing, positional relations between the displacement electrodes E37L and E38L and the fixed electrodes E27S and E28S, respectively, are clearly illustrated. In this example, the fixed electrodes E27S and E28S are fixed to the right-side supporting body 20 via an insulating plate D24. Portions functioning as electrodes forming capacitive elements C41 and C42 are only portions corresponding to the fixed electrodes E27S and E28S arranged near the origin O and the insulating plate D24 merely serves as a pedestal for supporting the fixed electrodes E27S and E28S.

Similarly, in an upper side in FIG. 34, positional relation between the displacement electrode E31L and the fixed electrode E21S is clearly illustrated. An insulating plate D21 also serves as a pedestal for supporting the fixed electrode E21S. In a lower side in FIG. 34, positional relation between the displacement electrode E36L and the fixed electrode E26S is clearly illustrated. An insulating plate D23 also serves as a pedestal for supporting the fixed electrode E26S.

In this example, even when the displacement electrodes E31L to E38L are displaced in the peripheral direction in FIG. 33 or displaced in the Z axis direction in FIG. 34, as long as a displacement amount thereof is within a predetermined allowable range (that is, as long as a projected image of the fixed electrode does not protrude from a surface of the displacement electrode), an effective area of the capacitive elements C11 to C42 is maintained constant. This means that a variation in the capacitance value of the capacitive elements C11 to C42 occurs solely attributable to a change in a distance between the electrodes and thus variation in the capacitance value attributable to a change in the effective facing area does not occur. In FIG. 34, the displacement electrodes E31L to E38L are arranged on the ring-shaped deformation body 30; however, the displacement electrodes E31L to E38L are not limited to such an aspect but may be arranged via an insulating body, for example.

Note that, even when extra force components other than a torque to be detected (hereinafter referred to as disturbance components) act, the example illustrated in FIG. 33 is extremely beneficial in practical use with respect to an additional feature that accurate torque detection without being influenced by these disturbance components is enabled. Hereinafter this additional feature will be described in detail.

Force acting on an X-Y-Z three-dimensional coordinate system is generally divided into a total of six components including force components acting in the respective coordinate axis directions including force Fx in the X axis direction, force Fy in the Y axis direction, and force Fz in the Z axis direction and moment components acting around the respective coordinate axes including moment Mx around the X axis, moment My around the Y axis, and moment Mz around the Z axis. Preferably, a sensor for detecting a specific component from among these six components has a function to separately detect only the specific component without being influenced by other components.

Therefore what type of detection result is obtained when the aforementioned six components act on the torque sensor illustrated in FIG. 33 will be examined. For convenience, a case where the respective force components act on the ring-shaped deformation body 30 while a load is applied to the right-side supporting body 20 (while the right-side supporting body 20 is fixed).

Figure 35:
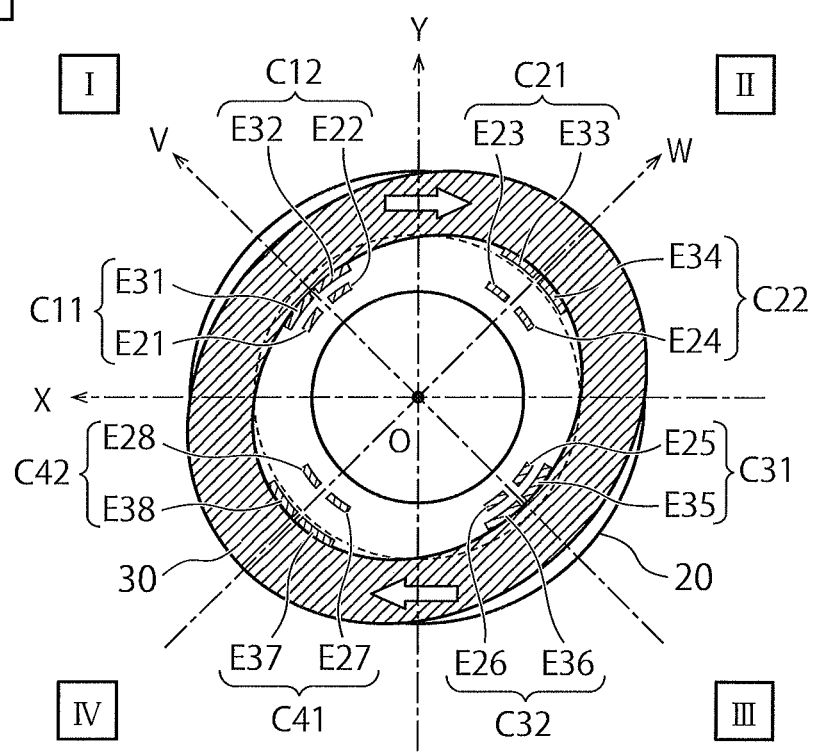
FIG. 35 is a cross-sectional view on the X-Y plane illustrating a state where moment Mz (a torque to be detected) acts on the torque sensor illustrated in FIG. 33 around the Z axis in a positive direction (a broken line illustrates a state before deformation).

First, FIG. 35 is a cross-sectional view on an X-Y plane illustrating a state where moment Mz acts on the torque sensor illustrated in FIG. 33 around the Z axis in a positive direction. This moment Mz around the Z axis in a positive direction is the very torque to be detected in this torque sensor. When moment Mz (a torque to be detected) around the Z axis in a positive direction acts on the sensor in a no-load state illustrated in FIG. 33, the sensor transits to a deformed state illustrated in FIG. 35 where an interval between the electrodes of the capacitive elements C11, C12, C31, and C32 shrinks and thus a capacitance value thereof increases while an interval between the electrodes of the capacitive elements C21, C22, C41, and C42 extends and thus a capacitance value decreases. Therefore, as have been described, using the detection circuit as illustrated in FIG. 26, 28, or 30 allows for obtaining a detection value of moment Mz (a torque to be detected) at an output terminal T2.

Figure 36:
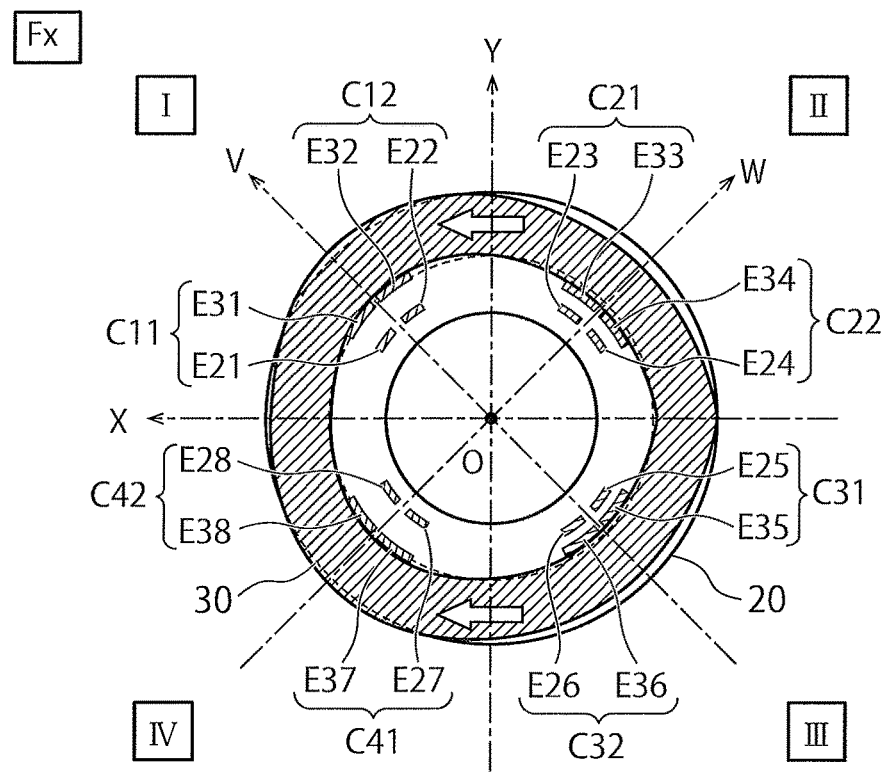
FIG. 36 is a cross-sectional view on the X-Y plane illustrating a state where force Fx in an X axis direction acts on the torque sensor illustrated in FIG. 33 (a broken line illustrates a state before deformation).

Meanwhile FIG. 36 is a cross-sectional view on the X-Y plane illustrating a state where force Fx in an X axis direction acts on the torque sensor illustrated in FIG. 33. In this case, force to cause movement toward the left in the drawing is applied to an upper arc portion and a lower arc portion forming the ring-shaped deformation body 30 as illustrated by white arrows and thus the ring-shaped deformation body 30 is deformed into a state illustrated in the drawing. As a result of this, an interval between the electrodes of the capacitive elements C21 to C32 shrinks and thus capacitance values thereof increase while an interval between the electrodes of the capacitive elements C11, C12, C41, and C42 extends and thus capacitance values thereof decrease. In the detection circuit illustrated in FIG. 26, 28, or 30, however, variations in the capacitance values of the capacitive elements C21 to C32 are canceled out with each other and variations in the capacitance values of the capacitive elements C11, C12, C41, and C42 are also canceled out with each other and thus a detection value output to the output terminal T2 equals zero. As a result of this, even if force Fx in the X axis direction acts, a value thereof is not detected.

This is similar to the case where force Fy in the Y axis direction acts. In this case, an interval between the electrodes of the capacitive elements C11 to C22 extends and thus capacitance values thereof decrease while an interval between the electrodes of the capacitive elements C31 to C42 shrinks and thus capacitance values thereof increase. In the detection circuit illustrated in FIG. 26, 28, or 30, however, variations in the capacitance values of the capacitive elements C11 to C22 are canceled out with each other and variations in the capacitance values of the capacitive elements C31 to C42 are also canceled out with each other and thus a detection value output to the output terminal T2 equals zero. As a result of this, even if force Fy in the Y axis direction acts, a value thereof is not detected.

When force Fz in the Z axis direction acts, the ring-shaped deformation body 30 moves parallelly to the right in FIG. 34 but an interval between the electrodes of the capacitive elements does not change and kept at a certain value and an effective area of the capacitive elements also stays constant as long as a variation amount is within the aforementioned predetermined allowable range. Therefore the capacitance values of the capacitive elements do not change and, even if force Fz in the Z axis direction acts, a value thereof is not detected.

Figure 37:
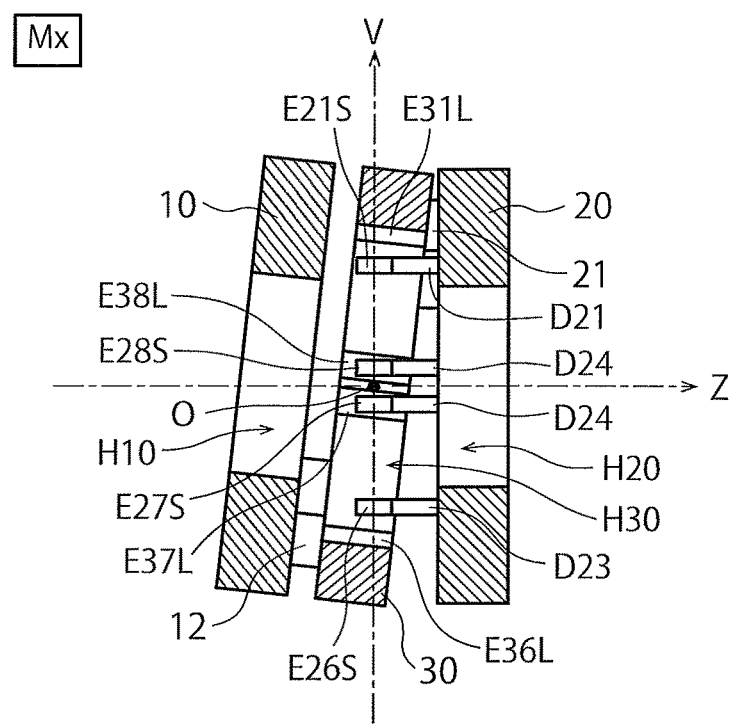
FIG. 37 is a cross-sectional view on a Z-V plane illustrating a state where moment Mx acts on the torque sensor illustrated in FIG. 33 around the X axis in a positive direction.

Meanwhile FIG. 37 is a cross-sectional view on a Z-V plane illustrating a state where moment Mx acts on the torque sensor illustrated in FIG. 33 around the X axis in a positive direction. As illustrated, the ring-shaped deformation body 30 is rotationally displaced clockwise in the drawing and thus positional relation between the displacement electrodes and the fixed electrodes changes. However, the capacitance values of the capacitive elements do not change. For example, the displacement electrodes E37L and E38L and the fixed electrodes E27S and E28S near the origin O have changes in terms of orientation to each other. However intervals between the electrodes or effective areas do not change and thus capacitance values of the capacitive elements C41 and C42 do not change. This is similar to the capacitive elements C21 and C22.

As for the displacement electrodes E31L and 32L and the fixed electrodes E21S and E22S in the upper side in the drawing, positional relation thereof changes since the displacement electrodes E31L and 32L are inclined but effective areas do not change. Moreover, with respect to an interval between the electrodes, the interval shrinks in a right half portion but extends in a left half portion and thus in total this is equivalent to the case where the interval between the electrodes is constant. Therefore, also in the capacitive elements C11, C12, C31, and C32, the capacitance values do not change.

As a result of this, even if moment Mx around the X axis acts, a value thereof is not detected. This is entirely similar to moment My around the Y axis.

FIG. 38 is a table illustrating how capacitance values of eight sets of capacitive elements C11 to C41 change when force in the respective coordinate axis directions and moment around the respective coordinate axes act on the ring-shaped deformation body 30 from the left-side supporting body 10 while a load is applied to the right-side supporting body 20 in the torque sensor illustrated in FIG. 33. In the drawing, "+" represents an increase in a capacitance value, "−" represents a decrease in a capacitance value, and "0" represents no change in a capacitance value. The reason why such results are obtained is as having been described with reference to FIGS. 35 to 37. Examining operations of the detection circuit illustrated in FIG. 26, 28, or 30 referring to the table in FIG. 38, it is understood that a detection value is obtained at the output terminal T2 only when moment Mz (a torque to be detected) acts around the Z axis and that no detection value is obtained at the output terminal T2 even when five other disturbance components Fx, Fy, Fz, Mx, and My act. As a result, even when extra force components other than the torque to be detected (disturbance components) act in the torque sensor according to the example illustrated in FIG. 33, accurate torque detection without being influenced by these disturbance components is enabled.

Note that in the torque sensor according to the example illustrated in FIG. 33, force Fx in the X axis direction and force Fy in the Y axis direction can be derived by operations of Fx=(C21+C22+C31+C32)−(C11+C12+C41+C42) and Fy=(C31+C32+C41+C42)−(C11+C12+C21+C22). Symbols C11 to C42 represent capacitance values of the capacitive elements C11 to C42, respectively. The reason why force Fx and force Fy are derived by such operations shall be easily understood when the results illustrated in the table in FIG. 38 is considered.

Note that, in actual operation in the detection circuit in FIG. 28, the respective capacitance values C11 to C42 are converted into voltage values V1 to V8 by C/V convertors 51 to 58 at the timing 2 in FIG. 29 and the operations are performed using these voltage values. In this case, it is only required to include an arithmetic unit that performs operations of Fx=(V3+V4+V5+V6)−(V1+V2+V7+V8) and Fy=(V5+V6+V7+V8)−(V1+V2+V3+V4).

In this manner, the sensor according to the example illustrated in FIG. 33 can implement a function as a torque sensor that detects torque around the Z axis as well as a function as a force sensor that detects force Fx in the X axis direction and force Fy in the Y axis direction.

According to the torque sensor as described above, the effective facing area of each of the pairs of electrodes forming the first to eighth capacitive elements C11 to C42 does not change even when torque in a predetermined rotation direction acts and thus detection accuracy of torque and determination accuracy as to whether the torque sensor is normally functioning can be enhanced.

Of course the principles illustrated in FIGS. 32(a) and 32(b) may be employed in the torque sensor of the type having four capacitive elements C11 to C22 illustrated in FIG. 22. Also in this case, the effective facing area of each of the pairs of electrodes forming the first to fourth capacitive elements C11 to C22 does not change even when torque in a predetermined rotation direction acts and thus detection accuracy of torque and determination accuracy as to whether the torque sensor is normally functioning can be enhanced.

<<<§ 6. Exemplary Variation of Detection Circuit Using PWM Conversion Circuit>>>

The torque sensor having been explained selectively connects predetermined capacitive elements in parallel by switching ON/OFF of the switches SW1 to SW8 at predetermined timing and thereby performs addition operation of the capacitance values. As the switches SW1 to SW8, a switch having a mechanical contact point may be employed; however, from the perspective of downsizing a circuit substrate of the detection circuit, it is preferable to employ an analog switch.

In an analog switch, however, a parasitic capacitance exists at a terminal for input or output and this parasitic capacitance may be disadvantageously larger than the capacitance value of the capacitive element. In this case, the capacitance value cannot be accurately evaluated and thus an accuracy of torque detected by the torque sensor disadvantageously decreases. It is thus desirable to perform addition operation of the capacitance values of predetermined capacitive elements not by using an analog switch but by using an electronic circuit. In order to convert the capacitance value of the capacitive element into an electrical signal, a circuit to convert the magnitude of the capacitance value into a voltage (C/V convertor), a circuit to convert the magnitude into a frequency (C/f convertor), a circuit to convert the magnitude into a pulse width (pulse width modulation (PWM)), or other circuits may be used. As an example, a method for converting the capacitance value into a pulse wave using a PWM circuit and measuring the width of the pulse wave by a counter of a microcomputer will be described based on FIGS. 39 to 42.

FIG. 39 is a circuit diagram where a PWM circuit is provided to a capacitive element. FIG. 40 is a schematic diagram illustrating waveforms of signals output from respective components of the PWM circuit in FIG. 39.

As illustrated in FIGS. 39 and 40, a PWM circuit in the present circuit diagram includes: a driving unit 51 that provides rectangular driving pulse waves W1 to a capacitive element C; a low pass filter 52 connected to the capacitive element C in parallel; a comparator 53 that converts the waveform of waves W2 having passed the low pass filter 52 into rectangular waves W3; an operation unit 54 that performs logical operation of an exclusive OR of driving pulse waves W1 provided by the driving unit 51 and the rectangular waves W3 converted into by the comparator 53; and a counter 55 that measures a pulse width of pulse waves W4 after operation by the operation unit 54.

In this PWM circuit, as illustrated in FIG. 40, the driving pulse waves W1 having passed the low pass filter 52 include waveform rounding due to delayed transfer of the driving pulse waves W1 by the capacitive element C. There is a characteristic that a degree of this rounding is larger as a capacitance value of the capacitive element C is larger. Therefore, when the waves W2 having passed the low pass filter 52 are converted into the rectangular waves W3 by the comparator 53, the rectangular waves W3 are delayed by time corresponding to the capacitance value of the capacitive element C with respect to the driving pulse waves W1 provided by the driving unit 51. Therefore, measuring the pulse width of the pulse waves W4 obtained by exclusive OR of the driving pulse waves W1 and the rectangular waves W3 allows for evaluating the capacitance value of the capacitive element C.

Figure 41:
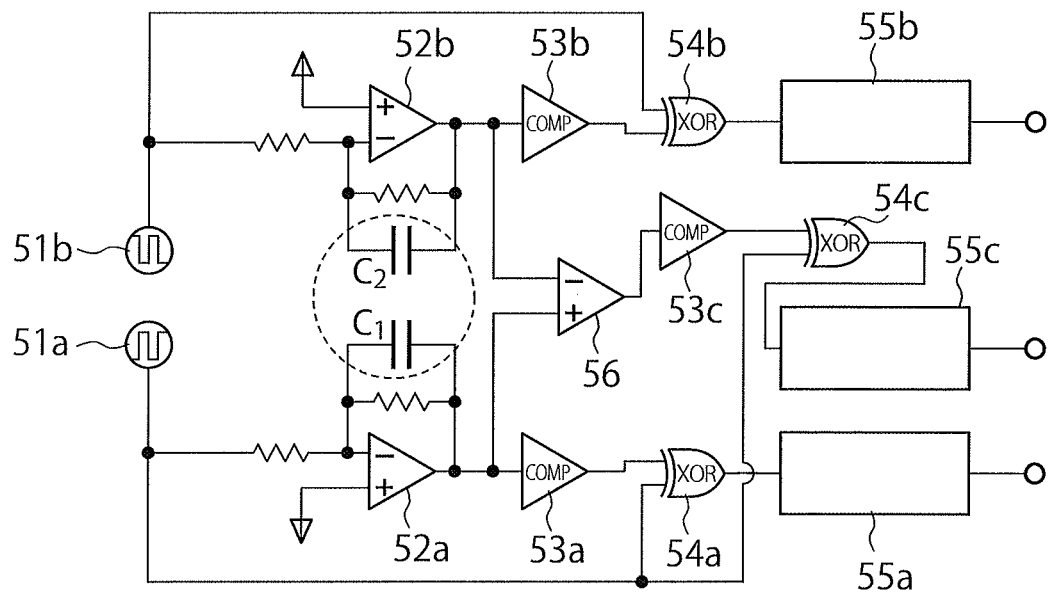
FIG. 41 is a circuit diagram illustrating an exemplary PWM circuit that may be employed in a torque sensor of the present invention.
Figure 42:
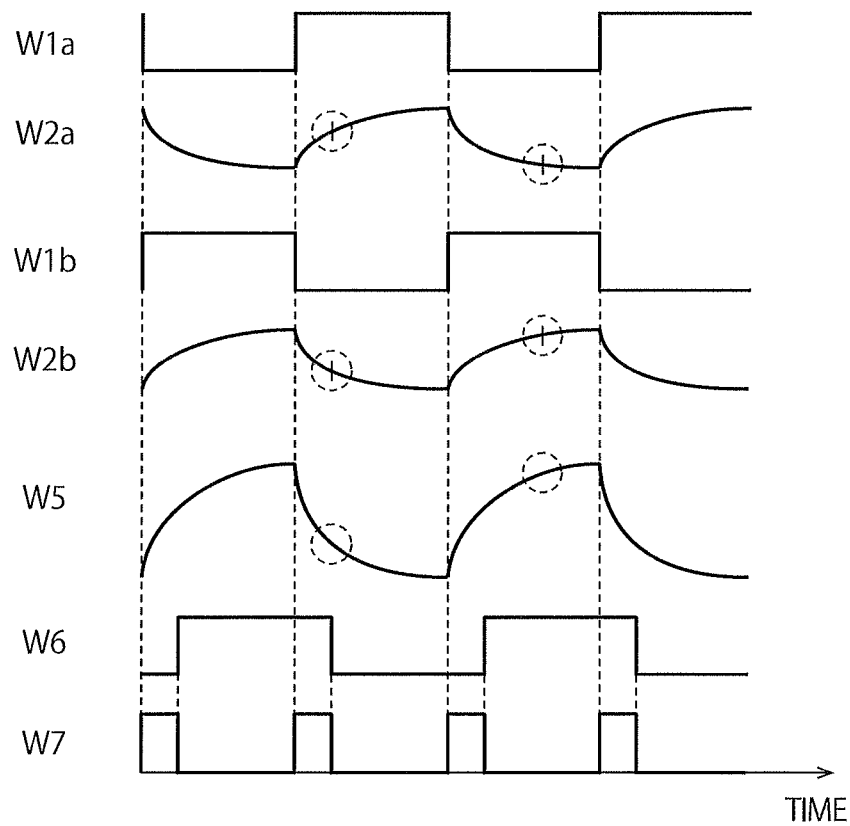
FIG. 42 is a schematic diagram illustrating waveforms of signals output from respective components of the PWM circuit in FIG. 41.

For employing the PWM circuit as described above in a torque sensor according to the present invention, for example a circuit diagram illustrated in FIG. 41 is configured. FIG. 41 is a circuit diagram illustrating an exemplary PWM circuit that may be employed in a torque sensor of the present invention. FIG. 42 is a schematic diagram illustrating waveforms of signals output from respective components of the PWM circuit in FIG. 41.

The PWM circuit illustrated in FIG. 41 includes two of the PMW circuit illustrated in FIG. 39 arranged in parallel and thus common components are denoted with similar symbols to those in FIG. 39 while detailed descriptions thereon are omitted. Meanwhile in the PWM circuit illustrated in FIG. 41, unlike in the PWM circuit illustrated in FIG. 39, waves W2a and W2b having passed low pass filters 52a and 52b are input to comparators 53a and 53b as well as a subtraction arithmetic unit 56. Thereafter waves W5 output from the subtraction arithmetic unit 56 are shaped into rectangular waves W6 by a comparator 53c and these rectangular waves W6 are input to an operation unit 54c that calculates exclusive OR together with driving pulse waves W1a provided by the driving unit 51a. Waves W7 calculated by the operation unit 54c are then input to a counter 55c, thereby the pulse width of the waves W7 is measured.

Note that, in the circuit diagram illustrated, two types of driving pulse waves W1a and W1b have opposite phases. Therefore the subtraction arithmetic unit 56 performs operation of "W2a−W2b". Actually, addition operation of "W2a+ W2b" is performed. That is, when the present PWM circuit is applied to two capacitive elements C1 and C2, for example, a signal based on the capacitive element C1 is output from a counter 55a and a signal based on the capacitive element C2 is output from a counter 55b. A signal of the sum of capacitances of the two capacitive elements C1 and C2 (C1+C2) is output from the counter 55c.

In order to employ the above PWM circuit in a torque sensor of the type having the four capacitive elements C11 to C22 described in § 3, for example, it is only required to divide the four capacitive elements C11 to C22 into two pairs of the two capacitive elements C11 and C12 and the other two capacitive elements C21 and C22 and to apply the PWM circuit to each of the pairs. According to such a circuit configuration, capacitance values "C11" and "C12" of the capacitive elements C11 and C12 and the sum of capacitance values "C11+C12" can be evaluated from the circuit including the capacitive elements C11 and C12. Similarly, capacitance values "C21" and "C22" of the capacitive elements C21 and C22 and the sum of capacitance values "C21+C22" can be evaluated from the circuit including the capacitive elements C21 and C22. Performing operation of "(C11+ C12)−(C21+C22)" corresponding to the aforementioned [Mathematical Formula 1] using these evaluation results allows for evaluating torque T acting on the torque sensor. Furthermore, performing operation of "C21−C11" and "C22−C12" corresponding to the aforementioned [Mathematical Formula 2] allows for evaluating whether the torque sensor is normally functioning as have been described in detail in § 0.

Alternatively, in order to employ the above PWM circuit in a torque sensor of the type having the eight capacitive elements C11 to C42 described in § 4 and § 5, it is only required to divide the eight capacitive elements C11 to C42 into four pairs of the two capacitive elements C11 and C12, the two capacitive elements C21 and C22, the two capacitive elements C31 and C32, and the two capacitive elements C41 and C42 and to apply the PWM circuit to each of the pairs. According to such a circuit configuration, capacitance values "C11" and "C12" of the capacitive elements C11 and C12 and the sum of capacitance values "C11+C12" can be evaluated from the circuit including the capacitive elements C11 and C12. Similarly, capacitance values "C21" and "C22" of the capacitive elements C21 and C22 and the sum of capacitance values "C21+C22" can be evaluated from the circuit including the capacitive elements C21 and C22, capacitance values "C31" and "C32" of the capacitive elements C31 and C32 and the sum of capacitance values "C31+C32" can be evaluated from the circuit including the capacitive elements C31 and C32, and capacitance values "C41" and "C42" of the capacitive elements C41 and C42 and the sum of capacitance values "C41+C42" can be evaluated from the circuit including the capacitive elements C41 and C42.

Performing operation of "(C11+C12)−(C21+C22)+(C31+ C32)−(C41+C42)" corresponding to V13 of the aforementioned [Mathematical Formula 7] using these evaluation results allows for evaluating torque T acting on the torque sensor. Furthermore, performing operation of "(C11−C21)+ (C31−C41)" corresponding to V13 of the aforementioned [Mathematical Formula 8] and "(C12−C22)+(C32−C42)" corresponding to V14 of the aforementioned [Mathematical Formula 9] allows for evaluating whether the torque sensor is normally functioning as have been described in detail in § 4.

According to the PWM circuit described here, even when in-phase noise (illustrated by broken lines in the waves W2a and W2b in FIG. 42) is mixed in the waves W2a and W2b having passed the low pass filters 52a and 52b, the subtraction arithmetic unit 56 can cancel out the noise as illustrated in a waveform of the waves W5 and thus capacitance values can be measured with a high accuracy. Note that in FIG. 41 three counters 55a, 55b, and 55c are included to concurrently and separately measure "C1", "C2", and "C1+C1"; however, one microcomputer may be employed instead of these counters 55a, 55b, and 55c. In this case, "C1", "C2", and "C1+C1" cannot be concurrently measured but a circuit configuration can be simplified.

<<<§ 7. Exemplary Variation of Basic Structural Portion of Torque Sensor>>>

The torque sensor having been described has the basic structural portion where the ring-shaped deformation body 30 is arranged between the left-side supporting body 10 and the right-side supporting body 20; however, a torque sensor is not limited to such an embodiment.

Figure 43:
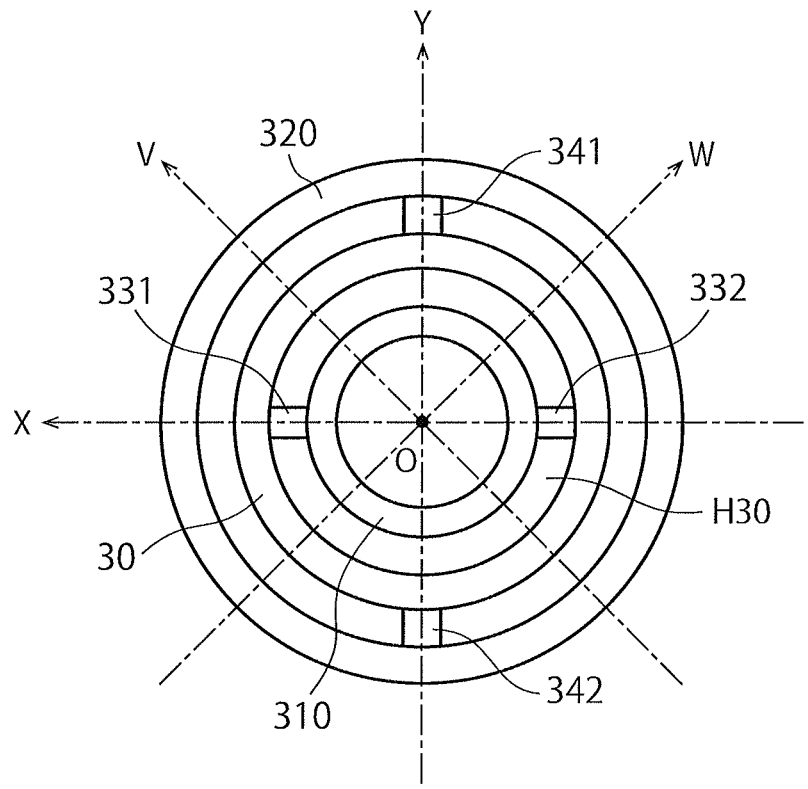
FIG. 43 is a schematic front view illustrating an exemplary variation of the basic structural portion that may be employed in a torque sensor of the present invention.

FIG. 43 is a schematic front view illustrating an exemplary variation of the basic structural portion that may be employed in a torque sensor of the present invention. As illustrated in FIG. 43, a basic structural portion of the present exemplary variation includes: a ring-shaped deformation body 30; an inner supporting body 310 of a ring shape arranged inside a through opening H30 of the ring-shaped deformation body 30; and an outer supporting body 320 of a ring shape arranged to encircle an outer peripheral surface of the ring-shaped deformation body 30. As illustrated, the ring-shaped deformation body 30, the inner supporting body 310, and the outer supporting body 320 are concentric to each other.

On an X axis illustrated in FIG. 43, a first and a second inner connection members 331 and 332 are provided symmetrically with respect to the origin O between the inner supporting body 310 and the ring-shaped deformation body 30. The first and the second inner connection members 331 and 332 connect an outer peripheral surface of the inner supporting body 310 and an inner peripheral surface of the ring-shaped deformation body 30. On a Y axis, a first and a second outer connection members 341 and 342 are further provided symmetrically with respect to the origin O between the ring-shaped deformation body 30 and the outer supporting body 320. The first and the second outer connection members 341 and 342 connect the outer peripheral surface of the ring-shaped deformation body 30 and an inner peripheral surface of the outer supporting body 320. Therefore, the torque sensor employing the basic structural portion of the present exemplary variation has a thinner structure than the torque sensor illustrated in FIG. 10 as described above since the ring-shaped deformation body 30, the inner supporting body 310, and the outer supporting body 320 are all arranged on an X-Y plane.

Figure 44:
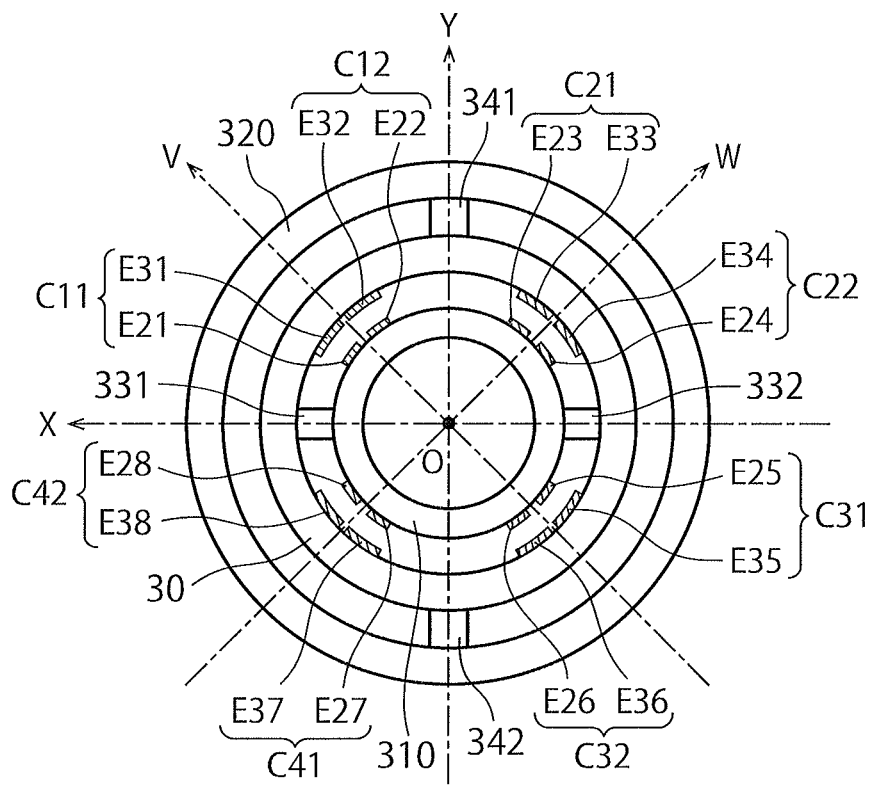
FIG. 44 is a diagram illustrating arrangement of the fixed electrodes and the displacement electrodes when the capacitive elements are included between the ring-shaped deformation body and an inner supporting body.

Arrangement of fixed electrodes and displacement electrodes in such a basic structural portion will be described with reference to FIG. 44. FIG. 44 is a diagram illustrating arrangement of the fixed electrodes and the displacement electrodes when the capacitive elements are included between the ring-shaped deformation body 30 and the inner supporting body 310.

In FIG. 44, eight capacitive elements (first to eighth capacitive elements) are provided to the basic structural portion. Specifically, for convenience of descriptions, where a V axis and a W axis that pass through the origin O and form 45 degrees to the X axis and the Y axis are defined on the X-Y plane, a first and a second displacement electrodes E31 and E32 are arranged near the positive V axis symmetrically with respect to the V axis, a third and a fourth displacement electrodes E33 and E34 are arranged near the positive W axis symmetrically with respect to the W axis, a fifth and a sixth displacement electrodes E35 and E36 are arranged near the negative V axis symmetrically with respect to the V axis, and a seventh and an eighth displacement electrodes E37 and E38 are arranged near the negative W axis symmetrically with respect to the W axis on the inner peripheral surface of the ring-shaped deformation body 30.

On the outer peripheral surface of the inner supporting body 310, a first fixed electrode E21 is arranged at a position opposite to the first displacement electrode E31, a second fixed electrode E22 is arranged at a position opposite to the second displacement electrode E32, a third fixed electrode E23 is arranged at a position opposite to the third displacement electrode E33, a fourth fixed electrode E24 is arranged at a position opposite to the fourth displacement electrode E34, a fifth fixed electrode E25 is arranged at a position opposite to the fifth displacement electrode E35, a sixth fixed electrode E26 is arranged at a position opposite to the sixth displacement electrode E36, a seventh fixed electrode E27 is arranged at a position opposite to the seventh displacement electrode E37, and an eighth fixed electrode E28 is arranged at a position opposite to the eighth displacement electrode E38. In other words, on the outer peripheral surface of the inner supporting body 310, the first and the second fixed electrodes E21 and E22 are arranged near the positive V axis symmetrically with respect to the V axis, the third and the fourth fixed electrodes E23 and E24 are arranged near the positive W axis symmetrically with respect to the W axis, the fifth and the sixth fixed electrodes E25 and E26 are arranged near the negative V axis symmetrically with respect to the V axis, and the seventh and the eighth fixed electrodes E27 and E28 are arranged near the negative W axis symmetrically with respect to the W axis.

The torque sensor of such a configuration provides similar functions to those of the torque sensor having been described with reference to FIGS. 24 to 31 and thus detailed descriptions thereon are omitted. Although not illustrated, of course the capacitive elements may be formed between the ring-shaped deformation body 30 and the outer supporting body 320. That is, the first to eighth displacement electrodes E31 to E38 may be arranged on the outer peripheral surface of the ring-shaped deformation body 30 while the first to eighth fixed electrodes E21 to E22 may be arranged on the inner peripheral surface of the outer supporting body 320. In this case, it is preferable that the respective electrodes are arranged symmetrically with respect to the V axis or the W axis like in the exemplary variation described above.

Note that only the first to fourth capacitive elements may be arranged. Actions of such a torque sensor are similar to those of the torque sensor illustrated in FIGS. 22 and 23. Also in this case, the capacitive elements may be included between the ring-shaped deformation body 30 and the inner supporting body 310 or may be included between the ring-shaped deformation body 30 and the outer supporting body 320.

The example where the inner supporting body 310 and the outer supporting body 320 both have a ring shape has been illustrated here. However, an embodiment is not limited to such a form and may employ other forms such as a rod shape or a semicircular shape as long as the embodiment allows for transferring torque to the ring-shaped deformation body 30.

Alternatively, as another exemplary variation, the structure illustrated in FIG. 10 and the structure illustrated in FIG. 44 may be combined. That is, although not illustrated, examples of such a structure include a structure where the outer supporting body 320 and the ring-shaped deformation body 30 illustrated in FIG. 44 are connected via the first and the second outer connection members 341 and 342 and the ring-shaped deformation body 30 is further connected to the right-side supporting body 20 in FIG. 10 via the projecting portions 21 and 22. Of course the inner supporting body 310 may be employed instead of the outer supporting body 320 and the left-side supporting body 10 may be employed instead of the right-side supporting body 20.

<<<§ 8. Exemplary Variation of Arrangement of Fixed Electrodes and Displacement Electrodes>>>

In the torque sensors of the aforementioned embodiments and the exemplary variations, pairs of capacitive elements are arranged adjacent to each other along the peripheral direction of the ring-shaped deformation body 30, the inner supporting body 310, or the outer supporting body 320 symmetrically with respect to the V axis or the W axis. Contrary to this, the pairs of the capacitive elements may be arranged along the Z axis direction adjacent to each other such that orthogonal projections thereof projected on the X-Y plane overlap on the V axis or the W axis.

Figure 45:
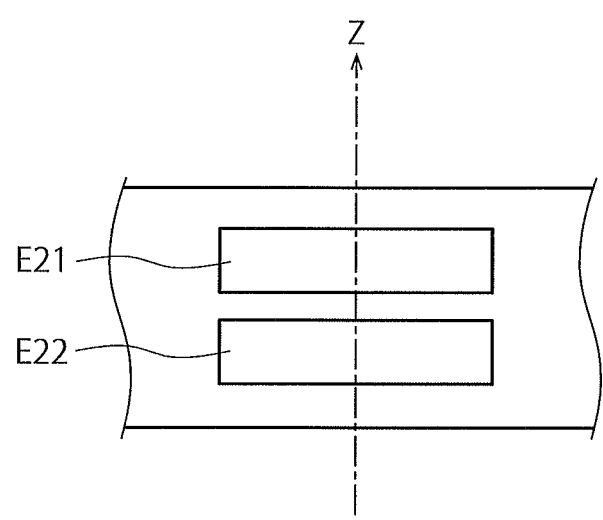
FIG. 45 is a diagram illustrating a state where a pair of fixed electrodes is arranged adjacent to each other along a Z axis direction.

FIG. 45 is a diagram illustrating a state where a pair of fixed electrodes E21 and E22 is arranged adjacent to each other along the Z axis direction. Of course the arrangement illustrated in FIG. 45 is not limited to the pair of fixed electrodes E21 and E22 but may be employed in the pair of fixed electrodes E23 and E24, the pair of fixed electrodes E25 and E26, or the pair of fixed electrodes E27 and E28 or the pair of displacement electrodes E31 and E32, the pair of displacement electrodes E33 and E34, the pair of displacement electrodes E35 and E36, or the pair of displacement electrodes E37 and E38. Such arrangement of electrodes also provides similar functions to those of the torque sensor having been described with reference to FIGS. 24 to 31. Of course the arrangement of electrodes may be employed in the torque sensor having only four capacitive elements (see FIGS. 22 and 23) or may be employed in the exemplary variation of the basic structure described in § 7.

The invention claimed is:

1. A torque sensor that detects torque around a Z axis in an X-Y-Z three-dimensional coordinate system, comprising:
 a ring-shaped deformation body made of a material elastically deformable by action of a torque to be detected and having a through opening through which the Z axis passes;
 a first supporting body connected to the ring-shaped deformation body at two first portions where the ring-shaped deformation body meets an X-Z plane;
 a second supporting body connected to the ring-shaped deformation body at two second portions where the ring-shaped deformation body meets a plane, different from the X-Z plane, which contains the Z axis, the second supporting body being rotatable around the Z axis relative to the first supporting body;
 a displacement electrode arranged on a surface of the ring-shaped deformation body and deformable due to elastic deformation of the ring-shaped deformation body;
 a fixed electrode arranged at a position on the first supporting body, opposite to the displacement electrode; and
 a detection circuit that outputs an electrical signal representing the torque around the Z axis acting on one of the first supporting body and the second supporting body while a load is applied to the other based on a variation amount of a capacitance value of a capacitive element as formed by the displacement electrode and the fixed electrode,
 wherein the capacitive element comprises a first capacitive element and a second capacitive element arranged at a first part where a clearance between the ring-shaped deformation body and the first supporting body decreases when the torque around the Z axis acts thereon and a third capacitive element and a fourth capacitive element arranged at a second part where a clearance between the ring-shaped deformation body and the first supporting body increases when the torque around the Z axis acts thereon,
 the detection circuit outputs, as the electrical signal representing the acting torque, a first electrical signal corresponding to "a difference between the capacitance value of the first capacitive element and the capacitance value of the third capacitive element" and of a second electrical signal corresponding to "a difference between the capacitance value of the second capacitive element and the capacitance value of the fourth capacitive element", and
 the detection circuit determines whether the torque sensor is normally functioning based on the first electrical signal and the second electrical signal.

2. The torque sensor according to claim 1,
 wherein the first supporting body is arranged at one side in the Z axis with respect to the ring-shaped deformation body, and
 the second supporting body is arranged at another side in the Z axis with respect to the ring-shaped deformation body.

3. The torque sensor according to claim 1,
 wherein the first supporting body is arranged inside an inner peripheral surface of the ring-shaped deformation body, and
 the second supporting body is arranged outside an outer peripheral surface of the ring-shaped deformation body.

4. The torque sensor according to claim 1,
 wherein the first supporting body is arranged inside an inner peripheral surface or outside an outer peripheral surface of the ring-shaped deformation body, and
 the second supporting body is arranged at one side in the Z axis with respect to the ring-shaped deformation body.

5. The torque sensor according to claim 1,
 wherein the first supporting body is arranged at one side in the Z axis with respect to the ring-shaped deformation body, and
 the second supporting body is arranged inside an inner peripheral surface or outside an outer peripheral surface of the ring-shaped deformation body.

6. The torque sensor according to claim 1,
 wherein the displacement electrode is arranged on an inner peripheral surface or an outer peripheral surface of the ring-shaped deformation body.

7. The torque sensor according to claim 1,
 wherein the displacement electrode comprises a first displacement electrode and a second displacement electrode arranged at positions, of the respective parts of the ring-shaped deformation body, corresponding to the first part and a third displacement electrode and a fourth displacement electrode arranged at positions, of the respective parts of the ring-shaped deformation body, corresponding to the second part, the fixed electrode comprises a first fixed electrode arranged at a position opposite to the first displacement electrode, a second fixed electrode arranged at a position opposite to the second displacement electrode, a third fixed electrode arranged at a position opposite to the third displacement electrode, and a fourth fixed electrode arranged at a position opposite to the fourth displacement electrode, the first capacitive element is formed by the first displacement electrode and the first fixed electrode, the second capacitive element is formed by the second displacement electrode and the second fixed electrode, the third capacitive element is formed by the third displacement electrode and the third fixed electrode, and the fourth capacitive element is formed by the fourth displacement electrode and the fourth fixed electrode.

8. The torque sensor according to claim 7,
wherein at least two of the first to fourth displacement electrodes are formed by a common electrode or at least two of the first to fourth fixed electrodes are formed by a common electrode.

9. The torque sensor according to claim 7,
wherein an area of one of the first fixed electrode and the first displacement electrode is set larger than an area of the other, an area of one of the second fixed electrode and the second displacement electrode is set larger than an area of the other, an area of one of the third fixed electrode and the third displacement electrode is set larger than an area of the other, and an area of one of the fourth fixed electrode and the fourth displacement electrode is set larger than an area of the other such that an effective facing area of each of the pairs of electrodes forming the first to fourth capacitive elements does not change even when a relative position of the displacement electrode changes relative to the fixed electrode as a result of action of the torque around the Z axis.

10. The torque sensor according to claim 1,
wherein the second supporting body is connected to the ring-shaped deformation body at two regions where the ring-shaped deformation body meets the Y-Z plane.

11. The torque sensor according to claim 10,
wherein, where a V axis and a W axis that pass through an origin O and form 45 degrees to an X axis and a Y axis are defined on an X-Y plane, the first capacitive element and the second capacitive element are arranged near the V axis symmetrically with respect to the V axis and the third capacitive element and the fourth capacitive element are arranged near the W axis symmetrically with respect to the W axis when viewed from a Z axis direction.

12. The torque sensor according to claim 10,
wherein, where a V axis and a W axis that pass through an origin O and form 45 degrees to an X axis and a Y axis are defined on an X-Y plane, the first capacitive element and the second capacitive element are aligned near the V axis along a Z axis direction with orthogonal projections thereof on the X-Y plane overlapping with each other and the third capacitive element and the fourth capacitive element are aligned near the W axis along the Z axis direction with orthogonal projections thereof on the X-Y plane overlapping with the W axis.

13. A torque sensor that detects torque around a Z axis in an X-Y-Z three-dimensional coordinate system, comprising:

a ring-shaped deformation body made of a material elastically deformable by action of a torque to be detected and having a through opening through which the Z axis passes;

a first supporting body connected to the ring-shaped deformation body at two first portions where the ring-shaped deformation body meets an X-Z plane;

a second supporting body connected to the ring-shaped deformation body at two second portions where the ring-shaped deformation body meets a plane, different from the X-Z plane, that includes the Z axis, the second supporting body rotatable around the Z axis relative to the first supporting body;

a displacement electrode arranged on a surface of the ring-shaped deformation body and deformable due to elastic deformation of the ring-shaped deformation body;

a fixed electrode arranged at a position on the first supporting body, opposite to the displacement electrode; and a detection circuit that outputs an electrical signal representing the torque around the Z axis acting on one of the first supporting body and the second supporting body while a load is applied to the other based on a variation amount of a capacitance value of a capacitive element as formed by the displacement electrode and the fixed electrode, wherein the capacitive element comprises: a first capacitive element and a second capacitive element arranged at a first part where a clearance between the ring-shaped deformation body and the first supporting body decreases when the torque around the Z axis acts thereon; a third capacitive element and a fourth capacitive element arranged at a second part where a clearance between the ring-shaped deformation body and the first supporting body increases when the torque around the Z axis acts thereon; a fifth capacitive element and a sixth capacitive element arranged at a third part where a clearance between the ring-shaped deformation body and the first supporting body decreases when the torque around the Z axis acts thereon; and a seventh capacitive element and an eighth capacitive element arranged at a fourth part where a clearance between the ring-shaped deformation body and the first supporting body increases when the torque around the Z axis acts thereon, the detection circuit outputs, as the electrical signal representing the acting torque, a first electrical signal corresponding to a difference between "a sum of a capacitance value of the first capacitive element, a capacitance value of the second capacitive element, a capacitance value of the fifth capacitive element, and a capacitance value of the sixth capacitive element" and "a sum of a capacitance value of the third capacitive element, a capacitance value of the fourth capacitive element, a capacitance value of the seventh capacitive element, and a capacitance value of the eighth capacitive element"; and at least one of a second electrical signal corresponding to a difference between "a sum of the capacitance value of the first capacitive element and the capacitance value of the fifth capacitive element" and "a sum of the capacitance value of the third capacitive element and the capacitance value of the seventh capacitive element" and of a third electrical signal corresponding to a difference between "a sum of the capacitance value of the second capacitive element and the capacitance value of the sixth capacitive element" and "a sum of the capacitance value of the fourth capacitive element and the capacitance value of the eighth capacitive element", and the detection circuit determines whether the torque sensor is normally functioning based on the first electrical signal and one of the second electrical signal and the third electrical signal.

14. The torque sensor according to claim 13,
wherein the first supporting body is arranged at one side in the Z axis with respect to the ring-shaped deformation body, and
the second supporting body is arranged at another side in the Z axis with respect to the ring-shaped deformation body.

15. The torque sensor according to claim 13,
wherein the first supporting body is arranged inside an inner peripheral surface of the ring-shaped deformation body, and
the second supporting body is arranged outside an outer peripheral surface of the ring-shaped deformation body.

16. The torque sensor according to claim 13,
wherein the first supporting body is arranged inside the inner peripheral surface or outside the outer peripheral surface of the ring-shaped deformation body, and
the second supporting body is arranged at one side in the Z axis with respect to the ring-shaped deformation body.

17. The torque sensor according to claim 13,
wherein the first supporting body is arranged at one side in the Z axis with respect to the ring-shaped deformation body, and
the second supporting body is arranged inside an inner peripheral surface or outside an outer peripheral surface of the ring-shaped deformation body.

18. The torque sensor according to claim 13,
wherein the acting torque is measured based on the first electrical signal.

19. The torque sensor according to claim 13,
wherein the detection circuit determines whether the torque sensor is normally functioning by determining whether a difference between torque based on the first electrical signal and torque based on one of the second electrical signal and the third electrical signal is within a predetermined range.

20. The torque sensor according to claim 13,
wherein the detection circuit outputs, as the electrical signal representing the acting torque, both of the second electrical signal and the third electrical signal, and
the detection circuit determines whether the torque sensor is normally functioning by determining whether "at least one of a difference between torque based on the first electrical signal and torque based on the second electrical signal and a difference between torque based on the first electrical signal and torque based on the third electrical signal" as well as "a difference between torque based on the second electrical signal and torque based on the third electrical signal" are both within a predetermined range.

21. The torque sensor according to claim 13,
wherein the displacement electrode comprises a first displacement electrode and a second displacement electrode arranged at positions, of the respective parts of the ring-shaped deformation body, corresponding to the first part, a third displacement electrode and a fourth displacement electrode arranged at positions, of the respective parts of the ring-shaped deformation body, corresponding to the second part, a fifth displacement electrode and a sixth displacement electrode arranged at positions, of the respective parts of the ring-shaped deformation body, corresponding to the third part, and a seventh displacement electrode and an eighth displacement electrode arranged at positions, of the respective parts of the ring-shaped deformation body, corresponding to the fourth part, the fixed electrode comprises a first fixed electrode arranged at a position opposite to the first displacement electrode, a second fixed electrode arranged at a position opposite to the second displacement electrode, a third fixed electrode arranged at a position opposite to the third displacement electrode, a fourth fixed electrode arranged at a position opposite to the fourth displacement electrode, a fifth fixed electrode arranged at a position opposite to the fifth displacement electrode, a sixth fixed electrode arranged at a position opposite to the sixth displacement electrode, a seventh fixed electrode arranged at a position opposite to the seventh displacement electrode, and an eighth fixed electrode arranged at a position opposite to the eighth displacement electrode, the first capacitive element is formed by the first displacement electrode and the first fixed electrode,
the second capacitive element is formed by the second displacement electrode and the second fixed electrode,
the third capacitive element is formed by the third displacement electrode and the third fixed electrode,
the fourth capacitive element is formed by the fourth displacement electrode and the fourth fixed electrode,
the fifth capacitive element is formed by the fifth displacement electrode and the fifth fixed electrode,
the sixth capacitive element is formed by the sixth displacement electrode and the sixth fixed electrode,
the seventh capacitive element is formed by the seventh displacement electrode and the seventh fixed electrode, and
the eighth capacitive element is formed by the eighth displacement electrode and the eighth fixed electrode.

22. The torque sensor according to claim 21,
wherein at least two of the first to eighth displacement electrodes are formed by a common electrode or at least two of the first to eighth fixed electrodes are formed by a common electrode.

23. The torque sensor according to claim 21,
wherein an area of one of the first fixed electrode and the first displacement electrode is set larger than an area of the other, an area of one of the second fixed electrode and the second displacement electrode is set larger than an area of the other, an area of one of the third fixed electrode and the third displacement electrode is set larger than an area of the other, an area of one of the fourth fixed electrode and the fourth displacement electrode is set larger than an area of the other, an area of one of the fifth fixed electrode and the fifth displacement electrode is set larger than an area of the other, an area of one of the sixth fixed electrode and the sixth displacement electrode is set larger than an area of the other, an area of one of the seventh fixed electrode and the seventh displacement electrode is set larger than an area of the other, and an area of one of the eighth fixed electrode and the eighth displacement electrode is set larger than an area of the other such that an effective facing area of each of the pairs of electrodes forming the first to eighth capacitive elements does not change even when a relative position of the displacement electrode changes relative to the fixed electrode as a result of action of the torque around the Z axis.

24. The torque sensor according to claim 13,
wherein the second supporting body is connected to the ring-shaped deformation body at two regions where the ring-shaped deformation body meets the Y-Z plane.

25. The torque sensor according to claim 24,
wherein, where a V axis and a W axis that pass through an origin O and form 45 degrees to an X axis and a Y axis are defined on an X-Y plane, the first capacitive element and the second capacitive element are arranged near the positive V axis symmetrically with respect to the V axis, the third capacitive element and the fourth capacitive element are arranged near the positive W axis symmetrically with respect to the W axis, the fifth capacitive element and the sixth capacitive element are arranged near the negative V axis symmetrically with respect to the V axis, and the seventh capacitive element and the eighth capacitive element are arranged near the negative W axis symmetrically with respect to the W axis when viewed from a Z axis direction.

26. The torque sensor according to claim 24,
wherein, where a V axis and a W axis that pass through an origin O and form 45 degrees to an X axis and a Y axis are defined on an X-Y plane, the first capacitive element and the second capacitive element are aligned near the positive V axis along a Z axis direction with orthogonal projections thereof on the X-Y plane overlapping with the positive V axis and the third capacitive element and the fourth capacitive element are aligned near the positive W axis along the Z axis direction with orthogonal projections thereof on the X-Y plane overlapping with the positive W axis, the fifth capacitive element and the sixth capacitive element are aligned near the negative V axis along the Z axis direction with orthogonal projections thereof on the X-Y plane overlapping with the negative V axis, and the seventh capacitive element and the eighth capacitive element are aligned near the negative W axis along the Z axis direction with orthogonal projections thereof on the X-Y plane overlapping with the negative W axis.

27. A torque sensor that detects torque around a Z axis in an X-Y-Z three-dimensional coordinate system, comprising:
a ring-shaped deformation body made of a material elastically deformable by action of a torque to be detected and having a through opening through which the Z axis passes;
a first supporting body connected to the ring-shaped deformation body at two first portions where the ring-shaped deformation body meets an X-Z plane;
a second supporting body connected to the ring-shaped deformation body at two second portions where the ring-shaped deformation body meets a plane, different from the X-Z plane, which contains the Z axis, the second supporting body being rotatable around the Z axis relative to the first supporting body;
a displacement electrode arranged on a surface of the ring-shaped deformation body and deformable due to elastic deformation of the ring-shaped deformation body;
a fixed electrode arranged at a position on the first supporting body, opposite to the displacement electrode; and
a detection circuit that outputs an electrical signal representing the torque around the Z axis acting on one of the first supporting body and the second supporting body while a load is applied to the other based on a variation amount of a capacitance value of a capacitive element as formed by the displacement electrode and the fixed electrode,
wherein the capacitive element comprises a first capacitive element and a second capacitive element arranged at a first part where a clearance between the ring-shaped deformation body and the first supporting body decreases when the torque around the Z axis acts thereon and a third capacitive element and a fourth capacitive element arranged at a second part where a clearance between the ring-shaped deformation body and the first supporting body increases when the torque around the Z axis acts thereon,
the detection circuit outputs, as the electrical signal representing the acting torque, a first electrical signal corresponding to a difference between "a sum of a capacitance value of the first capacitive element and a capacitance value of the second capacitive element" and "a sum of a capacitance value of the third capacitive element and a capacitance value of the fourth capacitive element"; and at least one of a second electrical signal corresponding to "a difference between the capacitance value of the first capacitive element and the capacitance value of the third capacitive element" and of a third electrical signal corresponding to "a difference between the capacitance value of the second capacitive element and the capacitance value of the fourth capacitive element", and
the detection circuit determines whether the torque sensor is normally functioning based on the first electrical signal and one of the second electrical signal and the third electrical signal.

28. The torque sensor according to claim 27,
wherein the acting torque is measured based on the first electrical signal.

29. The torque sensor according to claim 27,
wherein the detection circuit determines whether the torque sensor is normally functioning by determining whether a difference between torque based on the first electrical signal and torque based on one of the second electrical signal and the third electrical signal is within a predetermined range.

30. The torque sensor according to claim 27,
wherein the detection circuit outputs, as the electrical signal representing the acting torque, both of the second electrical signal and the third electrical signal, and
the detection circuit determines whether the torque sensor is normally functioning by determining whether "at least one of a difference between torque based on the first electrical signal and torque based on the second electrical signal and a difference between torque based on the first electrical signal and torque based on the third electrical signal" as well as "a difference between torque based on the second electrical signal and torque based on the third electrical signal" are within a predetermined range.

\* \* \* \* \*